(12) United States Patent
Takahashi et al.

(10) Patent No.: US 12,337,346 B2
(45) Date of Patent: Jun. 24, 2025

(54) VIBRATION ACTUATOR AND ELECTRONIC DEVICE

(71) Applicants: Yuki Takahashi, Tokyo (JP); Chikara Sekiguchi, Tokyo (JP); Shigeyuki Shimomura, Tokyo (JP); Yoshihiro Kumanomido, Tokyo (JP); Daisuke Kodama, Tokyo (JP); Yuta Yoshii, Tokyo (JP); Shigenori Inamoto, Tokyo (JP)

(72) Inventors: Yuki Takahashi, Tokyo (JP); Chikara Sekiguchi, Tokyo (JP); Shigeyuki Shimomura, Tokyo (JP); Yoshihiro Kumanomido, Tokyo (JP); Daisuke Kodama, Tokyo (JP); Yuta Yoshii, Tokyo (JP); Shigenori Inamoto, Tokyo (JP)

(73) Assignee: Minebea Mitsumi Inc., Nagano (JP)

( * ) Notice: Subject to any disclaimer, the term of this patent is extended or adjusted under 35 U.S.C. 154(b) by 329 days.

(21) Appl. No.: 17/802,548

(22) PCT Filed: Feb. 26, 2021

(86) PCT No.: PCT/JP2021/007585
§ 371 (c)(1),
(2) Date: Aug. 26, 2022

(87) PCT Pub. No.: WO2021/172577
PCT Pub. Date: Sep. 2, 2021

(65) Prior Publication Data
US 2023/0101894 A1 Mar. 30, 2023

(30) Foreign Application Priority Data
Feb. 27, 2020 (JP) ................................ 2020-032251

(51) Int. Cl.
*H02K 1/04* (2006.01)
*B06B 1/02* (2006.01)
(Continued)

(52) U.S. Cl.
CPC .............. *B06B 1/04* (2013.01); *B06B 1/0223* (2013.01); *B06B 1/14* (2013.01); *H02K 33/02* (2013.01)

(58) Field of Classification Search
CPC ......... B06B 1/0223; B06B 1/04; B06B 1/045; B06B 1/14; H02K 33/02; H02K 33/16
See application file for complete search history.

(56) References Cited

U.S. PATENT DOCUMENTS 5,682,132 A * 10/1997 Hiroyoshi ................ G08B 6/00
340/407.1
8,106,546 B2 * 1/2012 Yamazaki .............. H02K 33/16
310/15

(Continued)

FOREIGN PATENT DOCUMENTS

JP 3748637 2/2006
JP 2017-099153 6/2017
(Continued)

OTHER PUBLICATIONS

Supplementary European Search Report and the European Search Opinion Dated Feb. 5, 2024 From the European Patent Office Re. Application No. 21761712.5. (22 Pages).

*Primary Examiner* — Naishadh N Desai

(57) ABSTRACT

This vibration actuator comprises a fixed body including a coil, a movable body including a magnet, and an elastic support part that supports the movable body so as to be freely moveable with respect to the fixed body, wherein the coil to which power is supplied and the magnet cooperate to cause the movable body to vibrate with respect to the fixed body. The elastic support part has an outer circumferential (Continued)

part bonded to the fixed body, an annular inner circumferential part disposed inside in the radial direction of the outer circumferential part and bonded to the movable body, and a deforming arm part that couples the outer circumferential part and the inner circumferential part and is elastically deformable. The elastic support part has a sealing part provided in a bonding part between the inner circumferential part and the movable body to seal the bonding part.

12 Claims, 50 Drawing Sheets

(51) Int. Cl.
*B06B 1/04* (2006.01)
*B06B 1/14* (2006.01)
*H02K 33/02* (2006.01)

(56) References Cited

U.S. PATENT DOCUMENTS

| 8,593,018 | B2 * | 11/2013 | Furuich | H02K 33/16 |
| | | | | 310/17 |
| 2017/0149320 | A1 * | 5/2017 | Mori | H02K 33/18 |

FOREIGN PATENT DOCUMENTS

| JP | 2019-115187 | 7/2019 |
| WO | WO 2019/130705 | 7/2019 |

\* cited by examiner

22(24)

26(28)

VIBRATION ACTUATOR AND ELECTRONIC DEVICE

TECHNICAL FIELD

The present invention relates to a vibration actuator and an electronic device including the vibration actuator.

BACKGROUND ART

Conventionally, a vibration actuator is mounted as a vibration source in electronic devices having a vibrating function. The electronic devices can notify a user of an incoming call or improve an operational feel and/or realism by driving the vibration actuator to transmit vibrations to the user to give a physical feeling. Here, examples of the electronic devices include a portable game terminal, a controller (game pad) of a stationary game machine, a portable communication terminal such as a mobile phone or a smart phone, a portable information terminal such as a tablet PC, and a portable device such as a wearable terminal capable of being worn on clothes or an arm.

A vibration actuator used in a pager or the like as disclosed in Patent Literature (hereinafter, referred to as "PTL") 1 has been known as a vibration actuator of a miniaturizable structure mounted on a portable device, for example.

This vibration actuator includes a pair of plate-like elastic bodies that are supported respectively on opening edge portions of a cylindrical frame such that the elastic bodies face each other. A magnetic field generator made of a yoke and a magnet is attached to one of the plate-like elastic bodies, and a coil is attached to the other plate-shaped elastic body. The coil is disposed within the magnetic field of the magnetic field generator. One of the plate-like elastic bodies has a spiral shape, and is formed such that an outer circumferential portion being one end portion is disposed at a bottom portion of a frame body, and a central portion being the other end portion is raised from the outer circumferential portion and is located within the frame body. A yoke is fixed to this central portion. By applying currents of different frequencies to the coil while switching the currents through an oscillation circuit, a pair of plate-shaped elastic bodies selectively resonate, and the movable body vibrates in a direction in which the pair of plate-shaped elastic body face each other.

CITATION LIST

Patent Literature

PTL 1
  Japanese Patent No. 3748637

SUMMARY OF INVENTION

Technical Problem

Note that, it is known that noise is generated in such a structure or the like as that of the conventional vibration actuator in which a movable body such as a yoke is fixed to elastic supporting bodies laterally at end portions of the movable body in the vibration direction, when there is a gap in a joint portion between the movable body and the elastic supporting bodies. It is considered that noise is generated because deformation of the plate-shaped elastic bodies themselves with the drive of the movable body causes contact via the gap. In recent years, a vibration actuator that is less likely to generate noise as little as possible during driving is desired.

It is an object of the present invention to provide a vibration actuator and an electronic device that suppresses occurrence of noise and generates a suitable vibration at a stable high output.

Solution to Problem

One aspect of the vibration actuator of the present invention is a vibration actuator including:
  a fixing body including a coil; a movable body including a magnet that is disposed inside the coil in a radial direction of the coil to be relatively movable in a vibration direction orthogonal to the radial direction of the coil; and an elastic supporting part that supports the movable body such that the movable body is freely movable with respect to the fixing body, in which
  cooperation between the coil supplied with electricity and the magnet causes the movable body to vibrate with respect to the fixing body,
  the elastic supporting part includes:
    an outer circumferential portion joined to the fixing body,
    an inner circumferential portion disposed inside the outer circumferential portion in the radial direction and joined to the movable body, the inner circumferential portion being annular, and
    a deformation arm portion coupling together the outer circumferential portion and the inner circumferential portion, the deformation arm portion being elastically deformable, and
  the vibration actuator includes a sealing part that is disposed at a joint portion between the inner circumferential portion and the movable body and that seals the joint portion.

One aspect of the vibration actuator of the present invention is a vibration actuator including:
  a movable body that centrally includes a magnet having a columnar shape and in which spring retaining parts are disposed respectively on front and back surfaces of the magnet in an axial direction of the magnet;
  a fixing body for accommodating the movable body, the fixing body having a cylindrical shape and including a pair of annular coils disposed radially outside of the movable body;
  a pair of elastic supporting parts for supporting the movable body such that the movable body is capable of reciprocating vibration in a vibration direction along the axial direction, each of the elastic supporting parts being joined to the fixing body at an outer circumferential portion and being joined to a corresponding one of the spring retaining parts at an inner circumferential portion; and
  a sealing part that is disposed at a joint portion between the inner circumferential portion and the movable body and that seals the joint portion.

One aspect of an electronic device of the present invention employs a configuration in which
  the vibration actuator with the above-described configuration is mounted in the electronic device.

Advantageous Effects of Invention

According to the present invention, it is possible to suppress occurrence of noise and generate a suitable vibration with a stable high output.

DESCRIPTION OF EMBODIMENT

Hereinafter, embodiments of the present invention will be described in detail with reference to the drawings.

Embodiment 1

(Vibration Actuator)
[Overall Configuration of Vibration [Entire Configuration of Vibration Actuator]

Figure 1:
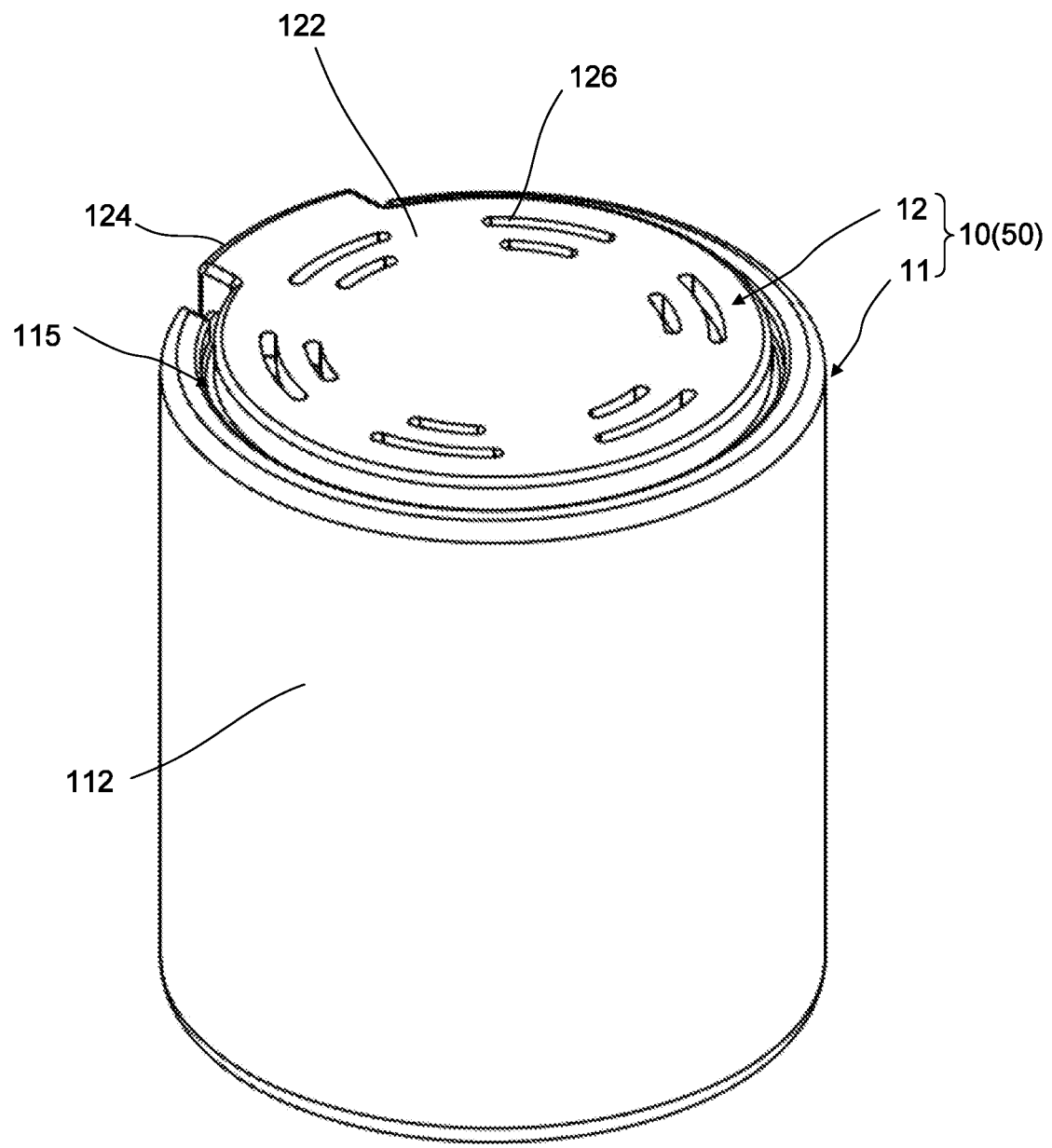
FIG. 1 is a perspective view of an external appearance of a vibration actuator according to one embodiment of the present invention.
Figure 2:
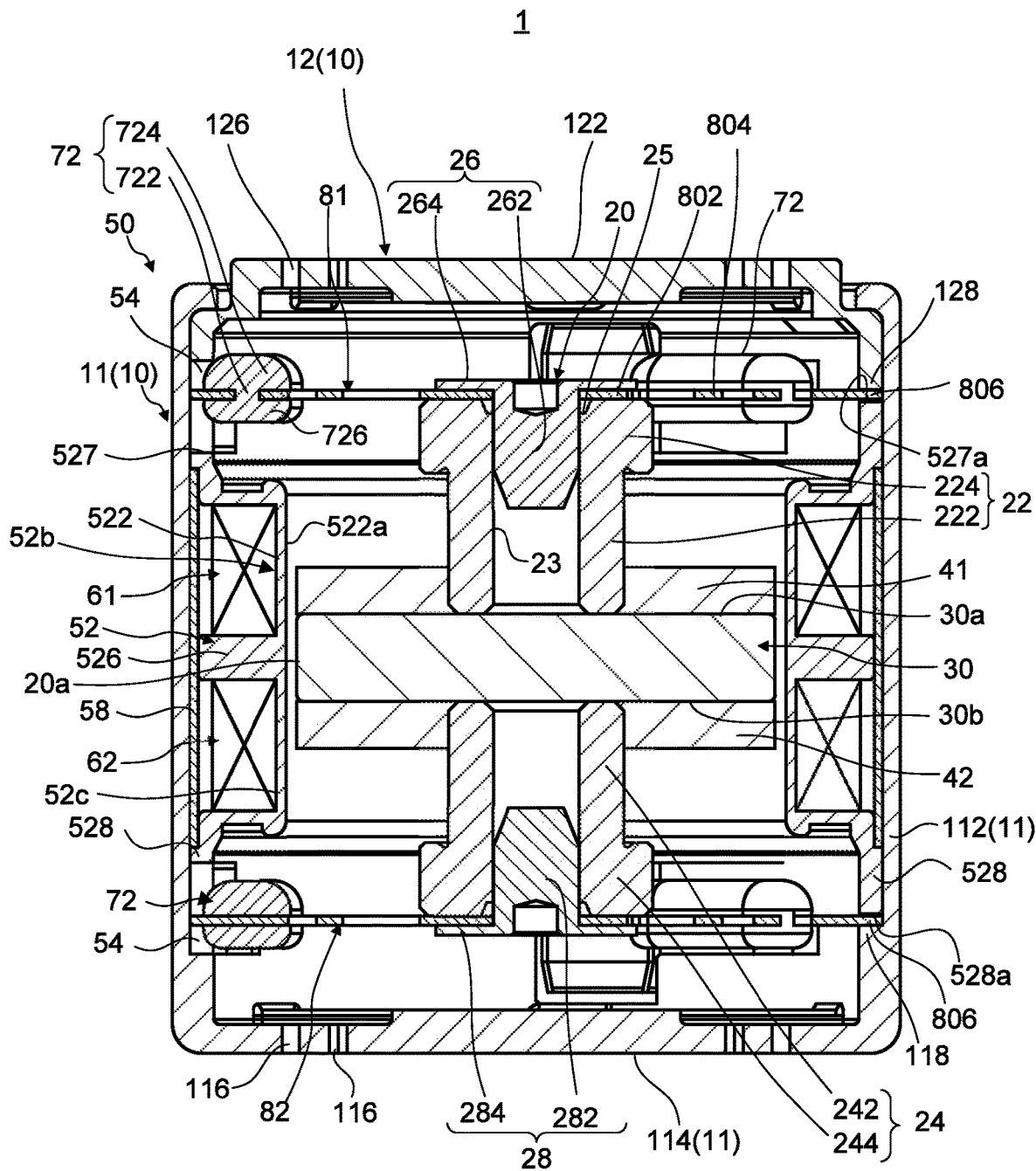
FIG. 2 is a longitudinal sectional view of the vibration actuator.
Figure 3:
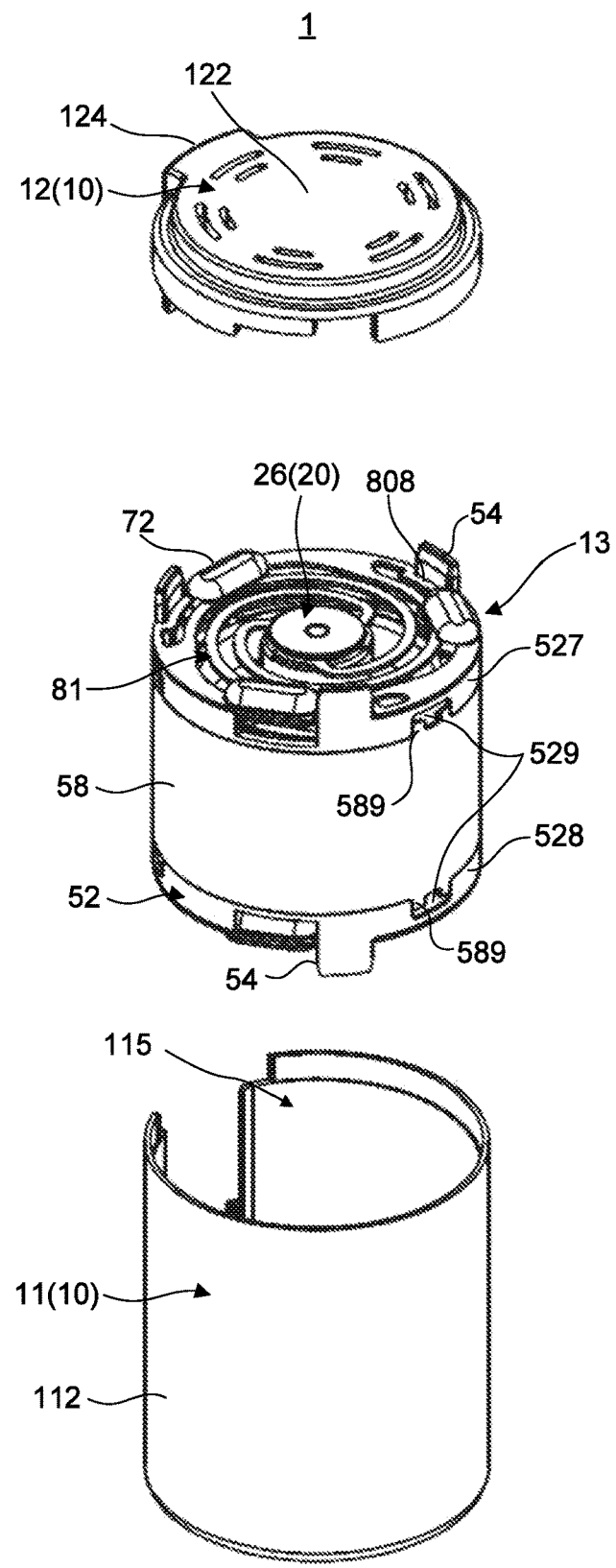
FIG. 3 is a perspective view of the vibration actuator from which a case is detached.
Figure 4:
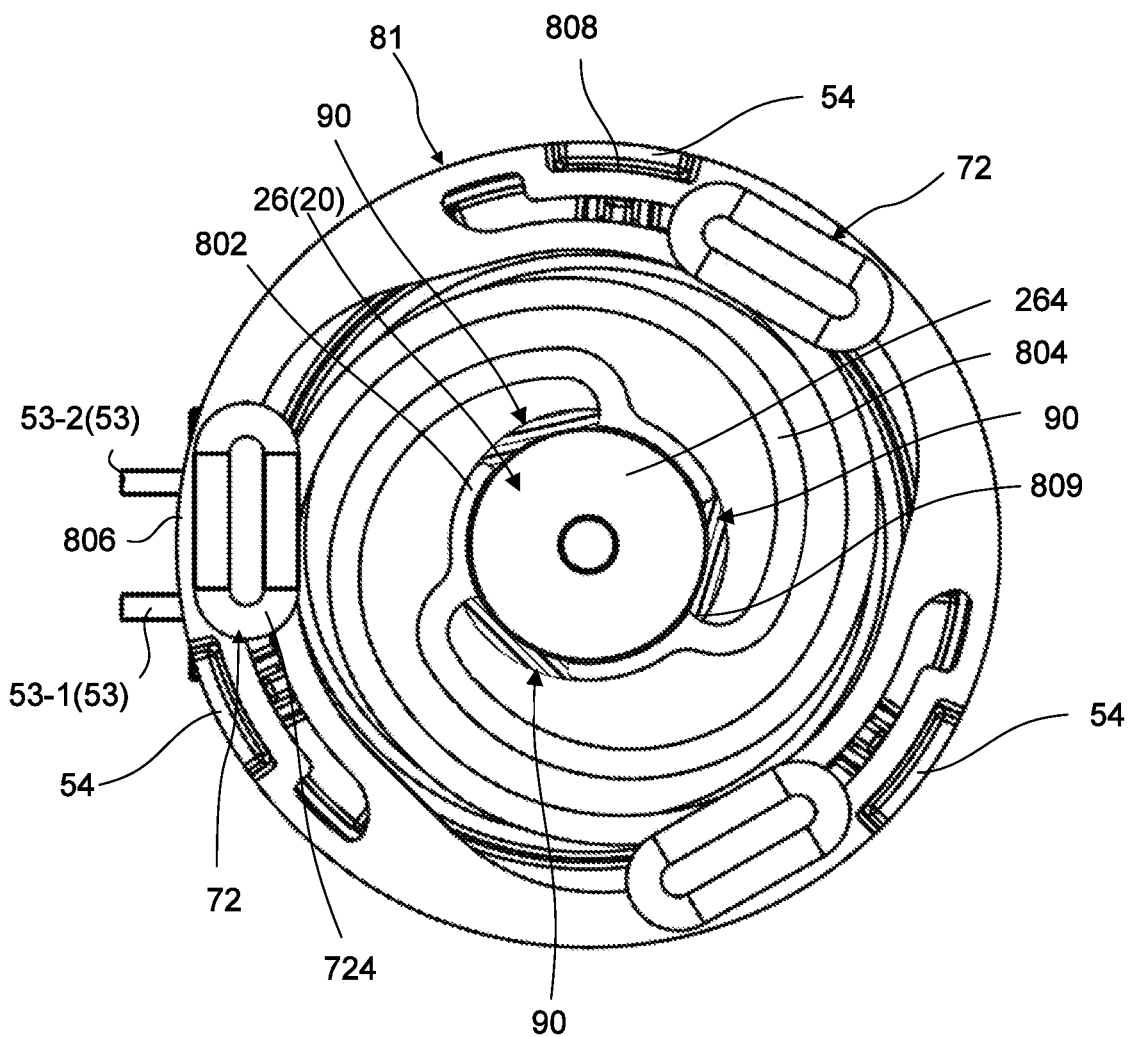
FIG. 4 is a plan view of a driving unit illustrated in FIG. 3.
Figure 5:
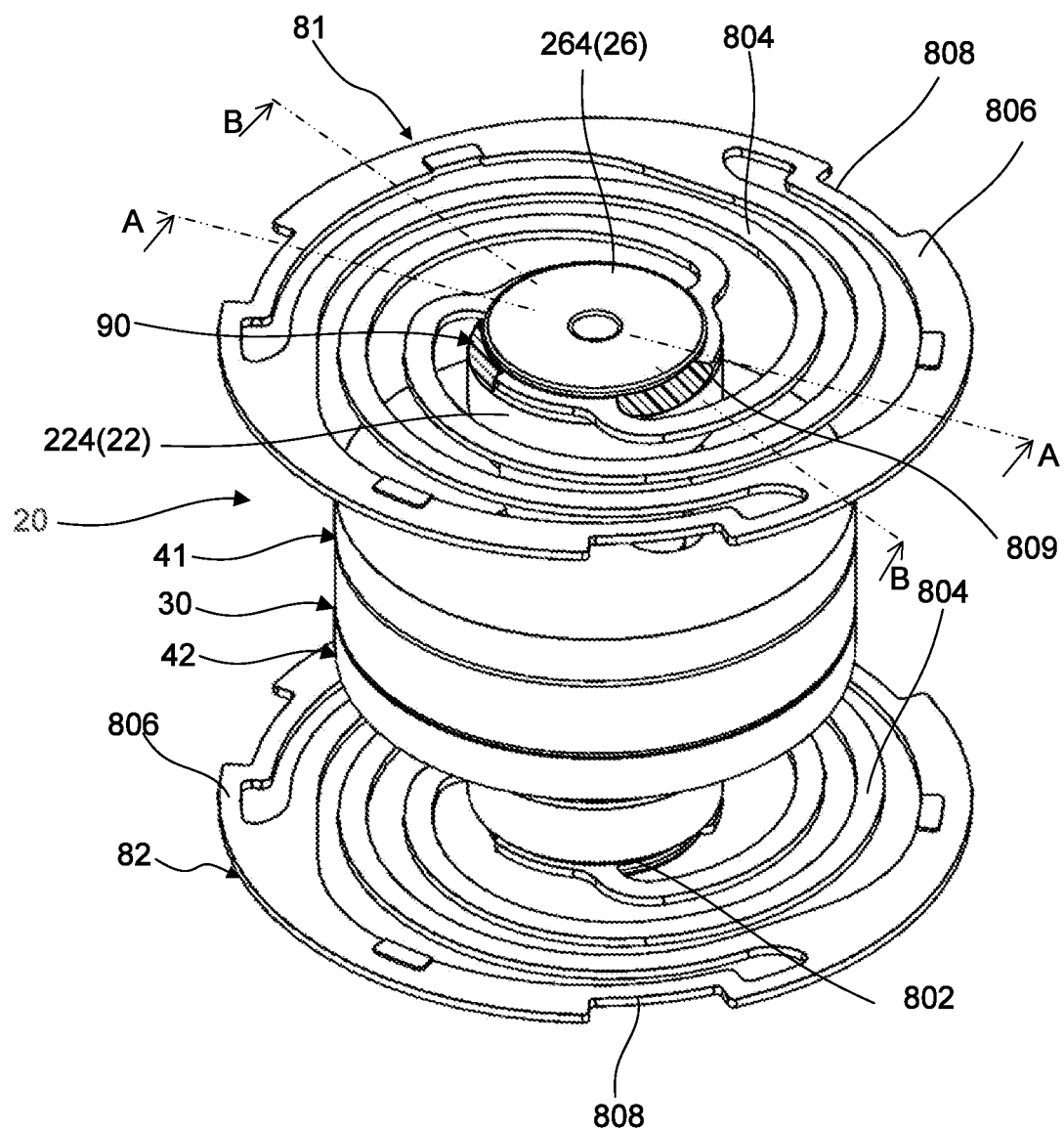
FIG. 5 is a perspective view of a movable body to which elastic supporting parts are fixed.
Figure 6:
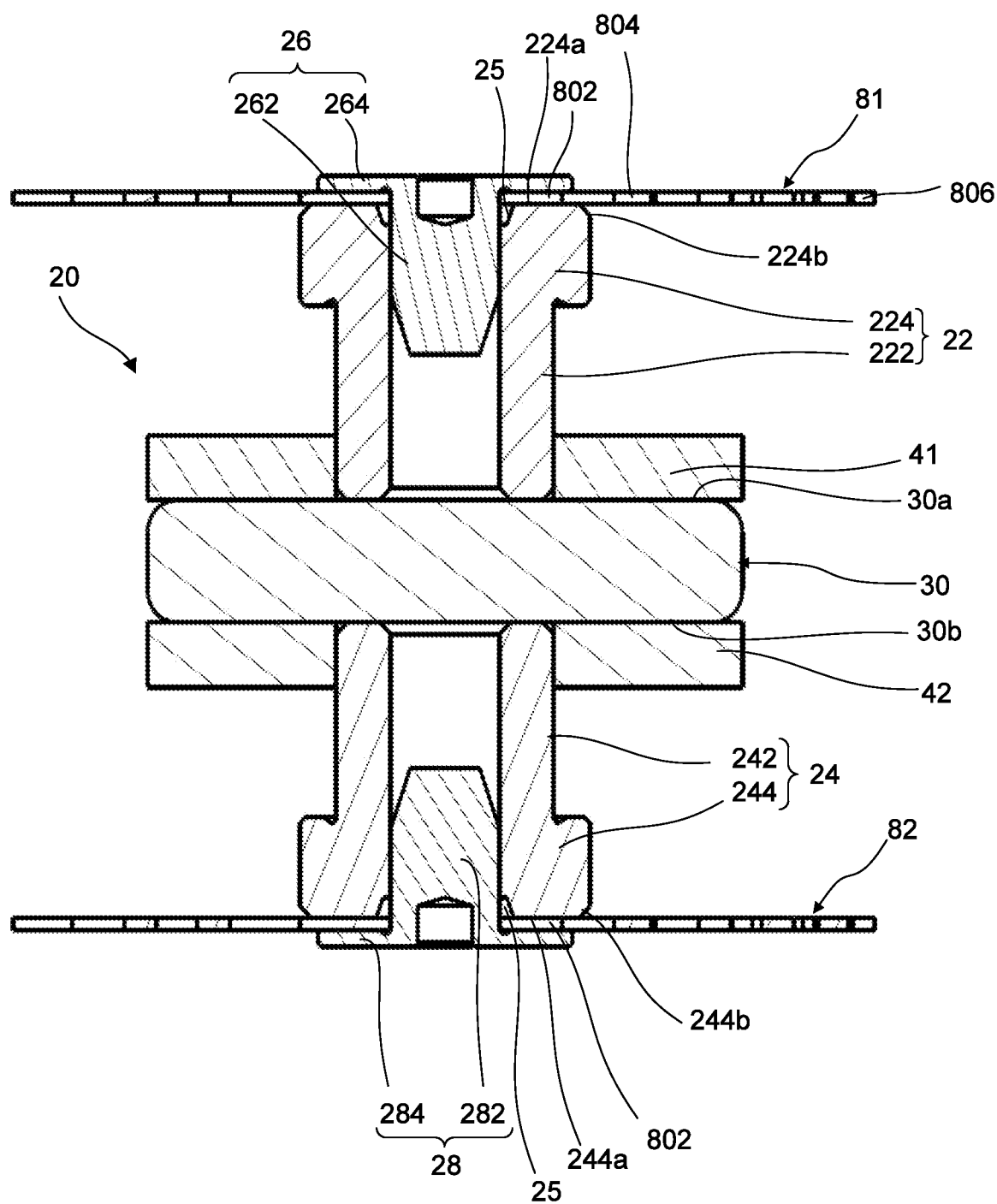
FIG. 6 is a sectional view taken along line A-A in FIG. 5.
Figure 7:
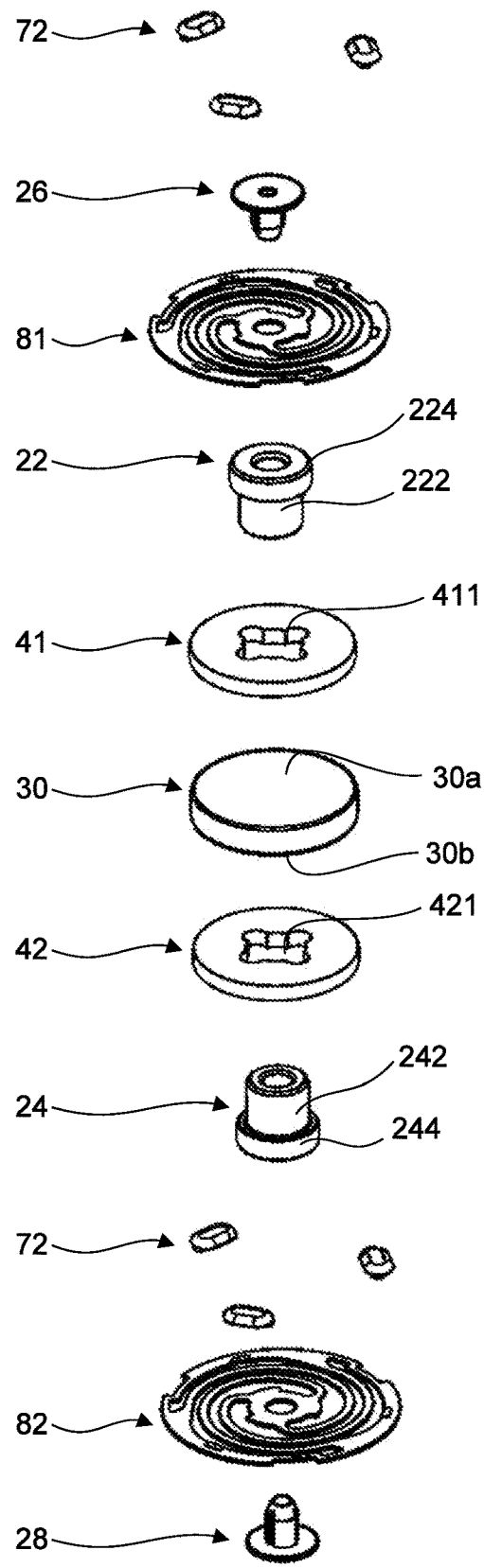
FIG. 7 is an exploded perspective view of the movable body and the elastic supporting parts.

FIG. 1 is an external perspective view of a vibration actuator according to Embodiment 1 of the present invention, and FIG. 2 is a longitudinal sectional view of the vibration actuator taken along an axial direction of the vibration actuator. Further, FIG. 3 is a perspective view of the vibration actuator from which a case is detached. Further, FIG. 4 is a plan view of the driving unit illustrated in FIG. 3, and FIG. 5 is a perspective view illustrating a movable body to which elastic supporting parts are fixed. FIG. 6 is a sectional view taken along line A-A of FIG. 5, and FIG. 7 is an exploded perspective view of the movable body and the elastic supporting parts. In FIG. 6, illustration of sealing part 90 is omitted for convenience. Further, the "upper" side and the "lower" side in the present embodiment are given for convenience of understanding, and mean one side and the other side in the vibration actuator of the movable body in a vibration direction (the axial direction of the vibration actuator). That is, when the vibration actuator is mounted on an electronic device (see FIGS. 28 and 29), the upper and lower sides may be reversed, or may also be left and right.

Vibration actuator 1 according to Embodiment 1 is mounted as a vibration source on an electronic device such as a portable game terminal device (for example, game controller GC illustrated in FIG. 28) to implement a vibrating function of the electronic device. Examples of this electronic device include a portable device such as a smart phone (for example, mobile terminal M illustrated in FIG. 29). Vibration actuator 1 is mounted on a device such as a portable game terminal device or a portable device, and is driven to vibrate to notify a user of an incoming call or to give an operational feel or realism.

As illustrated in FIGS. 1 and 2, vibration actuator 1 of the present embodiment accommodates, in hollow case 10, movable body 20 such that movable body 20 is capable of vibrating in the axial direction (upper-lower direction) of case 10, which is the vibration direction, between upper and lower end surfaces. Movable body 20 moves inside case 10 to allow vibration actuator 1 itself to function as a vibration body.

Vibration actuator 1 includes: movable body 20 including magnet 30 and movable-body cores 41 and 42; fixing body 50 including a pair of coils 61 and 62; and elastic supporting parts 81 and 82 for supporting movable body 20 such that the movable body freely reciprocates with respect to fixing body 50.

Coils 61 and 62, magnet 30, and movable-body cores 41 and 42 in vibration actuator 1 constitute a magnetic circuit for vibrating movable body 20. In vibration actuator 1, when coils 61 and 62 are energized from a power supplying part (e.g., drive control part 203 illustrated in FIGS. 28 and 29), coils 61 and 62 and magnet 30 cooperate to cause movable body 20 to reciprocate in the vibration direction within case 10.

In vibration actuator 1 of the present embodiment, bobbin main-body portion (coil protection wall portion) 522 disposed between movable body 20 and coils 61 and 62 allows movable body 20 to reciprocate in the axial direction of coils 61 and 62 (i.e., the vibration direction) inside coils 61 and 62 held by coil bobbin part 52. The axial direction of coils 61 and 62 is the vibration direction of movable body 20, is also the magnetization direction of magnet 30, and is also the axial direction of coil bobbin part 52.

Movable body 20 is disposed via elastic supporting parts 81 and 82 such that, in a non-vibration state in which movable body 20 is not vibrating, the center of the length of movable body 20 in the vibration direction and the center of the length of coil bobbin part 52 in the vibration direction face each other in a direction orthogonal to the axial direction of movable body 20 with a predetermined gap being interposed between the movable body and the coil bobbin part. At this time, it is desirable that movable body 20 be located at a position where movable body 20 is balanced between coils 61 and 62 without making contact with bobbin main-body portion 522 of coil bobbin part 52. In the present embodiment, it is preferable that the center of the length along magnet 30 and movable-body cores 41 and 42 in the vibration direction be disposed to face, in the direction orthogonal to the vibration direction, the center of the length of a space between vertically spaced coils 61 and 62 in the vibration direction. Note that, a magnetic fluid may be interposed between bobbin main-body portion 522 and movable body 20.

Vibration actuator 1 in the present embodiment includes driving unit 13 in case 10 including case main body 11 and lid portion 12 as illustrated in FIG. 3. Driving unit 13 includes coils 61 and 62, coil bobbin part 52, movable body 20 and elastic supporting parts 81 and 82.

<Movable Body 20>

As illustrated in FIG. 2, movable body 20 is supported inside cylindrical coil bobbin part 52 of fixing body 50 by elastic supporting parts 81 and 82 connected to the upper and lower end portions of the movable body, such that the movable body is capable of reciprocating along coil bobbin part 52 (inner circumferential surface 522a of bobbin main-body portion 522). In other words, in vibration actuator 1, movable body 20 is supported to be capable of reciprocating in a direction in which lid portion 12 and bottom portion 114 face each other. Movable body 20 is disposed in driving unit 13 illustrated in FIG. 3. Movable body 20 and elastic supporting parts 81 and 82 are joined to each other by sealing part 90 without any gap.

Movable body 20 includes magnet 30, movable-body cores 41 and 42, spring retaining parts 22 and 24, and fixation pins 26 and 28 as illustrated in FIGS. 2 and 5 to 7. In the present embodiment, movable-body cores 41 and 42 and spring retaining parts 22 and 24 are continuously disposed respectively toward opposite sides from magnet 30 in the vibration direction (in the upper-lower direction in FIGS. 1 to 3 and 5 to 7). In movable body 20, outer circumferential surface 20a of magnet 30 and movable-body cores 41 and 42 is disposed inside inner circumferential surface 522a of bobbin main-body portion 522 to face inner circumferential surface 522a with a predetermined gap being interposed between the outer circumferential surface of the magnet and the movable-body cores and the inner circumferential surface of the bobbin main-body portion.

When movable body 20 moves in the vibration direction, movable body 20 reciprocates along inner circumferential surface 522a such that outer circumferential surface 20a does not make contact with inner circumferential surface 522a.

Magnet 30 is magnetized in the vibration direction. Magnet 30 is formed in a disk shape in the present embodiment, and front and back surfaces 30a and 30b separate from each other in the vibration direction respectively have different poles. Front and back surfaces 30a and 30b of magnet 30 are two magnetized surfaces separate from each other in the extending direction of the axes of coils 61 and 62.

Magnet 30 is disposed radially inside coils 61 and 62 (described in detail below) with a gap being interposed between the magnet and coils 61 and 62. Here, the term "radially (radial direction)" means a direction orthogonal to the axes of coils 61 and 62, and also means the direction orthogonal to the vibration direction. This "gap" in the radial direction is a gap between magnet 30 and coils 61 and 62 including bobbin main-body portion 522, and is a gap allowing movable body 20 to move in the vibration direction of movable body 20 such that magnet 30 and coils 61 and 62 do not make contact with each other. That is, the "gap" means a predetermined gap between bobbin main-body portion 522 and magnet 30 in the present embodiment.

Magnet 30 is disposed to face, at the outside in the radial direction, the center of bobbin main-body portion 522 in the present embodiment. Note that, magnet 30 may have any other shape than the disk shape, such as a cylindrical shape, a plate-like shape, or the like as long as magnet 30 is disposed inside coils 61 and 62 such that the two magnetized surfaces face in the extending direction of the axes of coils 61 and 62. Further, it is desirable that the center of magnet 30 in the axial direction coincide with the center of movable body 20 in the axial direction.

Movable-body cores 41 and 42 are disposed respectively on front and back surfaces 30a and 30b of magnet 30.

Movable-body cores 41 and 42 are magnetic materials, function as a yoke, and constitute the magnetic circuit together with magnet 30 and coils 61 and 62. Movable-body cores 41 and 42, together with magnet 30, constitute a movable-body-side magnetic circuit. Movable-body cores 41 and 42 concentrate magnetic flux of magnet 30 to cause the magnetic flux to efficiently flow without leaking, so as to effectively distribute the magnetic flux flowing between magnet 30 and coils 61 and 62.

In addition to the function as a part of the magnetic circuit, movable-body cores 41 and 42 in movable body 20 have a function as a main-body part of movable body 20, a function of fixing spring retaining parts 22 and 24, and a function as a weight.

In the present embodiment, movable-body cores 41 and 42 are formed in an annular flat plate shape having the same surface shape as magnet 30. Movable-body cores 41 and 42 are fixed to magnet 30 such that the outer circumferential surfaces of movable-body cores 41 and 42 are flush with the outer circumferential surface of the magnet, and forms outer circumferential surface 20a of movable body 20 together with the outer circumferential surface of the magnet.

Movable-body cores 41 and 42 are the same similarly-formed members in the present embodiment, and are symmetrically disposed above and below magnet 30 so as to sandwich magnet 30. Note that, movable-body cores 41 and 42 are attracted to magnet 30, and also are fixed to magnet 30, for example, by a thermosetting adhesive such as an epoxy resin or an anaerobic adhesive.

Fitting openings 411 and 421 to which upper and lower spring retaining parts 22 and 24 are fitted are formed in the respective central portions of movable-body cores 41 and 42. Upper and lower spring retaining parts 22 and 24 are inserted in fitting openings 411 and 421.

Movable-body cores 41 and 42 make contact with spring retaining parts 22 and 24 at three or four points in fitting openings 411 and 421 to support the spring retaining parts such that the axis of each of upper and lower spring retaining parts 22 and 24 (here, coincides with the center of elastic supporting parts 81 and 82) is positioned on the central axis of movable body 20. In fitting openings 411 and 421, the degrees of openings in movable-body cores 41 and 42 are adjustable for adjusting the weight of movable body 20, so that a preferable vibration output can be set.

In the present embodiment, movable-body cores 41 and 42 are located inside (radially inside) coils 61 and 62 to respectively face coils 61 and 62 in the direction orthogonal to the axial direction of coils 61 and 62 in the non-vibration state of movable body 20.

In movable-body cores 41 and 42, it is preferable that the height position of the upper surface of movable-body core 41 on the upper side of magnet 30 face the position of the center of upper coil 61 in the height direction (upper-lower direction). In addition, it is preferable that the height position of the lower surface of movable-body core 42 on the lower side of magnet 30 face the position of the center of lower coil 62 in the height direction (upper-lower direction).

Spring retaining parts 22 and 24 have a function of fixing the movable-body-side magnetic circuit to elastic supporting parts 81 and 82, and a function as a weight of movable body 20. Spring retaining parts 22 and 24 are symmetrically disposed to sandwich magnet 30 and movable-body cores 41 and 42, and increase the vibration output of movable body 20.

Figure 8:
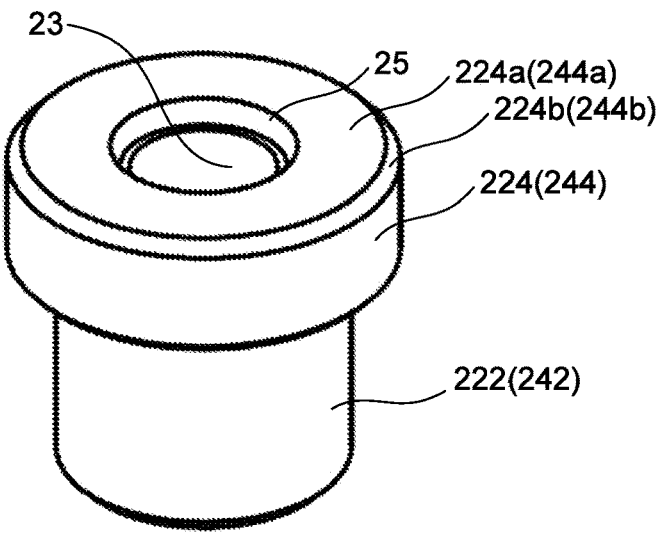
FIG. 8 is a perspective view of a spring retaining part viewed from the spring fixation portion side.

FIG. 8 is a perspective view of spring retaining part 22 (24) as seen from the spring fixation portion 224 (244) side. In the present embodiment, spring retaining parts 22 and 24 are formed in the same shape. Thus, in FIG. 8, the reference numerals are described as "spring retaining part 22 (24)." Spring retaining part 22 will be mainly described, and description of spring retaining part 24 will be omitted.

Spring retaining parts 22 and 24 are a shaft-like body disposed along the central axis of movable body 20 in the present embodiment, and are interposed between movable-body cores 41 and 42 and elastic supporting parts 81 and 82.

Spring retaining parts 22 and 24 are formed in the same shape in the present embodiment, and have joint portions 222 and 242 and spring fixation portions 224 and 244. These joint portions 222 and 242 and spring fixation portions 224 and 244 are continuously formed in the vibration direction (specifically, in the upper-lower direction).

Each of spring retaining parts 22 and 24 is a cylindrical body, and has through hole 23 extending through the inside of the spring retaining part. Note that, spring retaining parts 22 and 24 function as a weight. Further, spring retaining parts 22 and 24 may function as a weight adjusting part that adjusts the weight by addition of a weight in through hole 23. It is possible to increase the vibration output of movable body 20 by making movable body 20 heavier by adding a weight in through hole 23.

Joint portions 222 and 242 are joined to movable-body cores 41 and 42, respectively. Joint portions 222 and 242 are cylindrical bodies disposed on the axis of movable body 20.

Joint portions 222 and 242 are joined to movable-body cores 41 and 42 by inserting the other end portion sides thereof into fitting openings 411 and 421 in movable-body cores 41 and 42, respectively, and by fitting them internally.

Spring retaining parts 22 and 24 are fixed to movable-body cores 41 and 42 by press-fitting in the present embodiment, but the present invention is not limited thereto, and spring retaining parts 22 and 24 may also be fixed, for example, by adhesion using a thermosetting adhesive such as epoxy resin or an anaerobic adhesive. In addition, although joint portions 222 and 242 are formed as cylindrical bodies, they may be formed as solid cylindrical bodies, or may be formed as rod-shaped bodies having recessed portions along the axis.

Upper spring fixation portion 224 forms one end portion of movable body 20 in the vibration direction, that is, the upper end portion of movable body 20.

Spring fixation portion 224 is disposed to protrude from joint portion 222 on one side (upward) in spring retaining part 22, and is a cylindrical body having a larger outer diameter than joint portion 222. In spring fixation portion 224, through hole 23 opens at a front end (upper end) surface (hereinafter, also referred to as "joining surface") 224a thereof. Spring fixation portion 224, together with fixation pin 26 inserted into through hole 23, holds inner circumferential portion 802 in a state in which inner circumferential portion 802, which is an inner-diameter-side end portion of the upper leaf spring as elastic supporting part 81, is in contact with joining surface 224a. Thus, spring fixation portion 224 and elastic supporting part 81 are joined to each other.

On the other hand, lower spring fixation portion 244 forms the other end portion of movable body 20 in the vibration direction, i.e., the lower end portion of movable body 20 as illustrated in FIG. 6. Spring fixation portion 244 is joined to inner circumferential portion 802, which is an inner-diameter-side end portion of the lower leaf spring as elastic supporting part 82.

Spring fixation portion 244 is disposed to protrude from joint portion 242 on the other side (downward) in spring retaining part 24, and is a cylindrical body having a larger outer diameter than joint portion 242. In spring fixation portion 244, through hole 23 opens in joining surface 244a which is a front end (lower end) surface. Spring fixation portion 244, together with fixation pin 28 inserted into through hole 23, holds inner circumferential portion 802 in a state in which inner circumferential portion 802 of the lower leaf spring serving as elastic supporting part 82 is in contact with joining surface 244a. Thus, spring fixation portion 244 and elastic supporting part 82 are joined to each other. A detailed description of elastic supporting part 81 including inner circumferential portion 802 will be given later with description of elastic supporting part 82.

As illustrated in FIG. 8, each of spring fixation portions 224 and 244 is provided with recess forming portion 25 that forms a continuous depression in joining surface 224a. Recess forming portion 25 forms a space continuous with joining surface 224a between the recess forming portion and elastic supporting part 81 as illustrated in FIGS. 2 and 6.

Recess forming portion 25 is formed by cutting out an inner circumferential edge portion of annular joining surface 224a of spring fixation portion 224. Recess forming portion 25 stores in joining surface 224a a sealing material serving as sealing part 90, such as an adhesive, a gap with respect to inner circumferential portion 802, to join spring retaining part 22 to elastic supporting part 81.

Fixation pins 26 and 28 firmly fix together elastic supporting parts 81 and 82 and movable body 20 such that they do not come off each other by the vibration of movable body 20.

Figure 9:
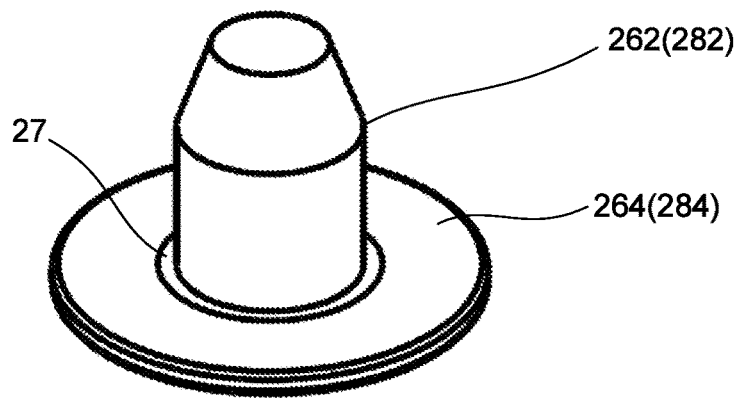
FIG. 9 is a perspective view of a fixation pin seen from the pin body side.

FIG. 9 is a perspective view of fixation pin 26 (28) as viewed from the pin body 262 (282) side. Fixation pins 26 and 28 are for fixing elastic supporting parts 81 and 82 to spring retaining parts 22 and 24. In the present embodiment, fixation pins 26 and 28 are formed in the same shape. Fixation pins 26 and 28 respectively include shaft-shaped pin bodies 262 and 282 which can be press-fitted into spring fixation portions 224 and 244, flanges 264 and 284 disposed on the edge portions of one end sides of pin bodies 262 and 282, and annular grooves 27 and 27. Fixation pin 26 (28), for example, may be a rivet such as a blind rivet.

Pin bodies 262 and 282 of fixation pins 26 and 28 are inserted respectively into through holes 23 in spring fixation portions 224 and 244 (specifically, press-fitted by caulking) and are fixed to spring fixation portions 224 and 244.

Flanges 264 and 284 are formed to protrude at one end portions of respective fixation pins 26 and 28 in a direction perpendicular to the axial direction. Pin bodies 262 and 282 are press-fitted into through holes 23. Accordingly, flanges 264 and 284 together with joining surfaces 224a and 244a of spring fixation portions 224 and 244 sandwich inner circumferential portions 802, and firmly join elastic supporting parts 81 and 82 to movable body 20.

Annular grooves 27 are continuously formed in the surfaces of flanges 264 and 284 which are to make contact with inner circumferential portions 802. Annular grooves 27 are formed, for example, in flanges 264 and 284 along the outer circumferences of the base end portions of pin bodies 262 and 282 rising from the central portion of flanges 264 and 284. Sealing part 90 for closing gaps is disposed in annular grooves 27 in case that there are gaps between spring fixation portions 224 and 244, fixation pins 26 and 28, and inner circumferential portions 802.

Since in movable body 20, spring retaining parts 22 and 24 thus configured are disposed at opposite end portions (upper and lower end portions) distant from each other with respect to the movable-body-side magnetic circuit in the vibration direction, the weight in movable body 20 does not need to be disposed on the outer circumferential side of the movable-body magnetic circuit. Thus, the arrangement space for coils 61 and 62 located to face each other on the outer circumferential side of the movable-body-side magnetic circuit (i.e., on the outer circumferential side of movable body 20) is not limited. Accordingly, the distance between the movable-body magnetic circuit and coils 61 and 62 does not increase, so that the efficiency in electromagnetic conversion is not reduced. Accordingly, it is possible to preferably increase the weight of movable body 20, so as to achieve a higher vibration output.

In addition, since spring retaining parts 22 and 24 have the function as a weight and the function of spring fixation, it is not necessary to assemble separate members respectively having these functions. Only by disposing spring retaining parts 22 and 24 in the movable-body-side magnetic circuit, the weight and the upper and lower leaf springs being elastic supporting parts 81 and 82 can be easily attached to movable body 20, so that the assemblability is enhanced.

Note that, while spring retaining parts 22 and 24 may be formed from a magnetic material, it is desirable that spring retaining parts 22 and 24 be formed from a non-magnetic material. When spring retaining parts 22 and 24 are formed from a non-magnetic material, no magnetic flux from movable-body core 41 flows upward and no magnetic flux from movable-body core 42 flows downward, so that it is possible to cause the magnetic flux to flow toward coils 61 and 62 located on the outer circumferential side of movable-body cores 41 and 42 efficiently.

Further, it is preferable that spring retaining parts 22 and 24 be formed from a material having a higher specific gravity (e.g., the specific gravity as high as about 16 to 19) than a material of a silicon steel plate or the like (the specific gravity of the steel plate is 7.70 to 7.98). For example, tungsten can be applied as the material of spring retaining parts 22 and 24. Thus, even when the outer dimensions of movable body 20 are set in a design or the like, it is possible to relatively easily increase the mass of movable body 20, so as to achieve a desired vibration output producing a sufficient tactile vibration for the user.

<Elastic Supporting Parts 81 and 82>

Elastic supporting parts 81 and 82 support movable body 20 such that the movable body freely reciprocates in the vibration direction with respect to fixing body 50.

Figure 10:
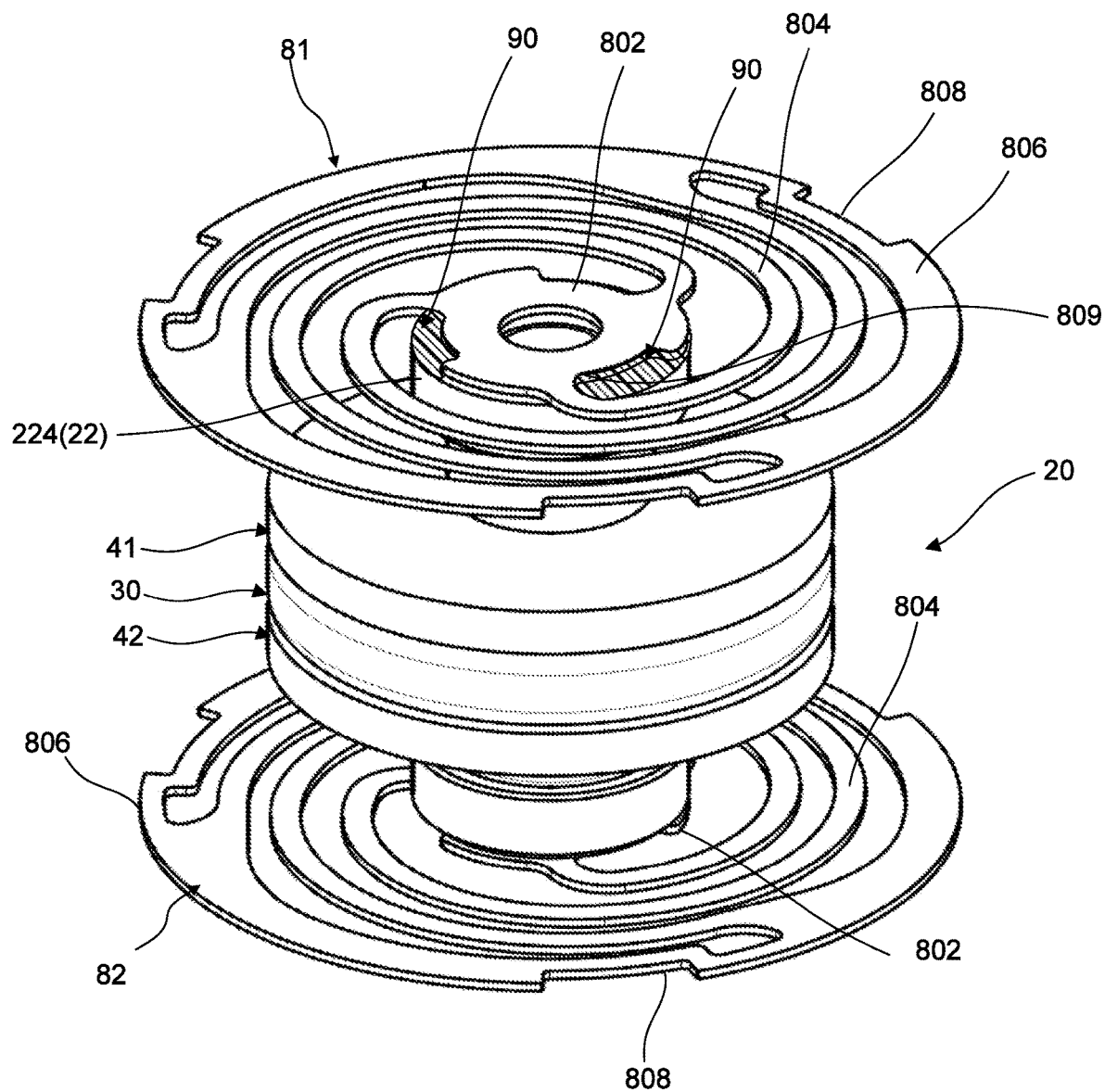
FIG. 10 is a perspective view of a movable body to which elastic supporting parts are joined.
Figure 11:
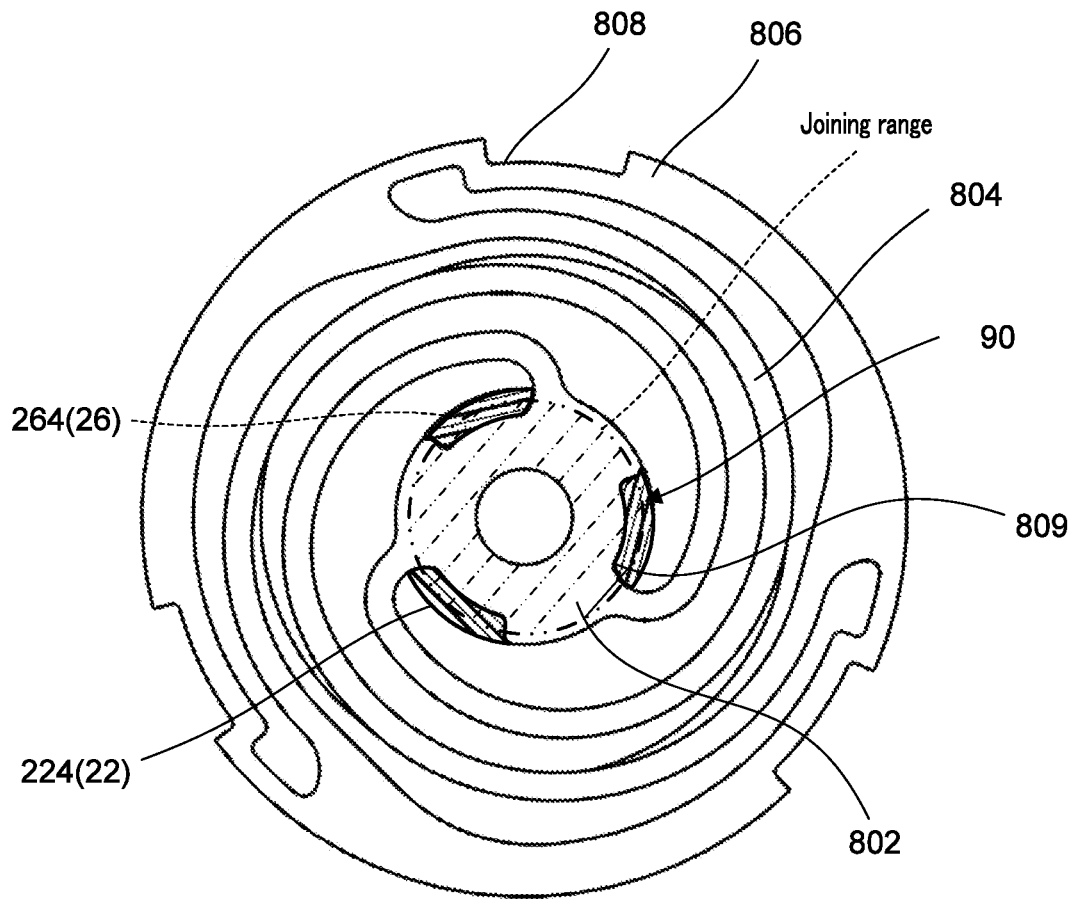
FIG. 11 is a plan view of a movable body to which elastic supporting parts are joined.

FIGS. 10 and 11 are a perspective view and a plan view of movable body 20 to which elastic supporting parts 81 and 82 are joined. As illustrated in FIGS. 2, 3, 5, 6, 10, and 11, elastic supporting parts 81 and 82 sandwich movable body 20 in the vibration direction of movable body 20 and are disposed on both movable body 20 and fixing body 50 to intersect the vibration direction.

Elastic supporting parts 81 and 82 are disposed to straddle between the opposite end portions of movable body 20 separate from each other in the vibration direction (upper and lower end portions) and the opening edge portions of fixing body 50 (coil bobbin part 52) disposed radially outward from the opposite end portions. In the present embodiment, elastic supporting parts 81 and 82 are disposed to extend in the direction orthogonal to the vibration direction and to face each other.

Inner circumferential portions 802 of elastic supporting parts 81 and 82 are fitted to the opposite end portions (spring fixation portions 224 and 244) of movable body 20 which are distant from each other in the axial direction (vibration direction). Further, outer circumferential fixing portion 806 side is attached to movable body 20 to protrude radially outward (in the radial direction). Elastic supporting parts 81 and 82 are a pair of elastic supporting parts for supporting movable body 20 such that movable body 20 is capable of reciprocating vibration in the vibration direction along the axial direction of magnet 30. Each of elastic supporting parts 81 and 82 is joined to fixing body 50 at an outer circumferential fixing portion (outer circumferential portion), and is joined to spring retaining part 22 or 24 at inner circumferential portion 802.

Elastic supporting parts 81 and 82 support movable body 20 such that movable body 20 does not make contact with fixing body 50 in the non-vibration state and the vibration state of movable body 20. Note that, during driving (vibration) of movable body 20, even when elastic supporting parts 81 and 82 makes contact with inner circumferential surface 522a of bobbin main-body portion 522 of movable body 20, the magnetic circuit (specifically, coils 61 and 62) is not damaged. Elastic supporting parts 81 and 82 may also be formed from any material as long as the elastic supporting parts elastically support movable body 20 such that the movable body is freely movable.

Since elastic supporting parts 81 and 82 have the same configuration in the present embodiment, elastic supporting part 81 will be mainly described below, and the description of elastic supporting part 82 will be appropriately omitted.

Elastic supporting parts 81 and 82 may be a non-magnetic material or a magnetic material (specifically, a ferromagnetic material). Elastic supporting parts 81 and 82 may be made using a stainless steel plate such as SUS304 or SUS316 when the elastic supporting parts are the leaf springs of a non-magnetic material. Further, when elastic supporting parts 81 and 82 are a magnetic material, a stainless steel plate such as SUS301 can be applied. It is known that a magnetic material (e.g., SUS301) is more durable and less expensive than a non-magnetic material (e.g., SUS304, SUS316) as a material of elastic supporting parts 81 and 82. In the present embodiment, elastic supporting parts 81 and 82 are formed of SUS301.

Elastic supporting parts 81 and 82 are a plurality of leaf springs, each of which has a flat plate shape in a normal state. Movable body 20 may be supported by three or more elastic supporting parts (leaf springs) 81 and 82. The plurality of leaf springs are attached to extend along the direction orthogonal to the vibration direction.

Each of elastic supporting parts 81 and 82 has such a shape that annular inner circumferential portion 802, which is a spring end portion situated on the inner side, and outer circumferential fixing portion 806, which is a spring end portion situated on the outer side, are joined to each other via deformation arm portions 804 that are elastically deformed and have an arc shape in plan view. In elastic supporting part 81, deformation of deformation arm portions 804 causes inner circumferential portion 802 to be displaced with respect to outer circumferential fixing portion 806 in the axial direction.

Elastic supporting parts 81 and 82 are formed by sheet metal processing using a stainless steel plate, and more specifically, are formed into thin flat disk-shaped whirl-shaped springs. Since elastic supporting parts 81 and 82 are flat plate-like, it is possible to improve the positional accuracy, that is, to improve the processing accuracy as compared with a conical spring.

In the plurality of elastic supporting parts 81 and 82, outer circumferential fixing portion 806 being one end of each of elastic supporting parts 81 and 82 on the outer circumferential side is fixed to fixing body 50 and inner circumferential portion 802 being the other end of each of elastic supporting parts 81 and 82 on the inner circumferential side is fixed to movable body 20 in the present embodiment such that the directions of the whirls of elastic supporting parts 81 and 82 are the same.

Inner circumferential portion 802 is formed in an annular plate shape. Inner circumferential portion 802 has a shape that is disposed on joining surfaces 224a and 244a of spring fixation portions 224 and 244. Inner circumferential portion 802 has, for example, an outer diameter substantially the same as the outer diameter of joining surfaces 224a and 244a.

Deformation arm portions 804 equally spaced from one another extend radially outward from the outer edge portion of inner circumferential portion 802 as illustrated in FIGS. 4, 5, 10, and 11, and recessed portions 809 are formed between deformation arm portions 804.

Each of recessed portions 809 forms a storage portion for storing an adhesive serving as a sealing part when forming sealing part 90, and forms a space for allowing the stored adhesive to penetrate into a gap at least on the side of one of the front and back surfaces of inner circumferential portion 802 where the adhesive makes contact with fixation pins 26 and 28.

Recessed portions 809 are formed by cutting out the outer edge portion of inner circumferential portion 802 at predetermined intervals to open radially outward. When recessed portions 809 are disposed in joining surfaces 224a and 244a, recessed portions 809 form, with joining surfaces 224a and 244a, recesses serving as storage portions. Sealing part 90 disposed in recessed portions 809 joins inner circumferential portions 802 to flanges 264 and 284 without any gap. Further, inner circumferential portions 802 and joining surfaces 224a and 244a are joined to each other without any gap.

Each of deformation arm portions 804 is elastically deformable, and is disposed between outer circumferential fixing portion 806 and inner circumferential portion 802. Deformation arm portions 804 are joined to outer circumferential fixing portion 806 at one end portion, and joined to inner circumferential portion 802 at the other end portion, and couple together outer circumferential fixing portion 806 and inner circumferential portion 802.

A plurality of deformation arm portions 804 are disposed in a spiral shape between inner circumferential portion 802 and outer circumferential fixing portion 806, with predetermined gaps being interposed in the circumferential direction. Each of deformation arm portions 804 is disposed to extend along the outer circumference of inner circumferential portion 802 to face the outer circumference of inner circumferential portion 802 in the radial direction with a gap being interposed in between.

As described above, a plurality of whirl-shaped leaf springs are used as the plurality of elastic supporting parts 81 and 82 in the present embodiment. Elastic supporting parts 81 and 82 are attached respectively to the opposite end portions of movable body 20 which are distant from each other in the vibration direction, and elastically support movable body 20 with respect to fixing body 50. Thus, when the movement amount of movable body 20 increases, the movable body slightly moves in a translational direction (here, the direction on a plane perpendicular to the vibration direction) while rotating. When the whirl directions of the plurality of leaf springs are opposite, the plurality of leaf springs move in a buckling direction or a pulling direction to each other, whereby smooth movement is prevented.

Elastic supporting parts 81 and 82 of the present embodiment are fixed to movable body 20 such that the whirl directions are the same. Thus, even when the movement amount of movable body 20 increases, elastic supporting parts 81 and 82 can move smoothly, i.e., can be deformed to produce a greater amplitude, so that the vibration output can be increased. However, depending on a desired vibration range of movable body 20, the whirl directions of the plurality of elastic supporting parts 81 and 82 may be designed to be opposite directions to each other.

Plate-like elastic supporting parts 81 and 82 are disposed on movable body 20 such that inner circumferential portions 802 of elastic supporting parts 81 and 82 are stacked respectively on spring fixation portions 224 and 244 forming the end portions of movable body 20 in the vibration direction.

As described above, inner circumferential portions 802 of elastic supporting parts 81 and 82 are strongly secured by press-fitting of fixation pins 26 and 28 into through holes 23. The inner circumferential portions are sandwiched between flanges 264 and 284 and spring fixation portions 224 and 244, and are firmly fixed via sealing part 90.

Meanwhile, outer circumferential fixing portion 806 of upper elastic supporting part 81 is, at the outside in the radial direction, fixed to the upper end portion of coil bobbin part 52. Specifically, outer circumferential fixing portion 806 of elastic supporting part 81 is fixed to a portion of annular upper end surface 527a of upper flange portion 527 forming the upper end portion of coil bobbin part 52 (see FIG. 2), the portion being other than movable-range forming parts 54. Details of the configuration of coil bobbin part 52 will be described later.

Outer circumferential fixing portion 806 of elastic supporting part 81 is clamped and fixed by annular upper end surface 527a of flange portion 527 and pressing portion 128 of lid portion 12 within case 10. Note that, upper end surface 527a means an upper (one-side) end surface of the portion of the upper side (one side) of upper (one-side) flange portion 527 other than movable-range forming parts 54.

Further, outer circumferential fixing portion 806 of lower elastic supporting part 82 is fixed to the lower end portion of coil bobbin part 52 at the outside of movable body 20 in the radial direction in vibration actuator 1. Specifically, outer circumferential fixing portion 806 of elastic supporting part 82 is fixed to a portion of annular lower end surface 528a of lower flange portion 528 forming the lower end portion of coil bobbin part 52, the portion being other than movable-range forming parts 54.

Outer circumferential fixing portion 806 of elastic supporting part 82 is clamped and fixed by annular lower end surface 528a of flange portion 528 and step portion 118 formed on a circumferential edge portion of bottom portion 114 within case 10. Note that, lower end surface 528a means an upper (other-side) end surface of the portion of the lower side (other side) of lower (other-side) flange portion 528 other than movable-range forming parts 54.

Outer circumferential fixing portions 806 are formed in an annular shape. The outer circumferential portions of the outer circumferential fixing portions are sandwiched between upper and lower end surfaces 527a and 528a of coil bobbin part 52 (see FIG. 2) and pressing portion 128 and step portion 118. With this configuration, outer circumferential fixing portions 806 are fixed to fixing body 50. Further, damping parts 72 are attached to the inner circumferential portions of outer circumferential fixing portions 806. Damping parts 72 will be described later.

<Sealing Part 90>

In case that there are gaps between inner circumferential portions 802 and spring fixation portions 224 and 244 and between inner circumferential portions 802 and fixation pins 26 and 28, sealing part 90 seals the gaps. The gaps between inner circumferential portions 802 and spring fixation portions 224 and 244, and the gaps between inner circumferential portion 802 and fixation pins 26 and 28 mean gaps between movable body 20 and elastic supporting parts 81 and 82. The gaps between movable body 20 and elastic supporting parts 81 and 82 mean gaps partly exposed to the outside at the joint portions between movable body 20 and elastic supporting parts 81 and 82. Further, sealing the gaps means that a gap formed at a boundary between joint portions of two objects to be sealed is completely covered so as not to be exposed to the outside. At this time, it is preferable that the joint portion of two members to be sealed be brought into a solid state without any gap such that the joint portion is filled with the members or sealing part 90. In the present embodiment, sealing the gaps between movable body 20 and elastic supporting parts 81 and 82 is to join movable body 20 to elastic supporting parts 81 and 82 such that there is no gap exposed to the outside.

Figure 12:
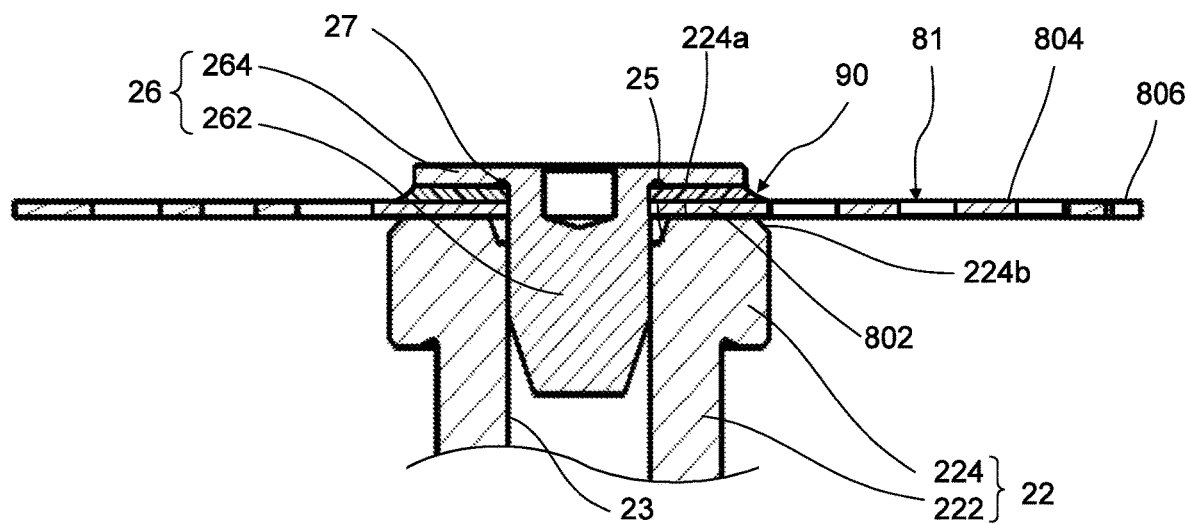
FIG. 12 is a partial sectional view of a section taken along line A-A in FIG. 5.
Figure 13:
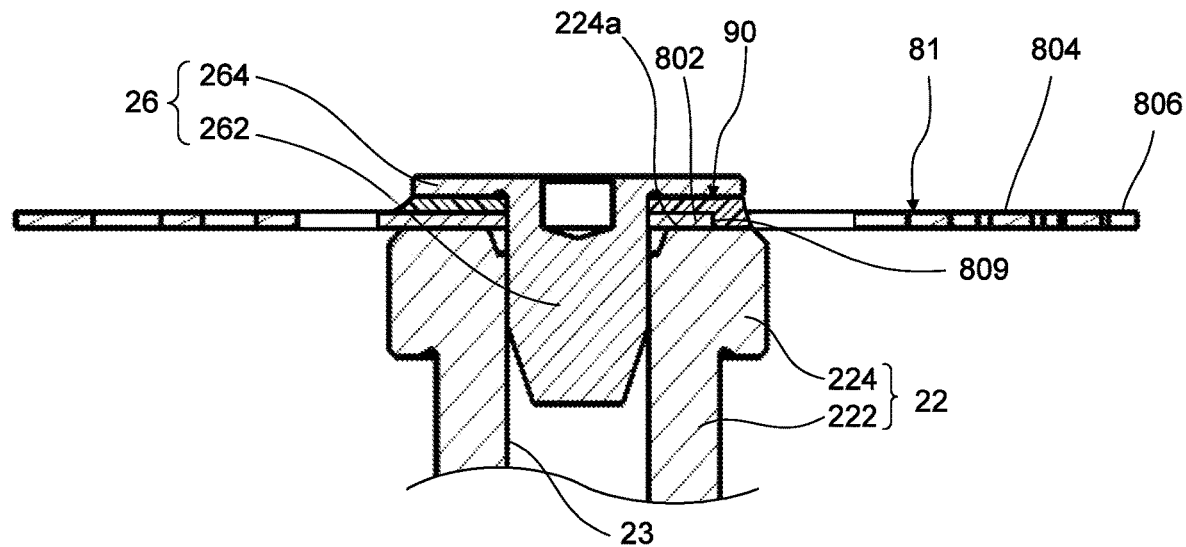
FIG. 13 is a partial sectional view taken along line B-B in FIG. 5.

FIG. 12 is a partial sectional view of the joint portion between the upper spring retaining part and the elastic supporting part taken along line A-A in FIG. 5, and FIG. 13 is a partial sectional view taken along line B-B in FIG. 5.

Sealing part 90 illustrated in FIGS. 12 and 13 is disposed between elastic supporting part 81 and fixation pin 26, and joins elastic supporting part 81 to fixation pin 26 while sealing them without any gap. Although not illustrated, sealing part 90 is disposed between elastic supporting part 82 and fixation pin 28, and joins elastic supporting part 82 to fixation pin 28 in a sealed state without any gap.

Sealing part 90 may be formed of, for example, a material that allows welding, bonding, caulking, or the like, or may be formed by combining these materials as appropriate.

Sealing part 90 is made of various adhesives or the like. It is preferable that sealing part 90 be made of, for example, a thermosetting, UV-curable, or anaerobic adhesive, or a curable and anaerobic adhesive by combining any of them.

When the adhesive has the thermosetting property, curing in an assembly process becomes easy, and improvement in assemblability can be achieved. Further, when the adhesive has the UV curability, curing can be performed in a short time, and the working time can be shortened. Further, when the adhesive has the anaerobic property and when there is a gap at a place where the adhesive is applied, it is possible to easily join a portion of the adhesive having entered into the gap. As described above, when the adhesive forming sealing part 90 has the UV curability and anaerobic property, the adhesive disposed inside and outside the gap can be easily and reliably cured and can close the gap. Additionally, it is possible to reduce the cost and improve the assemblability.

At one end portion of spring retaining part 22 (the upper end portion), sealing part 90 is disposed in recessed portions 809 in elastic supporting part 81 to fill recessed portions 809. That is, sealing part 90 is disposed in a solid state so as to fill the insides of recessed portions 809 and the gaps between elastic supporting part 81 and fixation pin 26. The sealing part achieves tight joining of each part with which the sealing part makes contact. Thus, it is possible to firmly join fixation pin 26 and spring retaining part 22 sandwiching elastic supporting part 81.

For example, sealing part 90 is made of an adhesive having the thermosetting property or UV curability and having the anaerobic property or the like. In this case, sealing part 90 can be formed after inner circumferential portion 802 of elastic supporting part 81 is sandwiched between one end portion (the upper end portion) of spring retaining part 22 and fixation pin 26, and fixed by press-fitting pin body 262 (282) to through hole 23. Specifically, when the adhesive is applied to recessed portions 809 above spring retaining part 22, the adhesive is applied and spread from recessed portions 809 to both sides of the front and back surfaces of inner circumferential portion 802 by a capillary phenomenon from the insides of recessed portions 809. That is, the adhesive penetrates and fills the gaps between inner circumferential portion 802 and flange 264 and the gaps between inner circumferential portion 802 and joining surface 224a. In FIG. 11, the range of penetration of sealing part 90 by the capillary phenomenon is illustrated as a joining range in which the sealing part is joined to fixation pin 26. At this time, the adhesive may fill annular groove 27. Sealing part 90, which is an adhesive, is disposed in a state in which the gaps are completely buried.

Thus, via sealing part 90, elastic supporting part 81 and spring retaining part 22, and elastic supporting part 81 and fixation pin 26 are joined to each other in a so-called sealed state. Note that, in the structure including sealing part 90, elastic supporting part 82, spring retaining part 24, and fixation pin 28, joining is performed similarly without any gap.

According to vibration actuator 1, the gaps between elastic supporting parts 81 and 82 being leaf springs and movable body 20 (mainly spring retaining parts 22 and 24 and fixation pins 26 and 28) are sealed via sealing part 90. Thus, it is possible to move movable body 20 without noise being generated. Vibration actuator 1 can realize a vibration of high output with high quietness and stability. Further, it is possible to make it less likely for a coupling state of the movable body and elastic supporting parts 81 and 82 to be weakened due to aging via the gaps due to the movement of movable body 20 and the deformation of elastic supporting parts 81 and 82 during vibration, and it is possible to prevent a driving noise generated by mutual contact.

Further, sealing part 90 can externally seal the gaps among spring retaining parts 22 and 24, elastic supporting parts 81 and 82, and fixation pins 26 and 28 which are secured to one another. As a result, sealing part 90 can reliably fill the gaps and suppress variations in the joint portion due to the manufacturing process.

Sealing part 90 is disposed by applying an adhesive to recessed portions 809. Thus, it is possible to stabilize the application position of the adhesive and to form sealing part 90 by causing a sufficient application amount of adhesive to penetrate and fill the gaps between elastic supporting parts 81 and 82 and fixation pins 26 and 28 from recessed portions 809. As a result, sealing part 90 can reliably seal the gaps between the joint portions between elastic supporting parts 81 and 82 and movable body 20.

Figure 14:
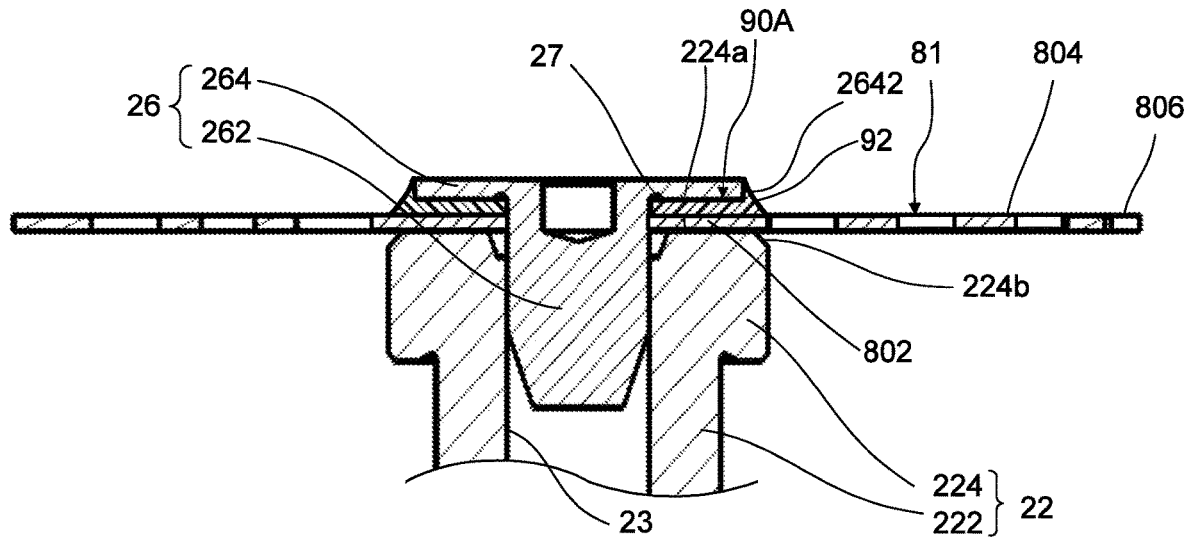
FIG. 14 is a diagram illustrating Variation 1 of a joint structure of an elastic supporting part and a movable body.
Figure 15:
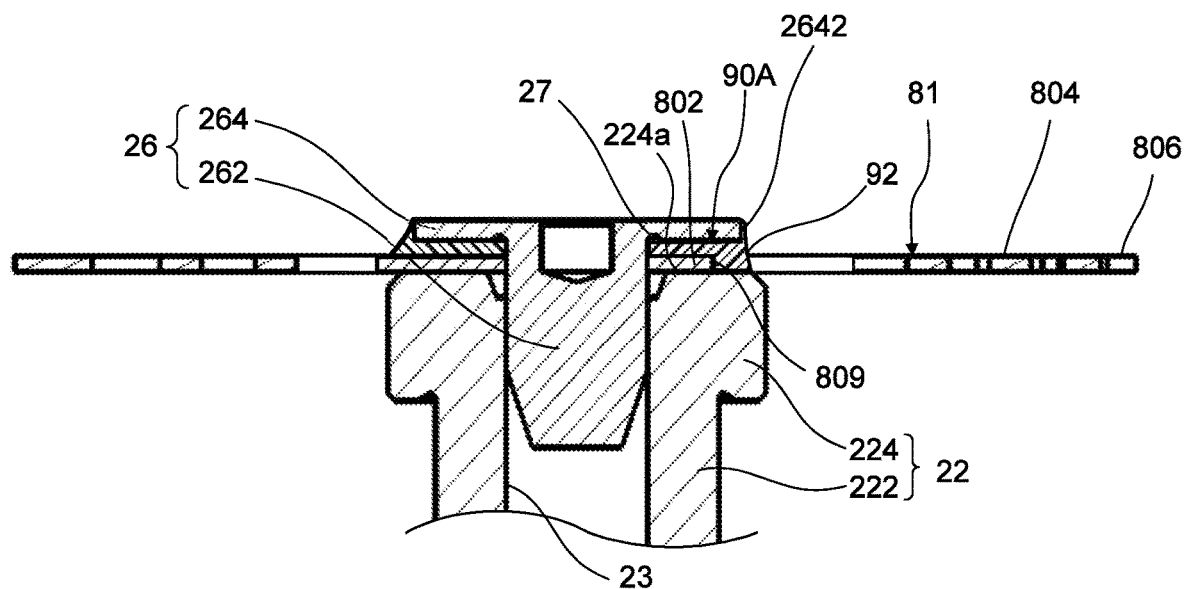
FIG. 15 is a diagram illustrating Variation 1 of the joint structure of the elastic supporting part and the movable body.

FIGS. 14 and 15 are diagrams illustrating Variation 1 of the joint structure of the elastic supporting part and the movable body. FIG. 14 corresponds to the figure illustrated in FIG. 12, and FIG. 15 corresponds to the portion illustrated in FIG. 13.

As illustrated in FIGS. 14 and 15, sealing part 90A may also be disposed in the joint portion between spring retaining part 22, elastic supporting part 81, and fixation pin 26 from elastic supporting part 81 to the upper end (upper edge of flange 264) of fixation pin 26.

Specifically, sealing part 90A includes outer circumferential surface 92 covering outer circumferential surface 2642 of flange 264 (the side surface of the upper end portion of fixation pin 26) as well as the gaps between elastic supporting part 81 and flange 264 of fixation pin 26. Sealing part 90A is disposed in a fillet shape, and outer circumferential surface 92 is a fillet-shaped surface curved concavely.

As illustrated in FIG. 15, a portion of sealing part 90A disposed in recessed portions 809, extends on the outer circumferential surface 2642 side of fixation pin 26 in the axial direction, and covers outer circumferential surface 2642. Therefore, the portion of sealing part 90A in recessed portions 809 is disposed to straddle between joining surface 224a of spring retaining part 22 and outer circumferential surface 2642 of flange 264 of fixation pin 26, and closes the gaps between elastic supporting part 81, fixation pin 26, and spring retaining part 22. Note that, the gaps between elastic supporting part 82, fixation pin 28, and spring retaining part 24 are also closed by the same sealing part as sealing part 90A. Thus, it is possible to obtain the same effects as the effects obtained by sealing part 90.

Figure 16:
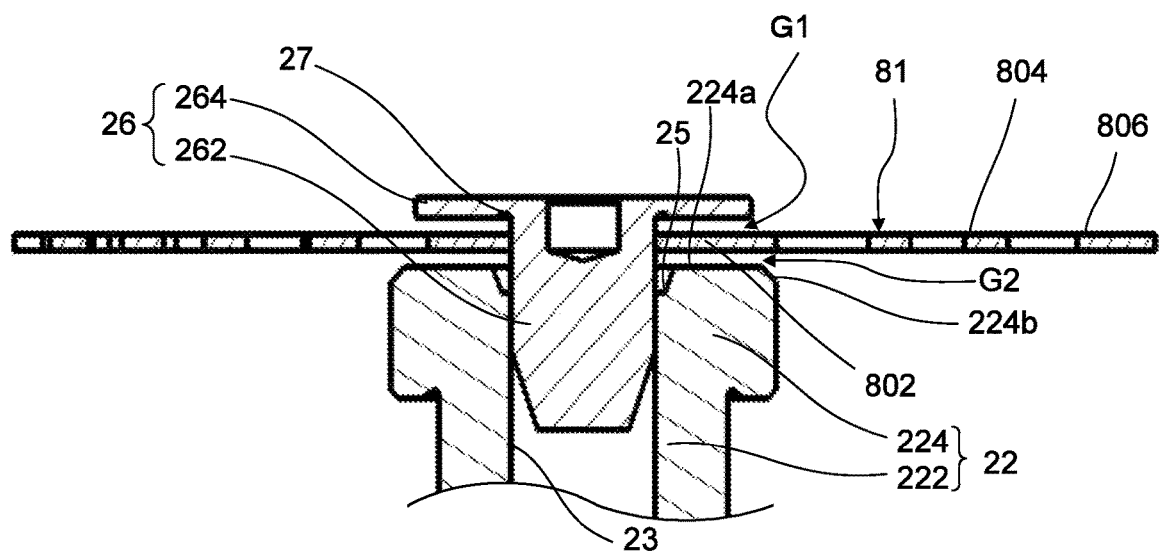
FIG. 16 is an explanatory view of Variation 2 of the joint structure of the elastic supporting part and the movable body.
Figure 17:
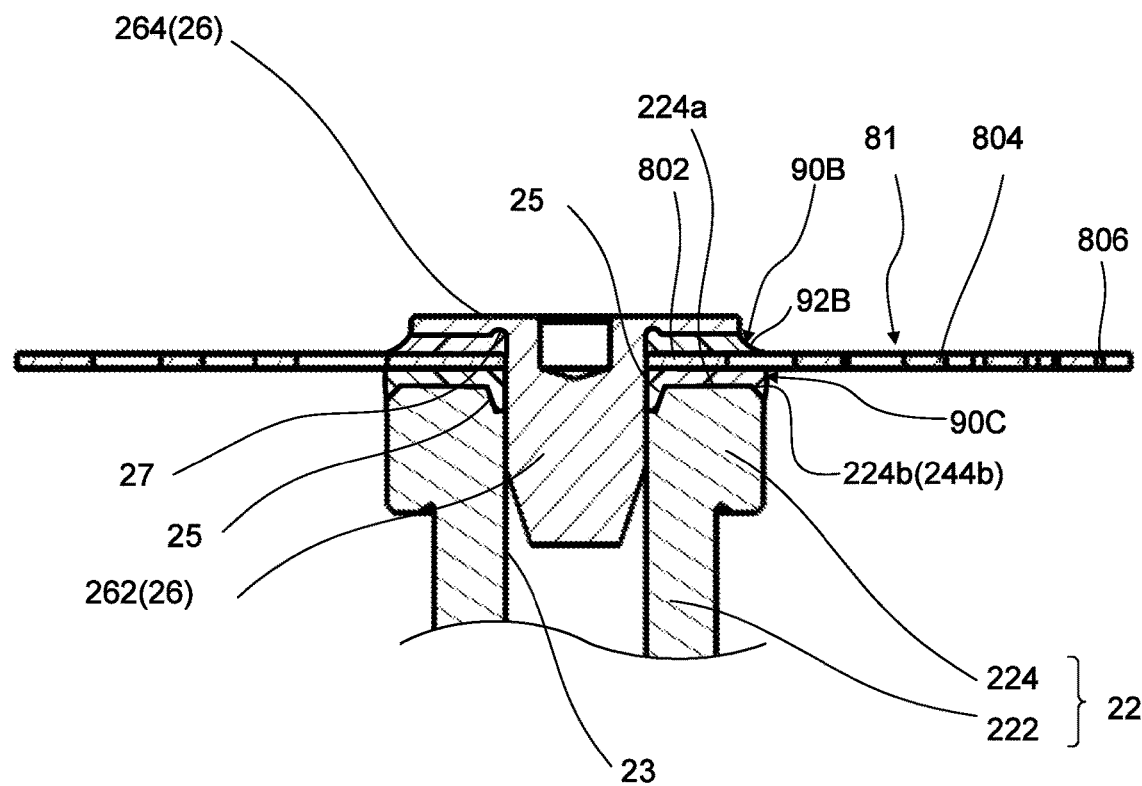
FIG. 17 is an explanatory view of Variation 2 of the joint structure of the elastic supporting part and the movable body.

FIGS. 16 and 17 are explanatory views of Variation 2 of the joint structure of the elastic supporting part and the movable body. As illustrated in FIG. 16, in vibration actuator 1, in addition to gap G1 between inner circumferential portion 802 of elastic supporting part 81 and fixation pin 26, gap G2 may be generated between inner circumferential portion 802 and joining surface 224a of spring retaining part 22. When such gap G2 is present, elastic supporting part 81 and movable body 20 are sealed without any gap by sealing parts 90B and 90C as illustrated in FIG. 17.

Sealing part 90B is the same as sealing part 90 of the present embodiment and is disposed in gap G1 between fixation pin 26 and elastic supporting part 81 (inner circumferential portion 802). Sealing part 90B completely closes gap G1 between fixation pin 26 and elastic supporting part 81, and joins both of them together. Sealing part 90B is also disposed in annular groove 27. Note that, outer surface 92B of sealing part 90B between elastic supporting part 81 and fixation pin 26 is curved concavely.

Sealing part 90C is disposed in gap G2 between, on one hand, elastic supporting part 81 (inner circumferential portion 802) and, one the other hand, joining surface 224a of spring retaining part 22 and outer circumferential surface (chamfered portion) 224b of joining surface 224a.

Sealing part 90C is disposed in a gap between spring retaining part 22 and elastic supporting part 81 (inner circumferential portion 802) in a solid state, fills gap G2, and joins elastic supporting part 81 (inner circumferential portion 802) to spring retaining part 22 without any gap.

Each of sealing parts 90B and 90C is formed, for example, by sandwiching and fixing elastic supporting part 81 (inner circumferential portion 802) between spring retaining part 22 and fixation pin 26, and then filling, with an adhesive, spaces between spring retaining part 22 and fixation pin 26 that sandwich elastic supporting part 81 including recessed portions 809. The adhesive that fills recessed portions 809 penetrates on both sides between elastic supporting part 81 and each of flange 264 of fixation pin 26 and joining surface 224a to fill the recessed portions. At the spring retaining part 22 side, the adhesive penetrates to recess forming portion 25, and accumulates in recess forming portion 25. Then, the adhesive is cured, whereby elastic supporting part 81, fixation pin 26, and spring retaining part 22 are sealed without any gap.

Between elastic supporting part 81 and spring retaining part 22, an adhesive fills a space between outer circumferential surface 224b and recess forming portion 25 in addition to between the back surface of elastic supporting part 81 (inner circumferential portion 802) and joining surface 224a. Thus, sealing part 90C has a configuration in which the thickness between a portion of each of outer circumferential surface 224b and recessed-portion forming portion 25 and inner circumferential portion 802 is greater than the thickness of a portion between joining surface 224a and inner circumferential portion 802. Thus, sealing parts 90B and 90C make it possible to firmly join elastic supporting part 81 and spring retaining part 22 while sealing them.

Thus, sealing parts 90B and 90C can externally seal the gaps between spring retaining parts 22 and 24, elastic supporting parts 81 and 82, and fixation pins 26 and 28 which are fixed to one another. Therefore, it is possible to securely fill the gaps between spring retaining parts 22 and 24, elastic supporting parts 81 and 82, and fixation pins 26 and 28, and to suppress variations in the joint portion due to the manufacturing process. When the adhesive serving as sealing parts 90B and 90C is applied to recessed portions 809, the adhesive permeates and fills the gaps between elastic supporting parts 81 and 82, fixation pins 26 and 28, and spring retaining parts 22 and 24 from recessed portions 809 at a time. As a result, the gaps on the front and back surface sides of elastic supporting parts 81 and 82 are reliably sealed. Thus, at the joint portion between movable body 20 and elastic supporting parts 81 and 82, it is possible to fill the gaps more reliably, and stable and quiet driving over a long period of time becomes possible.

Figure 18:
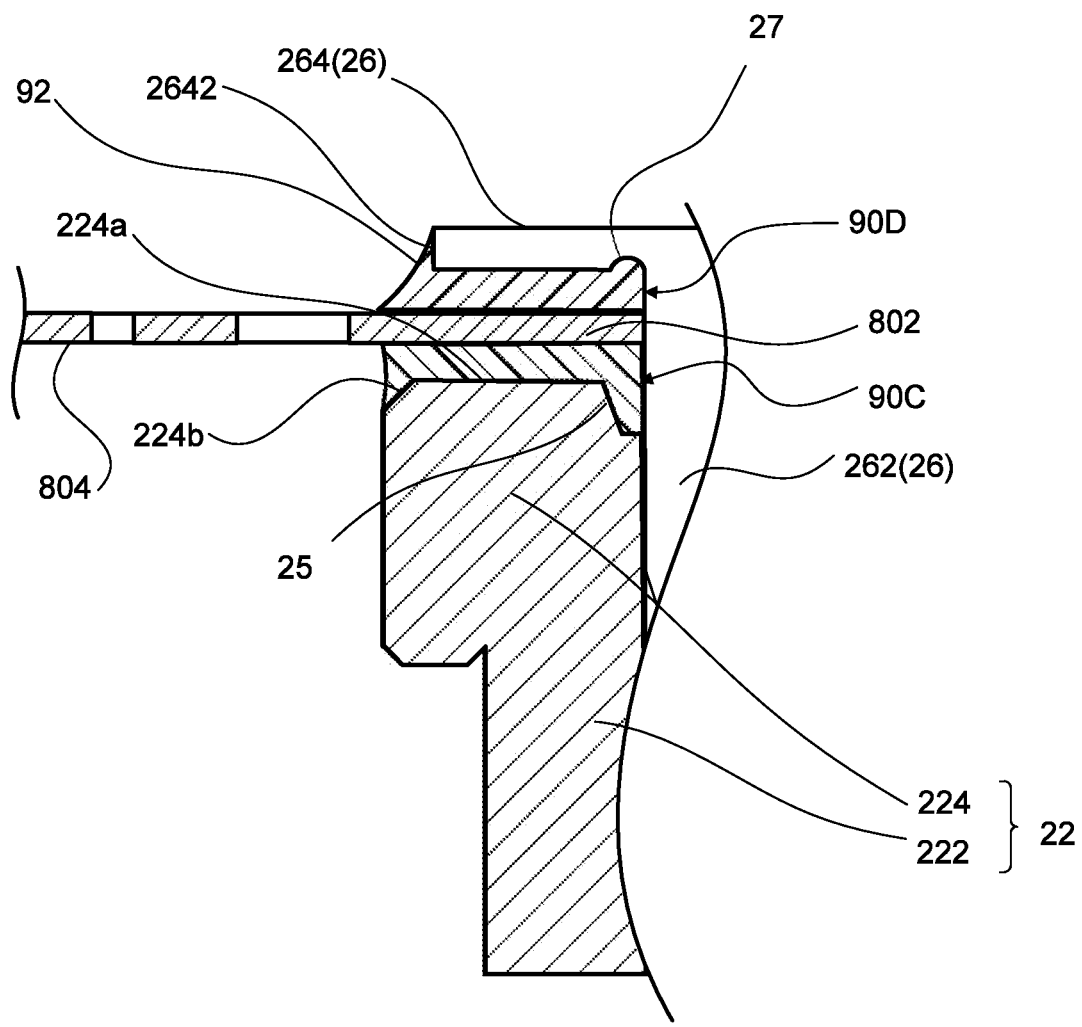
FIG. 18 is a partially enlarged view illustrating a sealing part in Variation 3 of the joint structure of the elastic supporting part and the movable body.

FIG. 18 is a partially enlarged view illustrating Variation 3 of the joint structure of elastic supporting part 81 and movable body 20. As illustrated in FIG. 18, gaps are formed on the front and back sides of inner circumferential portion 802 of elastic supporting part 81 and fixation pin 26. In the structure in which sealing parts 90C and 90D are disposed in the gaps, sealing part 90D has outer circumferential surface 92 covering outer circumferential surface 2642 of fixation pin 26 (in particular, of flange 264). Thus, firm joining to flange 264 results. It is thus possible to join elastic supporting part 81 and fixation pin 26 to each other.

Figure 19:
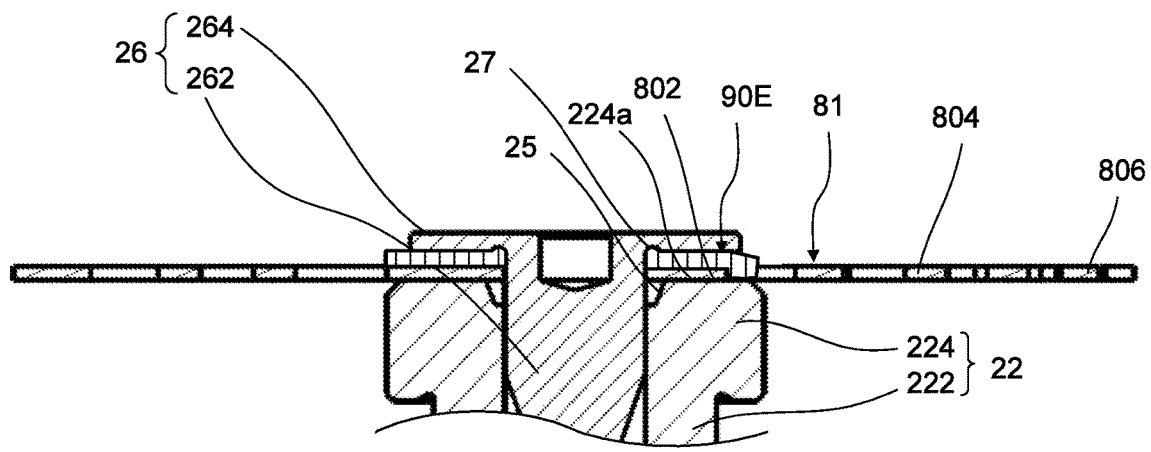
FIG. 19 is an explanatory view of Variation 4 of the joint structure of the elastic supporting part and the movable body.

FIG. 19 is an explanatory view of Variation 4 of the joint structure of the elastic supporting part and the movable body. In the joint structure illustrated in FIG. 19, sealing part 90 (see FIGS. 12 and 14) disposed in the gaps between elastic supporting part 81 and fixation pin 26 (flange 264) is made of elastomer 90E. Elastomer 90E functions as a sealing part, and closes and seals a gap between elastic supporting part 81 and fixation pin 26 (flange 264). Elastomer 90E may be pressed and deformed when elastic supporting part 81 is sandwiched between spring retaining part 22 and fixation pins 26, and may penetrate into annular groove 27.

Figure 20:
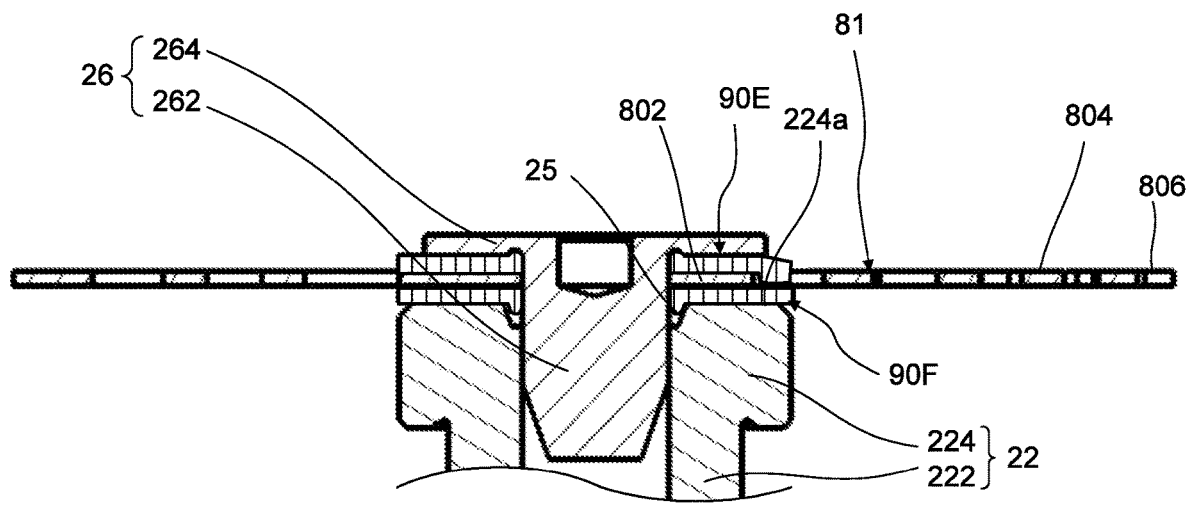
FIG. 20 is an explanatory view of Variation 5 of the joint structure of the elastic supporting part and the movable body.

FIG. 20 is an explanatory view of Variation 5 of the joint structure of the elastic supporting part and the movable body. In the joint structure illustrated in FIG. 20, when there are gaps (see FIGS. 13 and 15) between elastic supporting part 81 and spring retaining part 22 in addition to between elastic supporting part 81 and fixation pin 26 (flange 264), elastomers 90E and 90F are disposed in the gaps. Elastomers 90E and 90F are disposed in the gaps and are elastically deformed. Accordingly, elastic supporting part 81, fixation pin 26 (flange 264), and spring retaining part 22 are sealed without any gap.

<Fixing Body 50>

As illustrated in FIG. 2, fixing body 50 holds coils 61 and 62, and supports, via elastic supporting parts 81 and 82, movable body 20 inside coils 61 and 62 in the radial direction such that movable body 20 is freely movable in the vibration direction (the coil-axis direction, the axial direction of movable body 20).

Fixing body 50 includes case 10, coils 61 and 62, coil bobbin part 52, and electromagnetic shield part 58. The coil assembly is composed of coils 61 and 62 and coil bobbin part 52. In the present embodiment, vibration actuator 1 is configured by connecting, to the coil assembly, substantially all components for generating vibrations such as movable body 20 and case 10 via elastic supporting parts 81 and 82.

Figure 21:
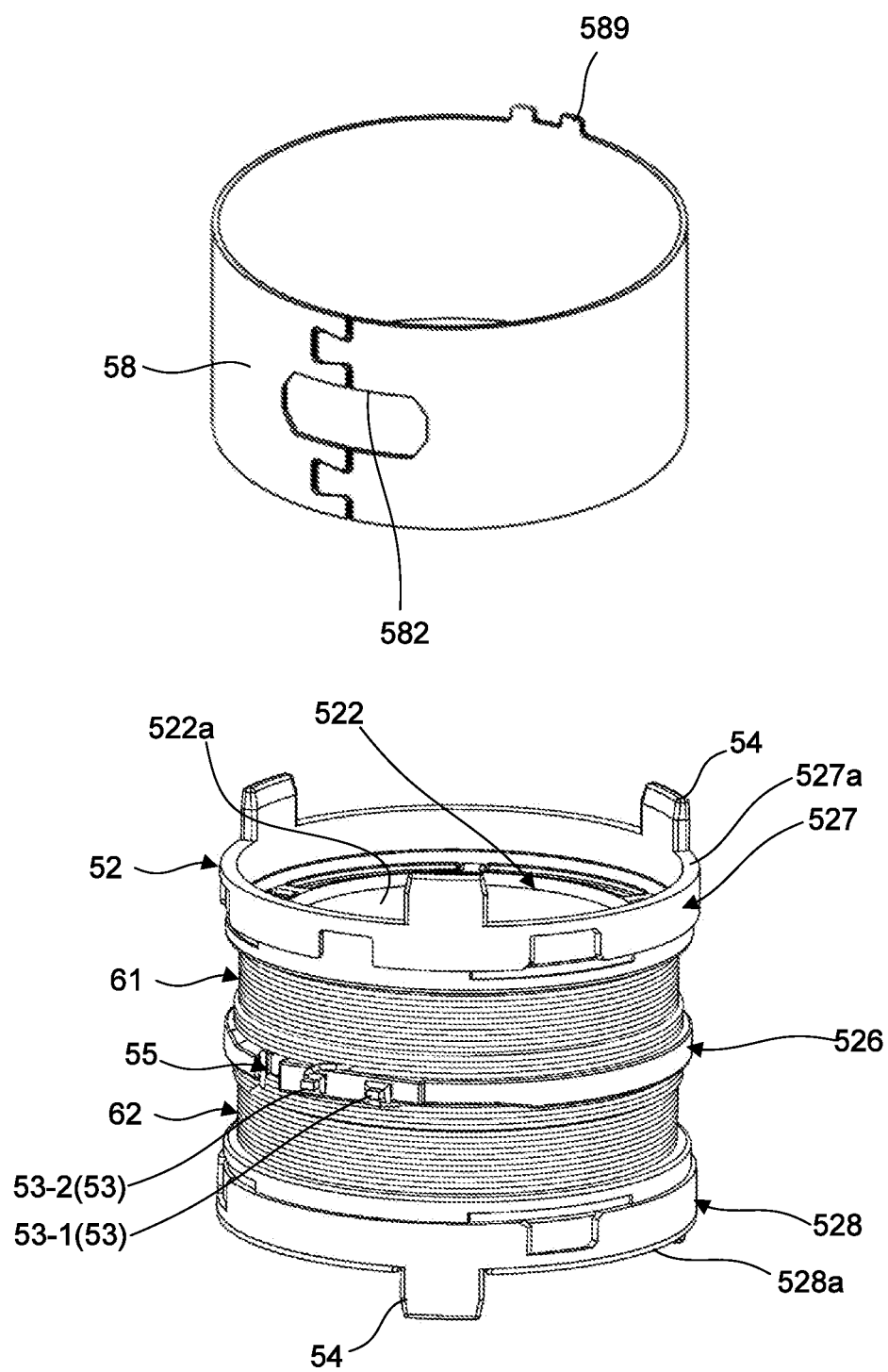
FIG. 21 illustrates a coil assembly with an electromagnetic shield part detached.
Figure 22:
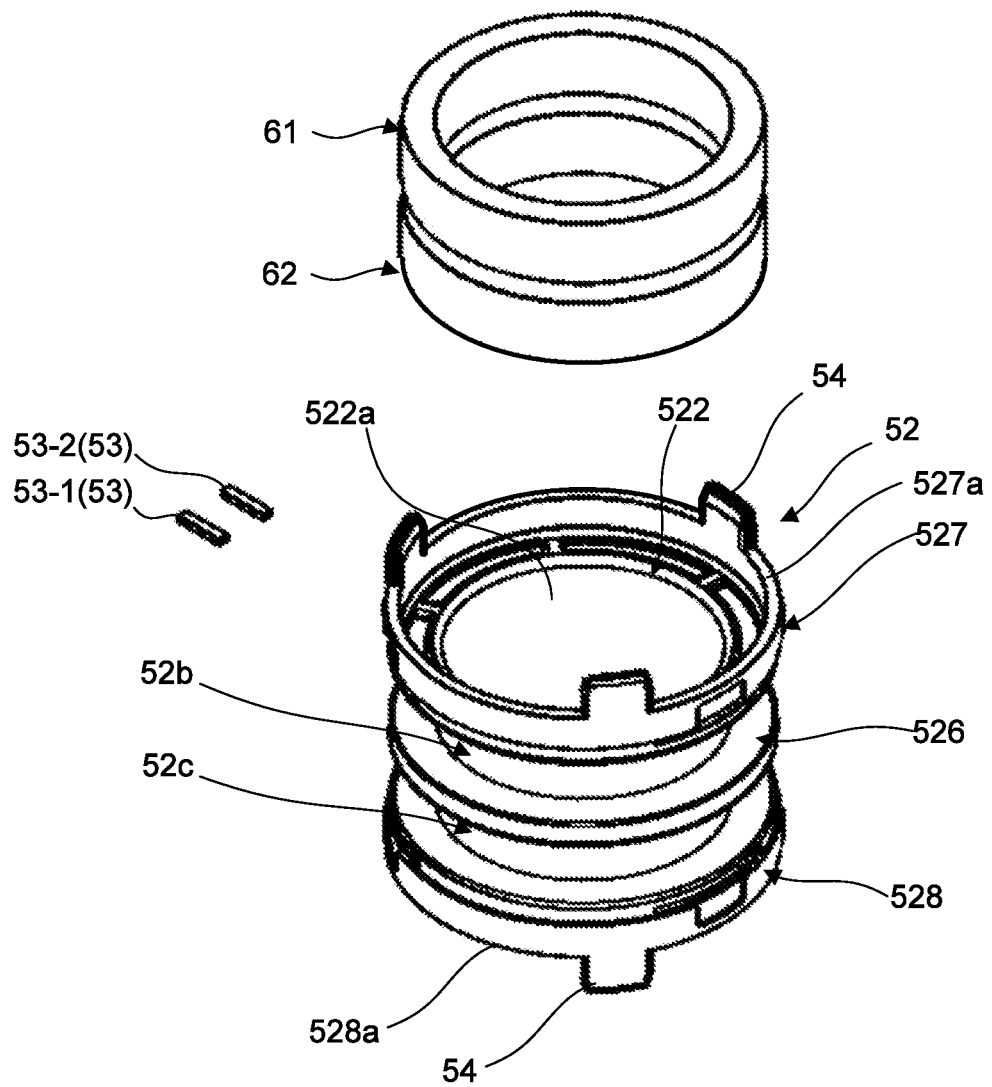
FIG. 22 is an exploded view of the coil assembly.

FIG. 21 illustrates a coil assembly with an electromagnetic shield part detached, and FIG. 22 is an exploded view of the coil assembly. As illustrated in FIGS. 2 and 21, coil bobbin part 52 holds coils 61 and 62 wound on the outer circumferential surface the coil bobbin part, surrounds magnet 30 by inner circumferential surface 522a, and guides the movement of movable body 20 including magnet 30.

Coil bobbin part 52 is a cylindrical body formed from a resin such as a phenolic resin, poly butylene terephthalate (PBT), or the like. In the present embodiment, coil bobbin part 52 is formed from a material containing a phenolic resin such as Bakelite having high flame retardancy.

When coil bobbin part 52 is formed from a material containing a phenolic resin, a higher flame retardancy is obtained, so that it is possible to improve the safety at the time of driving even when heat is generated by Joule heat when a current flows through coils 61 and 62 held by coil bobbin part 52. Moreover, the dimensional accuracy is increased and the positional accuracy of coils 61 and 62 is increased accordingly, so that it is possible to reduce variations in vibration characteristics.

Coil bobbin part 52 illustrated in FIGS. 2, 21, and 22 includes cylindrical bobbin main-body portion 522, middle flange portion 526 and flange portions 527 and 528 protruding from the outer circumference of bobbin main-body portion 522 in the radial direction, terminal tying parts (coil connection parts) 53, movable-range forming parts 54, and linking groove portion 55.

Coils 61 and 62 are wound around coil bobbin part 52. Coils 61 and 62 are covered by electromagnetic shield part 58. Note that, terminal tying parts (coil connection parts) 53 may also be illustrated and described as terminal tying parts (coil connection parts) 53-1 and 53-2, for convenience.

Bobbin main-body portion 522 functions as a protective wall portion for protecting coils 61 and 62 against collision by movable body 20 when movable body 20 disposed inside is being driven. The thickness of bobbin main-body portion 522 is a thickness that gives such a strength that coils 61 and 62 on the outer circumferential side are not affected at all even when moving movable body 20 makes contact with bobbin main-body portion 522.

Coils 61 and 62 are disposed on the outer circumferential side of bobbin main-body portion 522 between middle flange portion 526 and flange portions 527 and 528 (coil attachment portions 52b and 52c) in such a manner as to be laid side-by-side in the coil-axis direction and to surround the outer circumferential surfaces of movable-body cores 41 and 42 of movable body 20 (the outer circumferential surface of magnet 30 and movable-body cores 41 and 42).

Specifically, recessed coil attachment portions 52b and 52c that are demarcated by middle flange portion 526 and flange portions 527 and 528 and that open radially outward on the outer circumferential side are disposed on and in the outer circumferential surface of bobbin main-body portion 522.

Terminal tying parts 53 function as a connector connection portion to which the coil winding of coils 61 and 62 is tied for connection to an external device as illustrated in FIGS. 21 and 22. Coils 61 and 62 are connected to the external device via terminal tying parts 53 and power is supplied to coils 61 and 62.

Terminal tying parts 53 are electrically conductive members disposed to protrude from the outer circumferential portion of bobbin main-body portion 522. In the present embodiment, terminal tying parts 53 are press-fitted to the outer circumferential surface of middle flange portion 526 disposed on the outer circumference of coil bobbin main-body portion 522 centrally in the vibration direction. Terminal tying parts 53 are thus disposed to protrude from the outer circumferential surface of middle flange portion 526.

Flange portions 527 and 528 are disposed respectively on opposite end portions of bobbin main-body portion 522 which are separate from each other in the axial direction of the bobbin main-body portion (which is also the vibration direction and the upper-lower direction in the present embodiment), so as to form the upper and lower end portions of coil bobbin part 52.

Elastic supporting parts 81 and 82 are fixed to end portions of flange portions 527 and 528 on the sides away from middle flange portion 526 (upper and lower end portions in the present embodiment).

Movable-range forming parts 54 are disposed on the upper and lower end portions of coil bobbin part 52, and form a vibration range between lid portion 12 and bottom portion 114 of case 10 and movable body 20 when coil bobbin part 52 is accommodated in case 10.

Movable-range forming parts 54 are protruding side portions that are formed to protrude from each of flange portions 527 and 528 in the vibration direction (upper-lower direction). Movable-range forming parts 54 are disposed at predetermined intervals on upper and lower annular end surfaces (also referred to as "upper end surface and lower end surface" or "opening end surfaces") 527a and 528a of flange portions 527 and 528. Upper end surface 527a is an opening end surface on one side, and lower end surface 528a is an opening end surface on the other side.

Flange portion 527 includes, at one opening end surface, movable-range forming parts 54 in the form of projections protruding in the vibration direction. The one opening end surface functions as a top surface receiving portion for receiving lid portion 12 via movable-range forming parts 54. Flange portion 528 includes, at the other opening end surface, movable-range forming parts 54 in the form of projections protruding in the vibration direction. The other opening end surface functions as a bottom receiving portion for receiving bottom portion 114 through movable-range forming parts 54.

Further, movable-range forming parts 54 are fitted into positioning grooves 808 formed in elastic supporting parts 81 and 82 as illustrated in FIGS. 3 and 4, to perform radial positioning of elastic supporting parts 81 and 82. Each of movable-range forming parts 54 as seen in the axial direction is formed in an arc shape that has a predetermined thickness in the radial direction and a length longer in the circumferential direction than in the radial direction. Positioning grooves 808 are formed correspondingly to the shape of movable-range forming parts 54.

Movable-range forming parts 54 are fitted in positioning grooves 808. Accordingly, it is possible to uniformly set the attachment positions of elastic supporting parts 81 and 82 with respect to coil bobbin part 52 of each individual driving unit 13, so as to perform stable position determination of elastic supporting parts 81 and 82 with respect to coil bobbin part 52. Further, with respect to coil bobbin part 52, elastic supporting parts 81 and 82 are not fixed to the fixing body side via a plurality of components. Thus, with a structure less susceptible to component tolerances, movement in the circumferential direction and the radial direction such as rotation is restricted. It is possible to suppress variations in elastic supporting parts 81 and 82 in products, and to achieve stable characteristics.

Movable-range forming parts 54 are disposed at equal intervals about the axis of coil bobbin part 52. Further, movable-range forming parts 54 receive elastic supporting parts 81 and 82 via positioning grooves 808. Accordingly, being caught and friction of movable body 20 during insertion of the movable body into coil bobbin part 52 become less likely. It is possible to perform position determination of movable body 20 and coil bobbin part 52 with excellent assemblability. In the present embodiment, movable-range forming parts 54 are disposed at three places at equal intervals about the axis of coil bobbin part 52, but may also be disposed at three or more places.

Coil bobbin part 52 is accommodated in case 10 such that movable-range forming parts 54 at the upper and lower end surfaces are in contact with the edge portion of lid portion 12 and the edge portion of bottom portion 114, and is fixed to the edge portion of lid portion 12 and the edge portion of bottom portion 114.

Flange portions 527 and 528 include positioning engagement portions 529 (see FIG. 3) for position determination of the electromagnetic shield part, which are engaged with electromagnetic shield part 58. Positioning engagement portions 529 are recessed grooves that open toward central flange portion 526 in the outer circumferential portions of respective flange portions 527 and 528, and are engaged with protruding engaged portions 589 in the present embodiment. This engagement makes it possible to dispose electromagnetic shield part 58 without any shift with respect to coils 61 and 62 wound around coil bobbin part 52, so as to achieve stable magnetic properties.

<Coil>

In vibration actuator 1, coils 61 and 62, together with magnet 30 and movable-body cores 41 and 42, are used for generating a drive source of vibration actuator 1, in which case the axial direction of coils 61 and 62 (magnetization direction of magnet 30) is the vibration direction. Coils 61 and 62 are disposed radially outside movable body 20. Coils 61 and 62 are energized during driving (during vibration), and, together with magnet 30, form a voice coil motor.

Coils 61 and 62 are disposed on the coil attachment portions, and coils 61 and 62 are disposed to face movable-body cores 41 and 42 in the direction orthogonal to the vibration direction in the present embodiment.

Coils 61 and 62 are held by coil bobbin part 52 such that the center position of the length of the coils and the coil bobbin part in the coil-axis direction (vibration direction) is substantially the same position (including the same position) in the vibration direction as the center position of the length of movable body 20 in the vibration direction (the center position of magnet 30 in the vibration direction). Note that, coils 61 and 62 of the present embodiment are configured to be wound in directions opposite to each other, through which currents flow in the opposite directions during energization.

The end portions of coils 61 and 62 are tied and connected to terminal tying parts 53 of middle flange portion 526. Coils 61 and 62 are connected via terminal tying parts 53 to the power supplying part (e.g., drive control part 203 illustrated in FIGS. 28 and 29). For example, the end portions of coils 61 and 62 are connected to an alternating-current supplying part, and coils 61 and 62 are supplied with alternating-power (AC) power (AC voltage) from the alternating-current supplying part. Thus, coils 61 and 62 can generate, between the magnet and coils 61 and 62, thrust allowing movement in a direction toward each other or away from each other in their axial direction.

The coil axes of coils 61 and 62 are disposed coaxially with the axis of coil bobbin part 52 or the axis of magnet 30. Note that, coils 61 and 62 are formed in a cylindrical shape by winding a coil wire around the coil attachment portion from the outside of coil bobbin part 52. It is thus not necessary to use an air-core coil for coils 61 and 62. Thus, the cost of coils 61 and 62 themselves can be reduced, and thus the cost of the entire vibration actuator can be reduced.

Further, coils 61 and 62 are, at the outer circumferential surface, surrounded by electromagnetic shield part 58 inside case 10, sealed by the coil attachment portions, and fixed by adhesion or the like within the recessed coil attachment portions. In the present embodiment, coils 61 and 62 are fixed by adhesion to all of bobbin main-body portion 522, middle flange portion 526, and flange portions 527 and 528. It is thus possible to increase the bonding strength between coils 61 and 62 and coil bobbin part 52, so that even when a large impact is applied to coils 61 and 62, coils 61 and 62 are less damaged than in a configuration in which a movable body makes direct contact with a coil.

Electromagnetic shield part 58 is a cylindrical magnetic material that surrounds the outer circumferential surface of coil bobbin part 52 and is disposed to cover coils 61 and 62 radially externally. Electromagnetic shield part 58 is positioned, for example, with respect to coil bobbin part 52 via terminal bringing-out portion 90 and positioning engagement portion 529 of coil bobbin part 52. Electromagnetic shield part 58, together with coils 61 and 62, constitutes a fixing-body-side magnetic circuit, and prevents, in the movable-body-side magnetic circuit, i.e., the magnetic circuit constituted by magnet 30 and movable-body cores 41 and 42, leakage magnetic flux to the outside of vibration actuator 1.

Electromagnetic shield part 58 is disposed such that the center of the length of electromagnetic shield part 58 in the vibration direction is located at the same height as the center of magnet 30 in the vibration direction that is disposed inside electromagnetic shield part 58. The shielding effect of electromagnetic shield part 58 makes it possible to reduce the leakage magnetic flux to the outside of the vibration actuator.

Electromagnetic shield part 58 also makes it possible to increase the thrust constant so as to increase the electromagnetic conversion efficiency in the magnetic circuit.

Electromagnetic shield part 58 utilizes the magnetic attraction force of magnet 30, and functions as a magnetic spring together with magnet 30. The magnetic spring makes it possible to reduce a stress that would be caused when elastic supporting parts 81 and 82 are mechanical springs, so as to improve the durability of elastic supporting parts 81 and 82.

<Damping Part 72>

Damping parts (dampers) 72 are attached to elastic supporting parts 81 and 82 to effectively damp a vibration generated in elastic supporting parts 81 and 82. Damping parts 72 are disposed across outermost-circumferential-side deformation arm portion 804 of a plurality of deformation arm portions 804 facing each other in the radial direction and outer circumferential fixing portion 806 so as not to come off elastic supporting parts 81 and 82. Damping parts 72 include interposition portion 722 and damping protrusions 724 and 726 protruding from interposition portion 722 on the front and back surface sides of elastic supporting parts 81 and 82 (the sides of upper and lower surface that are surfaces separate from each other in the vibration direction).

Interposition portion 722 is disposed in a gap between outer circumferential fixing portion 806 and the portion of deformation arm portion 804 on the outer circumferential portion side, and is joined to each of the side surfaces of outer circumferential fixing portion 806 and of the portion of deformation arm portion 804 on the outer circumferential portion side facing each other in the radial direction. Interposition portion 722 joins damping protrusions 724 and 726 to each other such that damping protrusions 724 and 726 are not spaced from elastic supporting parts 81 and 82. Damping protrusions 724 and 726 are integrally formed with interposition portion 722, and protrude from interposition portion 722 in the thickness direction of elastic supporting parts 81 and 82.

Damping parts 72 damp a sharp spring resonance in elastic supporting part 81 (82), so as to prevent a significant increase in vibrations at frequencies close to the resonant frequency and, thus, to prevent a greater difference in vibration from being caused between frequencies. Thus, in movable body 20, a resonance peak is reduced before plastic deformation, and stable vibrations can be produced over a wide range without contact between the movable body and lid portion 12 and bottom portion 114, so that no abnormal noise is caused due to contact. Damping parts 72 may be formed into any shape or from any material as long as they prevent the occurrence of sharp vibrations in elastic supporting part 81 (82). The damping parts may be made of, for example, an elastomer, and may be made of a thermosetting resin, an adhesive, or the like.

<Case 10>

Figure 23:
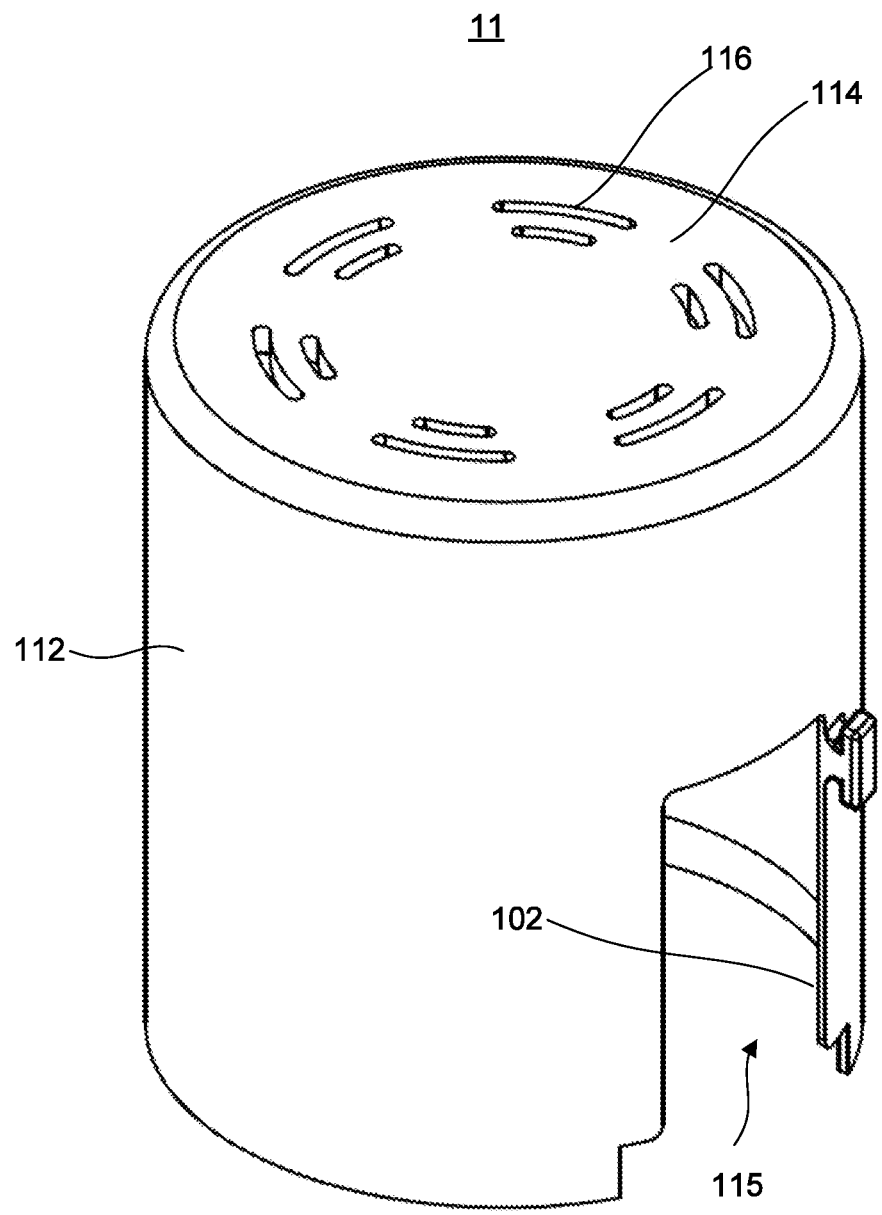
FIG. 23 is a bottom-surface-side perspective view of a case main body.
Figure 24:
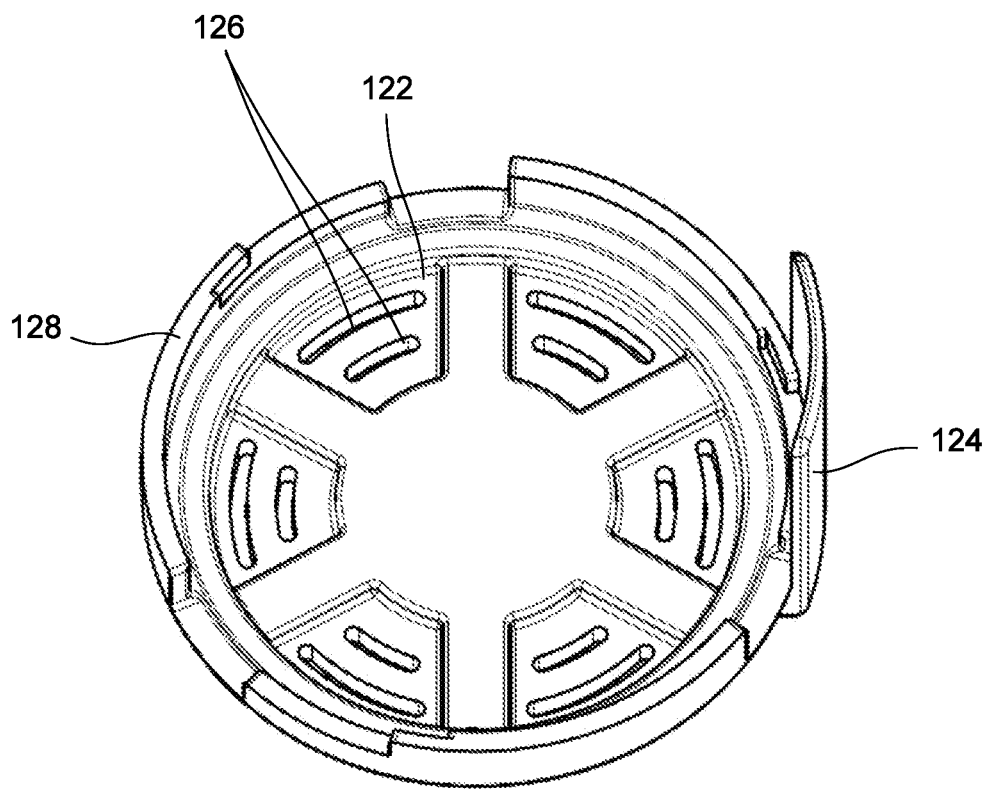
FIG. 24 is a perspective view of a lid portion as viewed from the back surface side.

FIG. 23 is a bottom-surface-side perspective view of the case main body, and FIG. 24 is a perspective view of the lid portion as seen from the back surface side. Case 10 includes: bottomed cylindrical case main body 11 having circumferential wall portion 112 and bottom portion 114; and lid portion 12 for closing opening portion 115 of case main body 11 as illustrated in FIGS. 1 to 3, 23, and 24. Note that, case 10 is a column having a height (range of motion of movable body 20) allowing movable body 20 to reciprocate in the vibration direction by cooperation between the movable body and coils 61 and 62 disposed in case 10, so as to generate a sufficient thrust. For example, case 10 of the present embodiment is formed in a cylindrical shape by bottomed cylindrical case main body 11 and lid portion 12. However, the case is not limited to this shape. The case may be elliptical cylindrical or polygonal prismatic. The length of the case in the vibration direction is longer or shorter than the length of the case in a direction perpendicular to the vibration direction. The ellipse of the elliptical cylindrical shape and elliptical shape in the present embodiment is mainly an ellipse including parallel straight line portions, and means an oval shape. The ellipse may be an elongated circle.

Lid portion 12 and bottom portion 114 respectively form top surface portion 122 and the lower surface portion (bottom portion 114) of vibration actuator 1 in the present embodiment, and are disposed to face movable body 20 of driving unit 13 with a predetermined gap being interposed between the lid portion and the bottom portion, on the one hand, and the movable body, on the other hand, in the vibration direction of movable body 20. Lid portion 12 includes hanging portion 124 that hangs from a portion of the outer circumference of top surface portion 122 and is engaged with cutout space 102 in case main body 11. Lid portion 12 and bottom portion 114 reduce the movable range of movable body 20. Lid portion 12 and bottom portion 114 function as a movable-range reducing part that serves as a hard stop (movable range limitation) of movable body 20.

Specifically, lid portion 12 and bottom portion 114 regulate the movable range formed by movable-range forming parts 54. That is, lid portion 12 and bottom portion 114 regulate the lengths from lid portion 12 and bottom portion 114 to the edge portions of the upper and lower end portions of driving unit 13 (coil bobbin part 52) (upper and lower end surfaces (opening end surfaces) 527*a* and 528*a* of upper and lower flange portions 527 and 528). Accordingly, even when a force causing movable body 20 to move beyond the movable range of movable body 20 is applied to movable body 20, elastic supporting parts 81 and 82 make contact with fixing body 50 (with at least one of lid portion 12 and bottom portion 114) without being plastically deformed. Thus, elastic supporting parts 81 and 82 are not damaged. It is possible to increase the reliability of vibration actuator 1.

Further, vent holes 126 and 116 are formed to extend through lid portion 12 and bottom portion 114, respectively. Vent holes 126 and 116 release, to the outside, compressed air formed in case 10 by the reciprocating vibration of movable body 20.

<Operation of Vibration Actuator 1>

Figure 25:
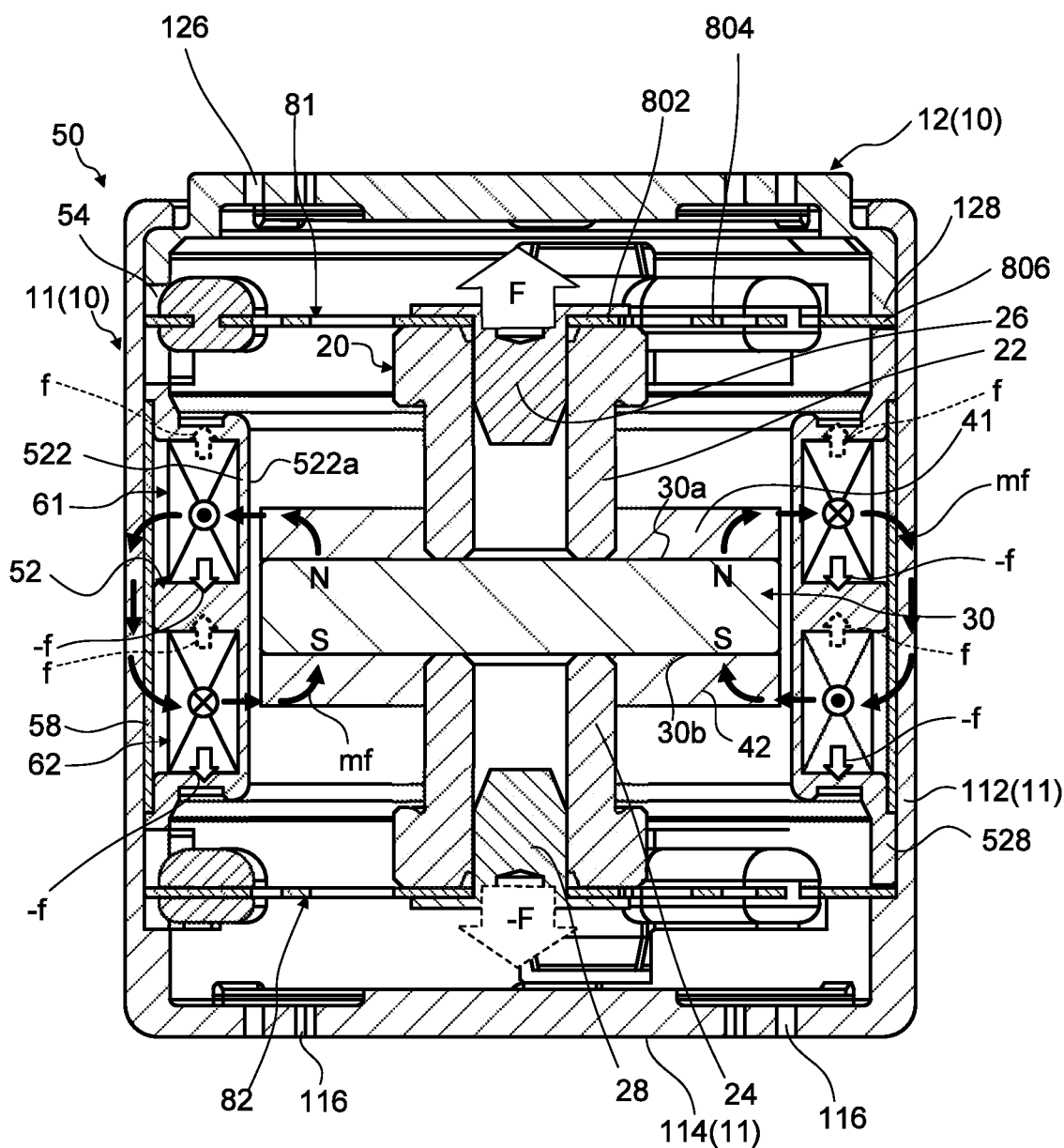
FIG. 25 schematically illustrates a magnetic circuit configuration of the vibration actuator.
Figure 26:
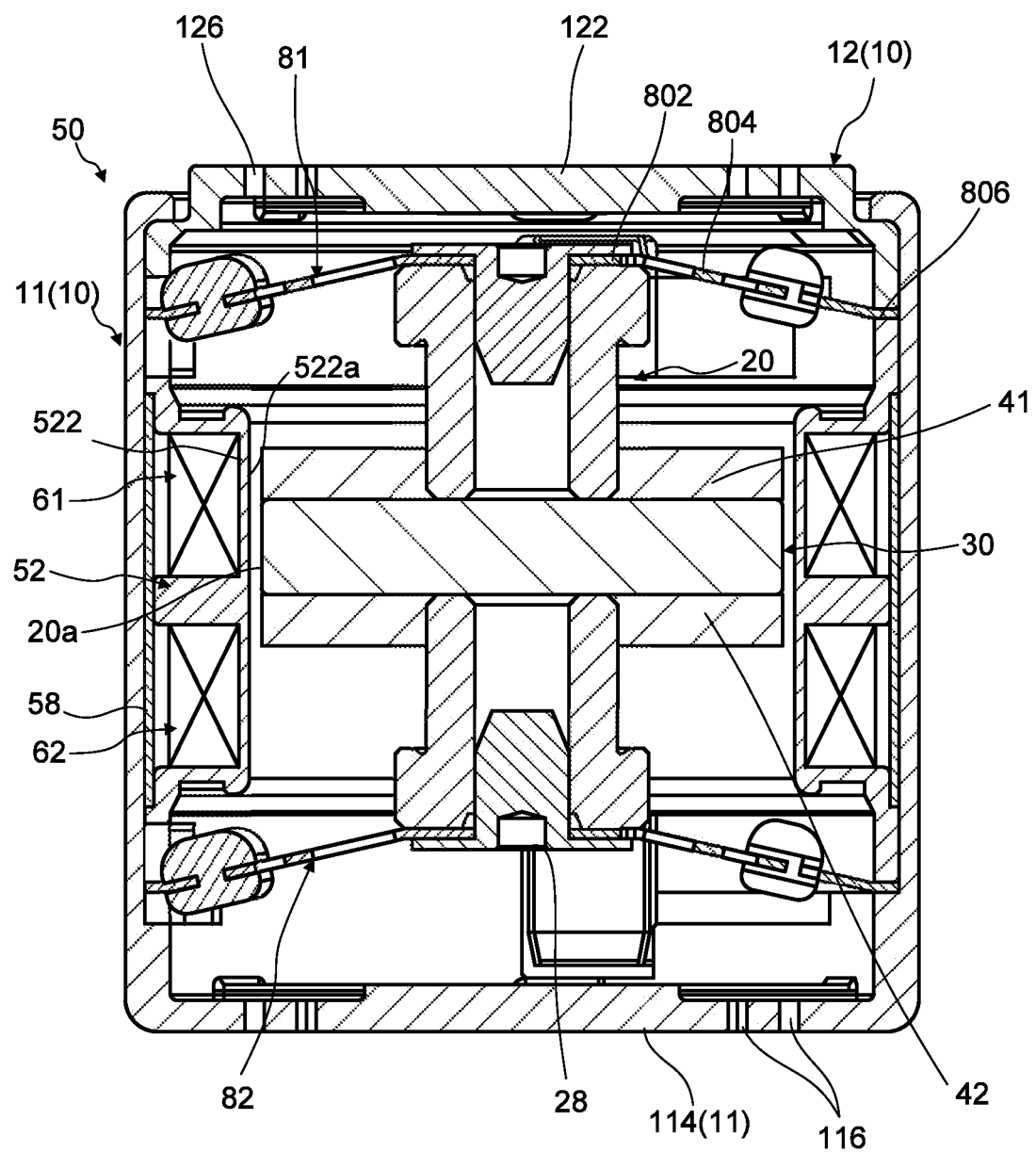
FIG. 26 illustrates a state of relative movement between a coil and a magnet.
Figure 27:
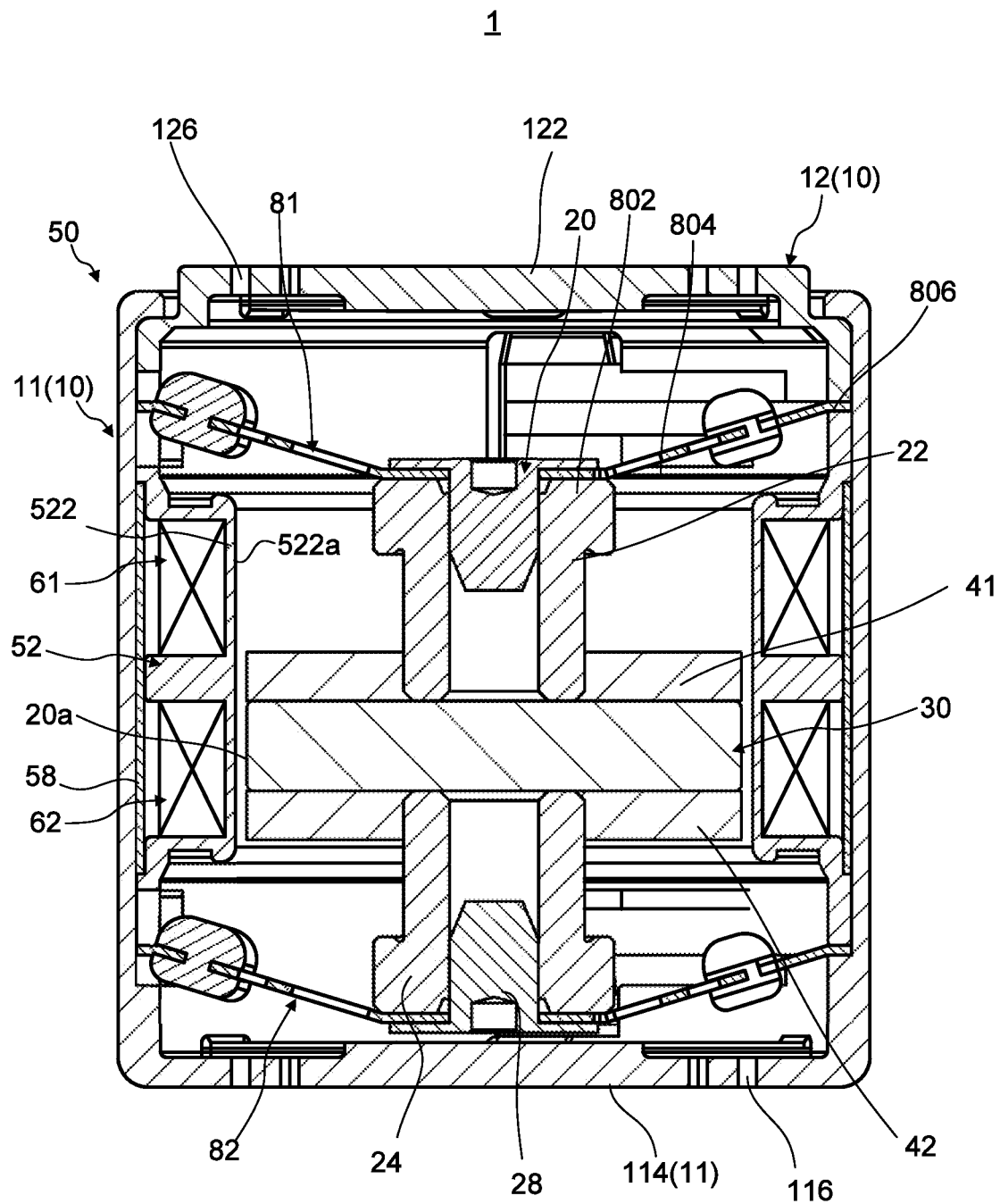
FIG. 27 illustrates a state of relative movement between a coil and a magnet.

FIG. 25 schematically illustrates a magnetic circuit configuration of the vibration actuator. FIGS. 26 and 27 illustrate a state of relative movement between coils 61 and 62 and magnet 30.

With reference to FIG. 25, a description will be given of operation of vibration actuator 1 in relation to one example in which magnet 30 is magnetized such that the side of front surface 30*a*, which is one side of magnet 30 in the magnetization direction (upper side in the present embodiment), is the N-pole, and the side of back surface 30*b*, which is the other side in the magnetization direction (lower side in the present embodiment), is the S-pole.

In vibration actuator 1, movable body 20 is considered to correspond to a mass in a vibration model of a spring-mass system, and a sharp peak is reduced by damping a vibration when a resonance is sharp (has a sharp peak). Damping the vibration makes the resonance less sharp, so that the maximum amplitude value and the maximum movement amount of movable body 20 at the time of resonance do not vary, and vibrations of the suitable and stable maximum movement amount are output.

The magnetic circuit illustrated in FIG. 25 is formed in vibration actuator 1. Further, in vibration actuator 1, coils 61 and 62 are disposed such that the coil axes are orthogonal to the magnetic flux of movable-body cores 41 and 42 and the like sandwiching magnet 30 in the vibration direction.

Specifically, flow mf of the magnetic flux is formed which is emitted from the front surface 30*a* side of magnet 30, emitted from movable-body core 41 to the coil 61 side, passes through electromagnetic shield part 58, and enters magnet 30 via coil 62 from lower movable-body core 42 of magnet 30.

Accordingly, when energization is performed as illustrated in FIG. 25, the Lorentz force in the −f direction is generated in coils 61 and 62 by interaction between the magnetic field of magnet 30 and the currents flowing through coils 61 and 62 in accordance with Fleming's left hand rule.

The Lorentz force in the −f direction is in a direction orthogonal to the direction of the magnetic field and to the direction of the current flowing through coils 61 and 62. Since coils 61 and 62 are fixed to fixing body 50 (coil bobbin part 52), the opposite force to this Lorentz force in the −f direction is generated in movable body 20 including magnet 30 as thrust in the F direction in accordance with the law of action and reaction. Thus, the side of movable body 20 including magnet 30 moves in the F direction, i.e., toward lid portion 12 (top surface portion 122 of lid portion 12) (see FIG. 26).

Further, when the energization direction of coils 61 and 62 is switched in the opposite direction and coils 61 and 62 are energized, the Lorentz force in a direction reverse to the F direction is generated. The generation of the Lorentz force in this F direction causes in movable body 20 the force opposite to the Lorentz force in the F direction as thrust (thrust in the −F direction) in accordance with the law of action and reaction, so that movable body 20 moves in the −F direction, i.e., toward bottom portion 114 of fixing body 50 (see FIG. 27).

In vibration actuator 1, a magnetic attraction force acts between magnet 30 and electromagnetic shield part 58, which functions as a magnetic spring in a non-driven (non-vibration) state in which vibration actuator 1 is not energized. The magnetic attraction force generated between magnet 30 and electromagnetic shield part 58 and a restoring force that brings elastic supporting parts 81 and 82 back to their original shapes cause movable body 20 to return to its original position.

Vibration actuator 1 includes: fixing body 50 including coils 61 and 62; and movable body 20 disposed radially inside coils 61 and 62 and including magnet 30 magnetized in the axial direction of coils 61 and 62. In addition, vibration actuator 1 includes flat plate-like elastic supporting parts 81 and 82 that elastically hold movable body 20 such that movable body 20 is freely movable in the vibration direction that is the coil-axis direction.

Further, coils 61 and 62 are disposed on the outer circumference of bobbin main-body portion 522 of coil bobbin part 52, outer circumferential surface 20a of movable body 20 is disposed on the inner circumferential side of bobbin main-body portion 522 with a gap being interposed between the outer circumferential surface of the movable body and the bobbin main-body portion, and coils 61 and 62 are, at the outer circumferential surface, surrounded by electromagnetic shield part 58.

Elastic supporting parts 81 and 82 support movable body 20, with a predetermined gap being interposed between movable body 20 and inner circumferential surface 522a of bobbin main-body portion 522, in order that movable body 20 does not make contact with inner circumferential surface 522a in the non-vibration state and the vibration state of movable body 20.

Further, coils 61 and 62 are disposed on the outer circumference of bobbin main-body portion 522, i.e., coils 61 and 62 are wound on the outer circumference of bobbin main-body portion 522, so that it is possible to reduce the cost as compared with the configuration in which an air-core coil is used. Furthermore, vibration actuator 1 has a structure in which driving unit 13 is accommodated in case 10, so that the outer circumferential surface of circumferential wall portion 112 of case 10 can be formed as a smooth surface. Thus, when vibration actuator 1 is attached to an electronic device, it is possible to reliably and easily perform attachment of a cushioning material such as a sponge to be interposed between vibration actuator 1 and a mounting point.

Coils 61 and 62 are disposed on the outer circumferential side of coil bobbin part 52 that is a coil holding part disposed in case 10. Thus, it is not necessary to perform work of taking out the end portion of a coil wire to the outside, which is required for connection of the coil wire to an external device during assembly in a configuration in which coils 61 and 62 are disposed on the inner circumferential side of the coil holding part.

Moreover, vibration actuator 1 has the configuration in which driving unit 13 is disposed in case 10, so that fixation of elastic supporting parts 81 and 82, which requires high dimensional accuracy, can be achieved by attaching elastic supporting parts 81 and 82 to coil bobbin part 52. Thus, arrangement of movable body 20 including the fixation of elastic supporting parts 81 and 82 can be determined with reference to coil bobbin part 52, so that it is possible to increase the accuracy of the vibration generation direction of the product. Specifically, only increasing the dimensional accuracy of coil bobbin part 52 formed as one component from a resin or the like makes it possible to easily dispose coils 61 and 62 and movable body 20 (magnet 30) attached via elastic supporting parts 81 and 82 in an accurate positional relationship, for example.

Further, electromagnetic shield part 58 is attached to coil bobbin part 52 disposed in case 10, so as to surround coils 61 and 62, so that the outer circumferential surface of circumferential wall portion 112 of case 10 form a smooth surface of a resin with good surface accuracy. Thus, a preferable bonding state of a member for attachment of the cushioning material (for example, a double-sided tape) is achieved, and the bonding strength can be increased.

Further, terminal tying parts 53 are disposed in coil bobbin part 52 to protrude outward, so that tying and soldering of the coil wire of the coils are facilitated, and connection between an external device and coils 61 and 62 can be facilitated.

In addition, case 10 is formed by bottomed cylindrical case main body 11 (that is, cup-shaped case main body 11) and by lid portion 12. Thus, the number of parts is less than in a configuration in which circumferential wall portion 112 and bottom portion 114 are separate from each other, and it is possible to improve the assemblability and the impact resistance.

Further, lid portion 12 is fixed by welding or caulking to opening portion 115 of cup-shaped case main body 11. For example, lid portion 12 is fitted into opening portion 115 to close opening portion 115 in case main body 11 after coil bobbin part 52 to which movable body 20 is attached via elastic supporting parts 81 and 82 is accommodated in case main body 11. Then, lid portion 12 is fixed to case main body 11 by welding fitting portions of lid portion 12 and opening portion 115 to each other, or by fitting lid portion 12 in opening portion 115 and by caulking and bending, onto lid portion 12, an opening end of opening portion 115 protruding from the periphery of lid portion 12.

Note that, in vibration actuator 1, movable body 20 is supported on fixing body 50 with a gap being interposed between the movable body and bobbin main-body portion 522 in the non-vibration state in which the movable body is not moving or in the vibration state in which the movable body is moving. Movable body 20 is always supported with respect to fixing body 50 with a gap being interposed between the movable body and bobbin main-body portion 522. Thus, movable body 20 does not make contact with fixing body 50 when moving, i.e., when vibrating. In addition, even when impacted, movable body 20 and bobbin main-body portion 522 move relative to each other in a range between outer circumferential surface 20a of movable body 20 and inner circumferential surface 522a of bobbin main-body portion 522, and movable body 20 does not make contact with coils 61 and 62.

As described above, vibration actuator 1 has the impact resistance, and is capable of outputting a preferable tactile vibration with high vibrational expressiveness.

Vibration actuator 1 is driven by an AC wave input from the power supplying part (e.g., drive control part 203 illustrated in FIGS. 28 and 29) to coils 61 and 62. That is, the energization direction of coils 61 and 62 are periodically switched, and the thrust in the F direction toward top surface portion 122 of lid portion 12 and the thrust in the −F direction toward bottom portion 114 act alternately on movable body 20. Thus, movable body 20 vibrates in the vibration direction (a winding axis direction of coils 61 and 62 orthogonal to the radial direction of coils 61 and 62, or the magnetization direction of magnet 30).

Hereinbelow, brief descriptions of the driving principle of vibration actuator 1 will be given. In vibration actuator 1 of the present embodiment, movable body 20 vibrates with respect to fixing body 50 at resonant frequency $F_r$ [Hz] computed by following Equation 1 in which m [kg] denotes the mass of movable body 20 and $K_{sp}$ denotes the spring constant of the springs (elastic supporting parts 81 and 82 that are springs).

(Equation 1)

$$F_r = \frac{1}{2\pi}\sqrt{\frac{K_{sp}}{m}} \quad [1]$$

Since movable body 20 is considered as a mass in a vibration model of a spring-mass system, movable body 20 is brought into a resonance state when the AC wave of a frequency equal to resonant frequency $F_r$ of movable body 20 is input to coils 61 and 62. That is, movable body 20 can be efficiently vibrated by inputting the AC wave of a frequency being substantially equal to resonant frequency $F_r$ of movable body 20 to coils 61 and 62 from the power supplying part.

The equation of motion and the circuit equation representing the driving principle of vibration actuator 1 are illustrated below. Vibration actuator 1 is driven based on the equation of motion represented by following Equation 2 and based on the circuit equation represented by following Equation 3.

(Equation 2)

$$m\frac{d^2 x(t)}{dt^2} = K_f i(t) - K_{sp} \times (t) - D\frac{dx(t)}{dt} \quad [2]$$

m: Mass [kg]
x(t): Displacement [m]
$K_f$: Thrust constant [N/A]
i(t): Current [A]
$K_{sp}$: Spring constant [N/m]
D: Damping coefficient [N/(m/s)]

(Equation 3)

$$e(t) = Ri(t) + L\frac{di(t)}{dt} + K_e \frac{dx(t)}{dt} \quad [3]$$

e(t): Voltage [V]
R: Resistance [Ω]
L: Inductance [H]
$K_e$: Reverse electromotive force constant [V/(rad/s)]

That is, mass m [Kg], displacement x(t) [m], thrust constant $K_f$ [N/A], current i(t) [A], spring constant $K_{sp}$ [N/m], damping coefficient D [N/(m/s)], and the like in vibration actuator 1 may be changed appropriately as long as Equation 2 is satisfied. In addition, voltage e(t) [V], resistance R [Ω], inductance L [H], and reverse electromotive force constant $K_e$ [V/(rad/s)] may be changed appropriately as long as Equation 3 is satisfied.

Accordingly, in vibration actuator 1, a great vibrational output can be obtained efficiently when the energization of coils 61 and 62 is performed using the AC wave corresponding to resonant frequency $F_r$ determined by mass m of movable body 20 and spring constant $K_{sp}$ of elastic supporting parts 81 and 82 that are leaf springs.

In addition, vibration actuator 1 satisfies Equations 2 and 3, and is driven by using a resonance phenomenon expressed using a resonant frequency indicated by Equation 1. Thus, in vibration actuator 1, the power consumed in a steady state is only loss caused by damping parts 72, so that vibration actuator 1 is capable of being driven with low power consumption, i.e., movable body 20 is capable of linear reciprocating vibration with low power consumption. Further, vibrations in higher bands can be generated by increasing damping coefficient D.

According to the present embodiment, plate-like elastic supporting parts 81 and 82 are disposed above and below (in the vibration direction) movable body 20, so that movable body 20 is stably driven in the upper-lower direction, and the magnetic flux of coils 61 and 62 can be efficiently distributed from upper and lower elastic supporting parts 81 and 82 above and below magnet 30. Thus, vibration actuator 1 is capable of achieving a high output vibration.

In the present embodiment, damping parts 72 are disposed between outer circumferential fixing portion 806 of each of elastic supporting parts 81 and 82 and deformation arm portions 804 adjacent to outer circumferential fixing portion 806. Portions between, on one hand, outer circumferential fixing portion 806 attached to coil bobbin part 52 as the coil holding part, and, on the other hand, deformation arm portions 804 adjacent to outer circumferential fixing portion 806 are portions of elastic supporting parts 81 and 82 which are structurally the most stable in terms of shape and position, and are stable in terms of assembly dimension.

According to the present invention, it is possible to generate a suitable tactile vibration with a stable high output even when vibration is damped. In addition, it is possible to achieve vibration actuator 1 that is miniaturized at a low cost, is impact-resistant, is quieter, and has stable performance.

Further, fixing body 50 includes coil bobbin part 52 that has a holding function of holding coils 61 and 62 and a protecting function of protecting coils 61 and 62 from movable body 20. Thus, even when fixing body 50 is impacted, fixing body 50 withstands the impact, and prevents damage such as deformation of elastic supporting parts 81 and 82. Further, an impact is to be transmitted to coils 61 and 62 via bobbin main-body portion 522 formed from resin, so that damage can be reduced, and thus, highly reliable vibration actuator 1 is achieved.

Further, in vibration actuator 1, elastic supporting parts 81 and 82 are clamped between opening end surfaces (upper and lower end surfaces) 527a and 528a of the upper and lower opening edge portions of coil bobbin part 52, on the one hand, and lid portion 12 and bottom portion 114 of case 10, on the other hand, so as to be disposed to extend in the direction orthogonal to the vibration direction, as illustrated in FIG. 2. Inner circumferential portions 802 of elastic supporting parts 81 and 82 are fixed to the upper and lower end portions of movable body 20 accommodated in coil bobbin part 52. In addition, outer circumferential fixing portions 806 of elastic supporting parts 81 and 82 are fixed to the upper end portions of coil bobbin part 52. With this configuration, driving unit 13 in which the positional relationship between coils 61 and 62 and movable body 20 is defined is configured, so that arrangement in case 10 becomes easier.

(Electronic Device)

Figure 28:
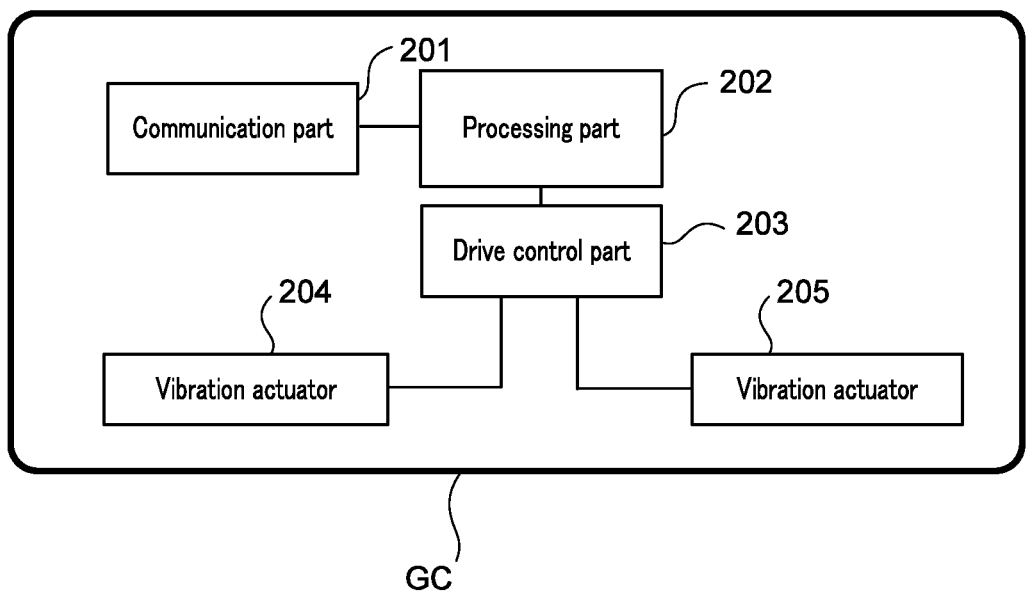
FIG. 28 illustrates an example of the electronic device on which the vibration actuator is mounted.
Figure 29:
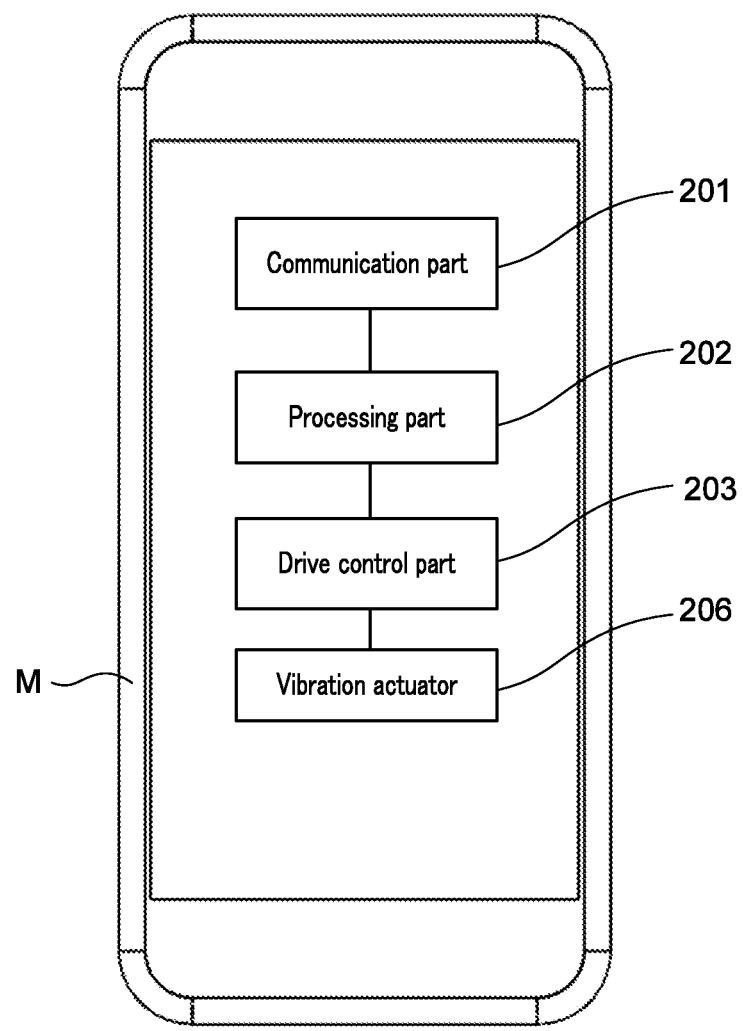
FIG. 29 illustrates an example of the electronic device on which the vibration actuator is mounted.

FIGS. 28 and 29 illustrate exemplary mounting configurations of vibration actuator 1. FIG. 28 illustrates an example in which vibration actuator 1 is mounted on game controller GC, and FIG. 29 illustrates another example in which vibration actuator 1 is mounted on mobile terminal M.

Game controller GC is connected to a game-machine main body by wireless communication, for example, and is used by a user gripping or holding it. Here, game controller GC has a rectangular plate shape, and the user grasps the left and right sides of game controller GC with both hands for operation.

Game controller GC notifies the user of a command from the game-machine main body by vibrations. Note that, game controller GC includes a function other than command notification (for example, an input operation part for input operation to the game-machine main body), which is not illustrated in the figures though.

Mobile terminal M is a portable communication terminal, such as a mobile phone or smartphone, for example. Mobile terminal M vibrates to notify a user of an incoming call from an external communication apparatus and also to implement functions of mobile terminal M (for example, functions of giving an operational feel and/or realism).

As illustrated in FIGS. 28 and 29, each of game controller GC and mobile terminal M has communication part 201, processing part 202, drive control part 203, and vibration actuators 204, 205, and/or 206 each of which is vibration actuator 1 as a driving part. Note that, a plurality of vibration actuators 204 and 205 are mounted in game controller GC.

In game controller GC and mobile terminal M, it is preferable that vibration actuators 204, 205, and/or 206 be mounted such that, for example, the main surface of the terminal is parallel to the surfaces of vibration actuators 204, 205, and/or 206 (here, the bottom surface of bottom portion 114) which are orthogonal to the vibration direction. The main surface of the terminal is a surface that makes contact with the body surface of the user, and means a vibration transmission surface that makes contact with the body surface of the user to transmit vibrations in the present embodiment. Note that, the main surface of the terminal and the bottom surfaces of bottom portions 114 of vibration actuators 204, 205, and/or 206 may also be disposed to be orthogonal to one another.

Specifically, vibration actuators 204 and 205 are mounted in game controller GC such that the vibration direction is orthogonal to the surface with which the fingertip, the pad of the finger, the palm of the hand, and/or the like of the user operating the game controller make contact, or the surface on which the operation part is disposed. Further, in the case of mobile terminal M, vibration actuator 206 is mounted such that a display screen (touch panel surface) is orthogonal to the vibration direction. Thus, vibrations in a direction orthogonal to the main surface of game controller GC or mobile terminal M are transmitted to the user.

Communication part 201 is connected to an external communication apparatus by wireless communication, and receives a signal from the communication apparatus to output it to processing part 202. In the case of game controller GC, the external communication apparatus is a game-machine main body as an information communication terminal, and performs communication in accordance with short-range radio communication standards such as Bluetooth (registered trademark) and the like. In the case of mobile terminal M, the external communication apparatus is, for example, a base station, and performs communication in accordance with mobile communication standards.

Processing part 202 converts by using a conversion circuit part (not illustrated) an input signal into a drive signal for driving vibration actuators 204, 205, and/or 206, and outputs the drive signal to drive control part 203. Note that, in mobile terminal M, processing part 202 generates a drive signal based on a signal input from communication part 201 and on signals input from various functional parts (not illustrated; for example, an operation part such as a touch panel or the like).

Drive control part 203 is connected to vibration actuators 204, 205, and/or 206, and a circuit for driving vibration actuators 204, 205, and/or 206 is implemented in drive control part 203. Drive control part 203 supplies a drive signal to vibration actuators 204, 205, and/or 206.

Vibration actuators 204, 205, and/or 206 are driven in accordance with the drive signal from drive control part 203. Specifically, in vibration actuators 204, 205, and/or 206, movable body 20 vibrates in the direction orthogonal to the main surface of game controller GC or mobile terminal M.

Movable body 20 may make contact with top surface portion 122 of lid portion 12 or with bottom portion 114 via the dampers each time movable body 20 vibrates. In this case, an impact on top surface portion 122 of lid portion 12 or bottom portion 114 due to the vibration of movable body 20, i.e., the impact on the housing is directly transmitted as vibrations to the user. In particular, a plurality of vibration actuators 204 and 205 are mounted in game controller GC, so that it is possible to drive one of the plurality of vibration actuators 204 and 205 or both of the of vibration actuators 204 and 205 at the same time depending on the input drive signal.

Since the vibration in the direction orthogonal to the body surface of the user is transmitted to the body surface of the user in contact with game controller GC or mobile terminal M, a sufficient tactile vibration can be given to the user. Game controller GC is capable of giving a tactile vibration to the user with one or both of vibration actuators 204 and 205, so that application of vibrations with high vibrational expressiveness, such as selective application of at least strong or weak vibrations is possible.

Thus, by using the vibration actuator of the present embodiment, in game controller GC or portable terminal M, it is possible to stably obtain excellent vibration characteristics, and it is possible to realize quiet driving.

Embodiment 2

Figure 30:
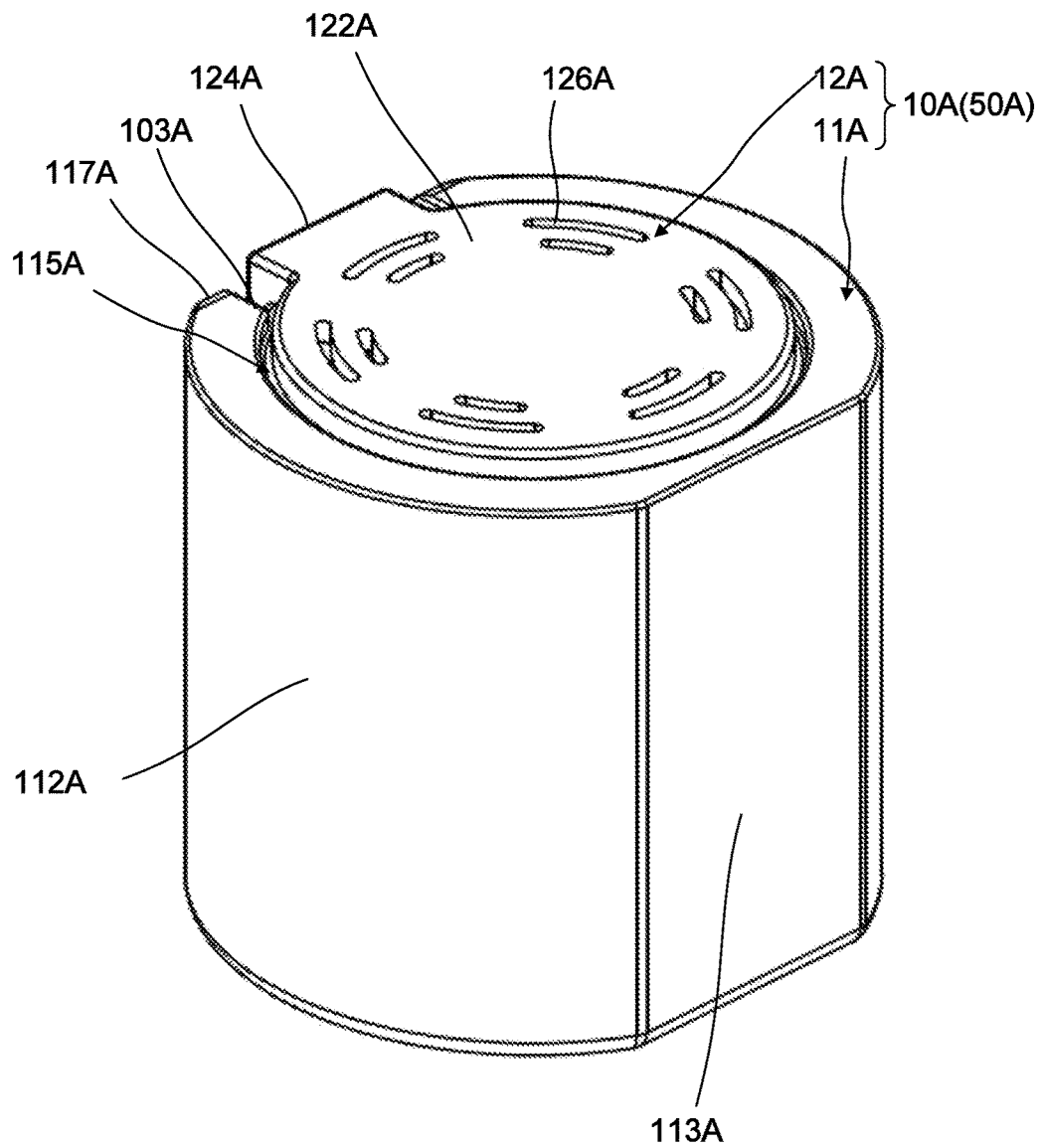
FIG. 30 is a perspective view of an external appearance of a vibration actuator according to Embodiment 2 of the present invention.
Figure 31:
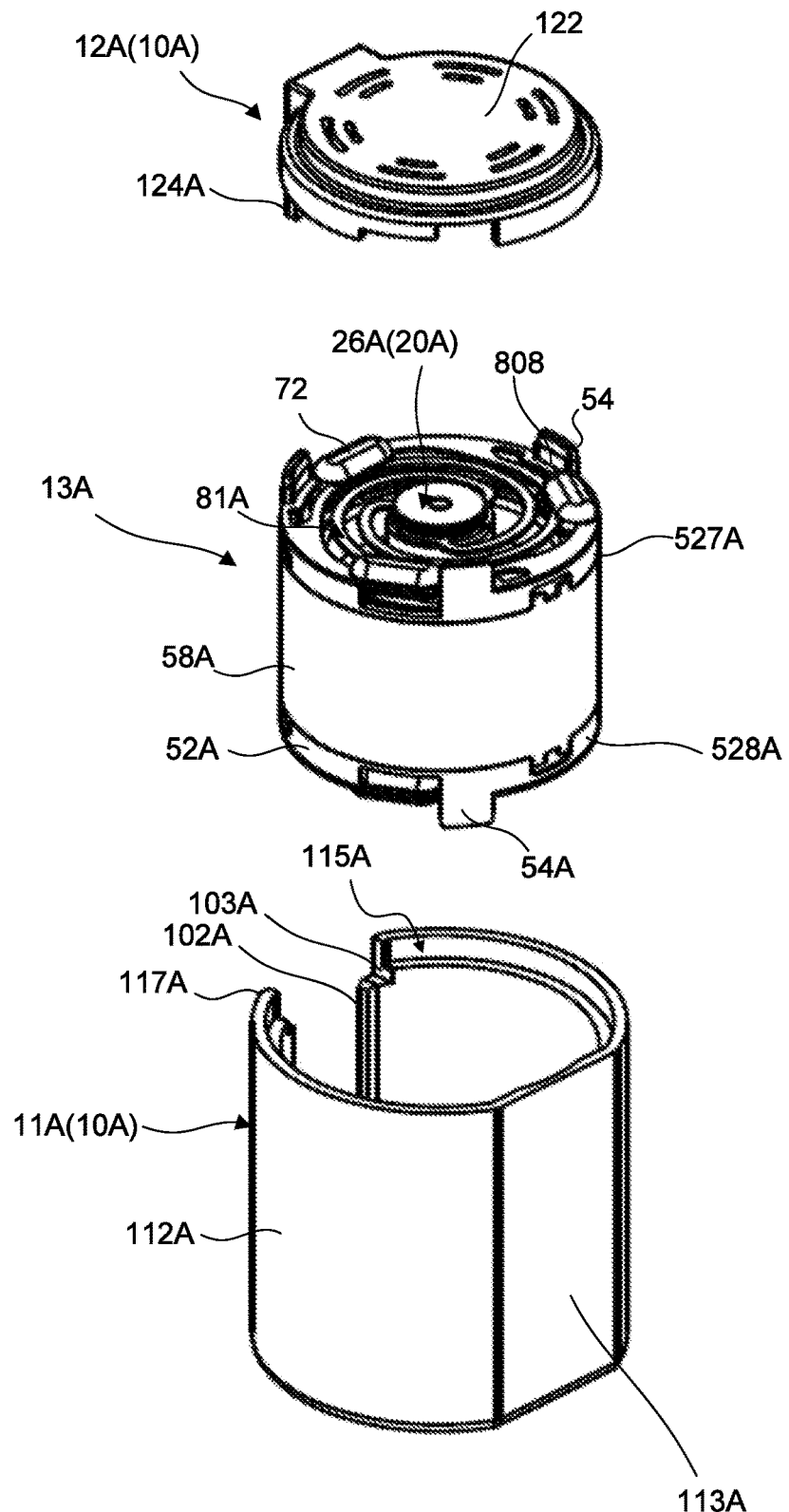
FIG. 31 is a perspective view of the vibration actuator from which a case is detached.
Figure 32:
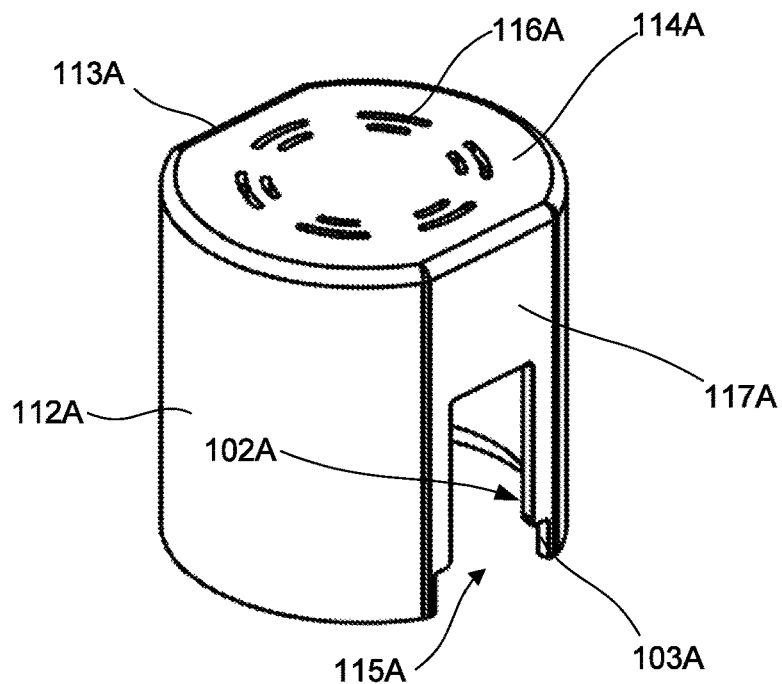
FIG. 32 is a bottom-surface-side perspective view of a case main body.
Figure 33:
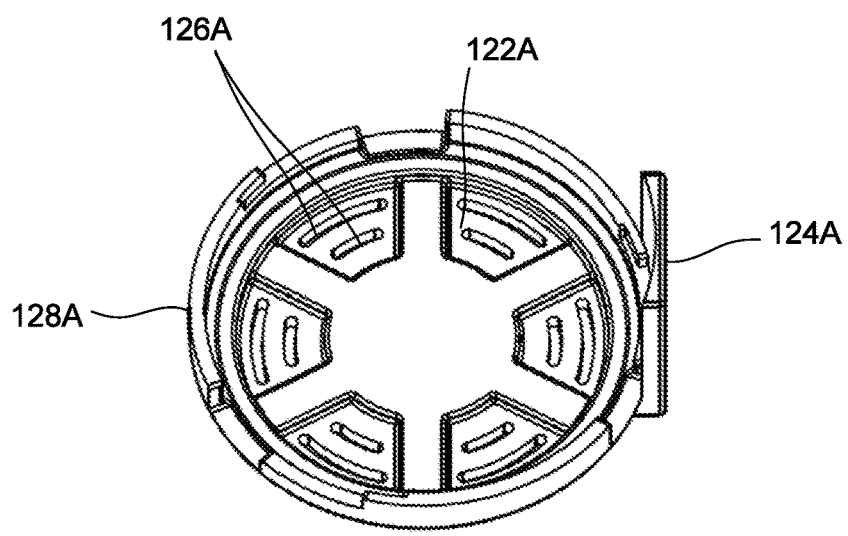
FIG. 33 is a perspective view of a lid portion as viewed from the back surface side.

FIG. 30 is an external perspective view of a vibration actuator according to Embodiment 2 of the present invention, and FIG. 31 is a perspective view of the vibration actuator from which the case is detached. Further, FIG. 32 is a bottom side perspective view of the case main body, and FIG. 33 is a perspective view of the lid portion as seen from the back side.

Vibration actuator 1A according to Embodiment 2 differs from vibration actuator 1 only in the outer shape of case 10A, and the other basic configurations are the same. Therefore, in the following description, similar constituent elements are provided with the same names and the same reference numerals with appropriate addition of the letter "A" to the reference numerals.

Vibration actuator 1A includes driving unit 13A and case 10A for accommodating driving unit 13A which have the same configuration as driving unit 13 of vibration actuator 1. Note that, driving unit 13A includes coil bobbin part 52A that is configured similarly to coil bobbin part 52, that is covered with electromagnetic shield part 58A, and around which coils are wound. Inside coil bobbin part 52A, movable body 20A having the same configuration as movable body 20 is configured to be suspended via elastic supporting parts (FIG. 31 illustrates only elastic supporting part 81A). Movable body 20A is joined to elastic supporting part 81A by the sealing part described above without any gap.

Case 10A is formed in an elliptical cylinder (for example, in an "oval shape") and is composed of case main body 11A and lid portion 12A. Note that, case 10A is a column having a height (range of motion of movable body 20) allowing movable body 20 to reciprocate in the vibration direction by cooperation between the movable body and coils disposed in case 10, so as to generate a sufficient thrust. The same applies to columnar shapes of cases 10B to 10F described below.

Case main body 11A as seen in the vibration (axial) direction includes circumferential wall portion 112A including flat surface portions 113A and 117A that are planar outer circumferential surfaces and are disposed symmetrically with respect to the center of opening portion 115A. The case main body includes bottom portion 114A. Case main body 11A has an elliptical shape, and in the present embodiment, includes flat surface portions 113A and 117A extending parallel to the vibration direction. Flat surface portions 113A and 117A are disposed parallel to each other at the outer circumference of case main body 11A. Case main body 11A is formed by circumferential wall portion 112A and bottom portion 114A in a bottomed cylindrical shape which opens at circular opening portion 115A.

Flat surface portions 113A and 117A include, for example, outer surfaces parallel to each other, and arc-shaped inner surfaces. Case main body 11A includes flat surface portions 113A and 117A, and thus, when attached to the housing, it is easy to mount the case main body on the mounting surface on the housing side on which attachment is to be performed. Also, vibration actuator 1A can cause vibration along the mounting surface. Cutout portion 102A continuous with opening portion 115A is formed in flat surface portion 117A. Cutout portion 102A is formed in a shape that corresponds to and is engageable with hanging portion 124A of lid portion 12A.

Case main body 11A as seen in the axial direction has an elliptical outer shape, and a circular inner shape. Case main body 11A includes therein a space formed in a circular shape which is open at opening portion 115A. This space accommodates cylindrical driving unit 13A. A terminal tying part (coil connection part) (not illustrated) is exposed to the outside via cutout portion 102A. When the terminal tying part is disposed on flat surface portion 117A, mounting on an external board becomes easier, and external connection also becomes easy.

Lid portion 12A and bottom portion 114A form top surface portion 122A and the lower surface portion (bottom portion 114A) of vibration actuator 1, respectively, and are disposed to face movable body 20A of driving unit 13A accommodated in case 10A in the vibration direction of movable body 20A (axial direction) with predetermined gaps being interposed therebetween. Lid portion 12A and bottom portion 114A have a function as a movable-range reducing part that serves as a hard stop (movable range limitation) of movable body 20A, and regulate the movable range in which movable body 20A is movable.

Specifically, lid portion 12A and bottom portion 114A regulate the movable range of movable body 20A formed by movable-range forming parts 54A of driving unit 13A. That is, lid portion 12A and bottom portion 114A regulate the lengths from lid portion 12A and bottom portion 114A to the edge portions of the upper and lower end portions of driving unit 13A (upper and lower end surfaces (opening end surfaces) of upper and lower flange portions 527A and 528A).

Thus, even when a force causing movable body 20A to move beyond the movable range is applied on movable body 20A, elastic supporting part 81A makes contact with fixing body 50A (at least one of lid portion 12A and bottom portion 114A) without being plastically deformed, so that elastic supporting part 81A is not damaged, and reliability can be increased.

When lid portion 12A is attached to case main body 11A, hanging portion 124A is engaged with cutout portion 102A of case main body 11A to close cutout portion 102A. Hanging portion 124A is formed such that the outer surface is a flat surface, and the inner surface is in an arc shape whose central axis is oriented in the hanging direction. Thus, hanging portion 124A is engaged with cutout portion 102A so as to be flush with the outer surface of flat surface portion 117A at the outer surface of the hanging portion. The hanging portion accommodates driving unit 13A while positioning the driving unit by the arc surface of the inner surface. Note that, at cutout portion 102A, steps are formed in opening end portion 103A in the vibration direction.

When lid portion 12A is attached to case main body 11A, the steps at opening end portion 103A form recesses that open to the top surface portion 122A side. Since the recesses are formed by a part of case main body 11A and a part of lid portion 12A, the recesses function, for example, as a joint portion for securely joining both of the case main body and the lid portion. An adhesive is applied to the joint portion, or the joint portion is welded. That is, by using the steps at opening end portion 103A, the case main body and the lid portion can be securely joined together by bonding, welding, or the like. Thus, the case main body and the lid portion can be suitably bonded without extrusion of the adhesive from the outer surface of case 10, such as application of the adhesive onto top surface portion 122A.

Vent holes 126A and 116A having the same function as vent holes 126 and 116 are formed to extend through lid portion 12A and bottom portion 114A, respectively.

In vibration actuator 1A, case main body 11A whose outer shape is an elliptical shape (oval shape) when viewed in the vibration (axial) direction, and whose inner shape is circular accommodates driving unit 13A having a circular outer shape. Note that, the outer-diameter arc center of case main body 11A coincides with the outer-diameter arc center of driving unit 13A and the center of gravity of vibration of movable body 20.

The outer shape of vibration actuator 1A is an elliptical shape (oval shape) when viewed in the vibration direction (axial direction of the vibration actuator). Thus, when attaching vibration actuator 1A to the housing, it is possible to easily attach vibration actuator 1A to the housing by bringing flat surface portions 113A and 117A forming a part of the side surface of case main body 11A into contact with a mounting surface (a flat portion) of the housing on which mounting is performed. Thus, it is easier to attach vibration actuator 1A to the housing. When driving unit 13A is the same as that of driving unit 13 of Embodiment 1, the same effects as those of Embodiment 1 can be obtained while maintaining the same vibrational feel as that of Embodiment 1 by using the same lid portion 12A as lid portion 12 and changing only corresponding case main body 11A. Further, case 10A includes flat surface portions 113A and 117A parallel to the outer circumferential surface. It is thus possible to secure the stroke length of the vibration along these flat surface portions 113A and 117A.

Embodiment 3

Figure 34:
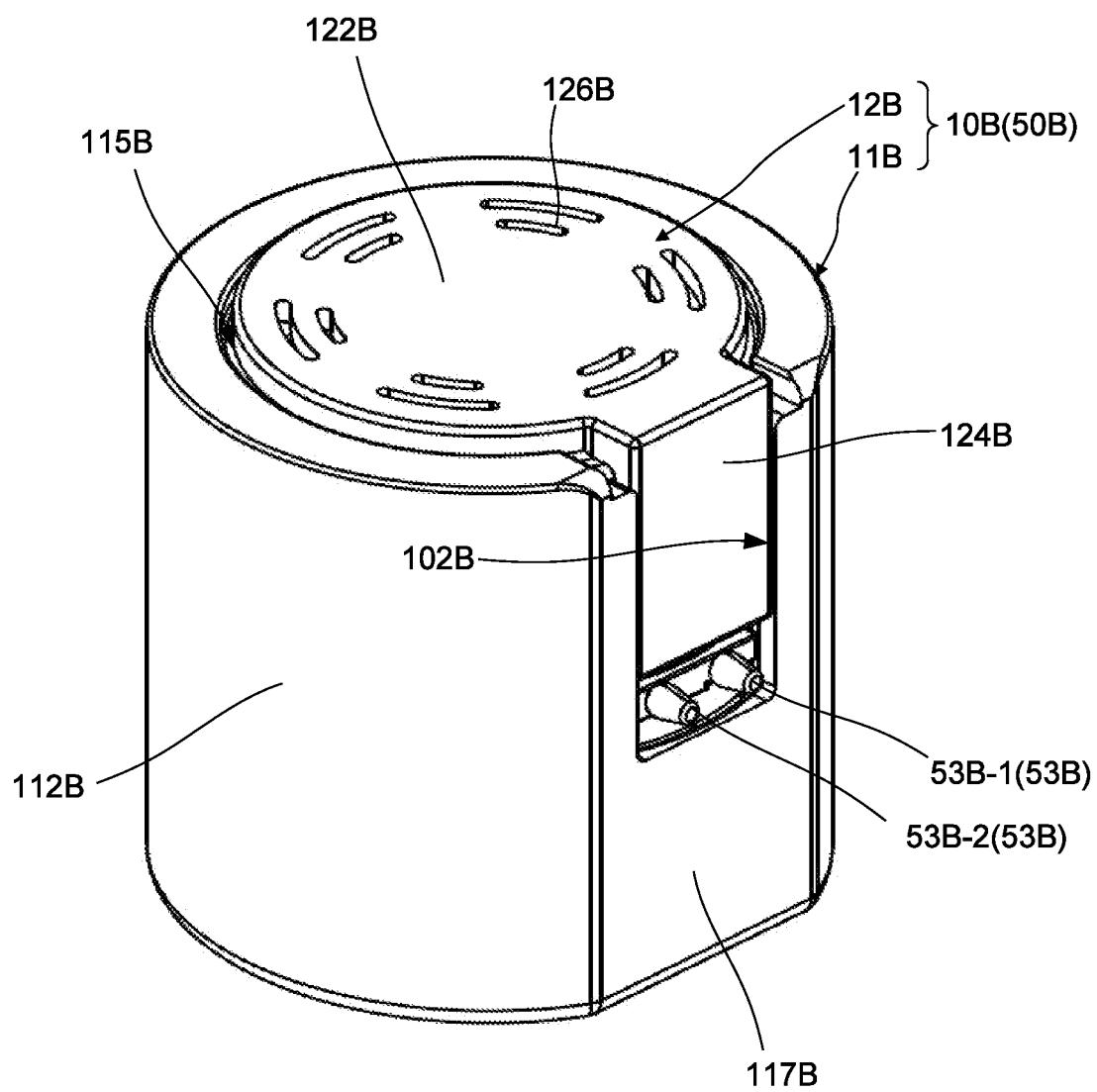
FIG. 34 is a perspective view of an external appearance of a vibration actuator according to Embodiment 3 of the present invention.
Figure 35:
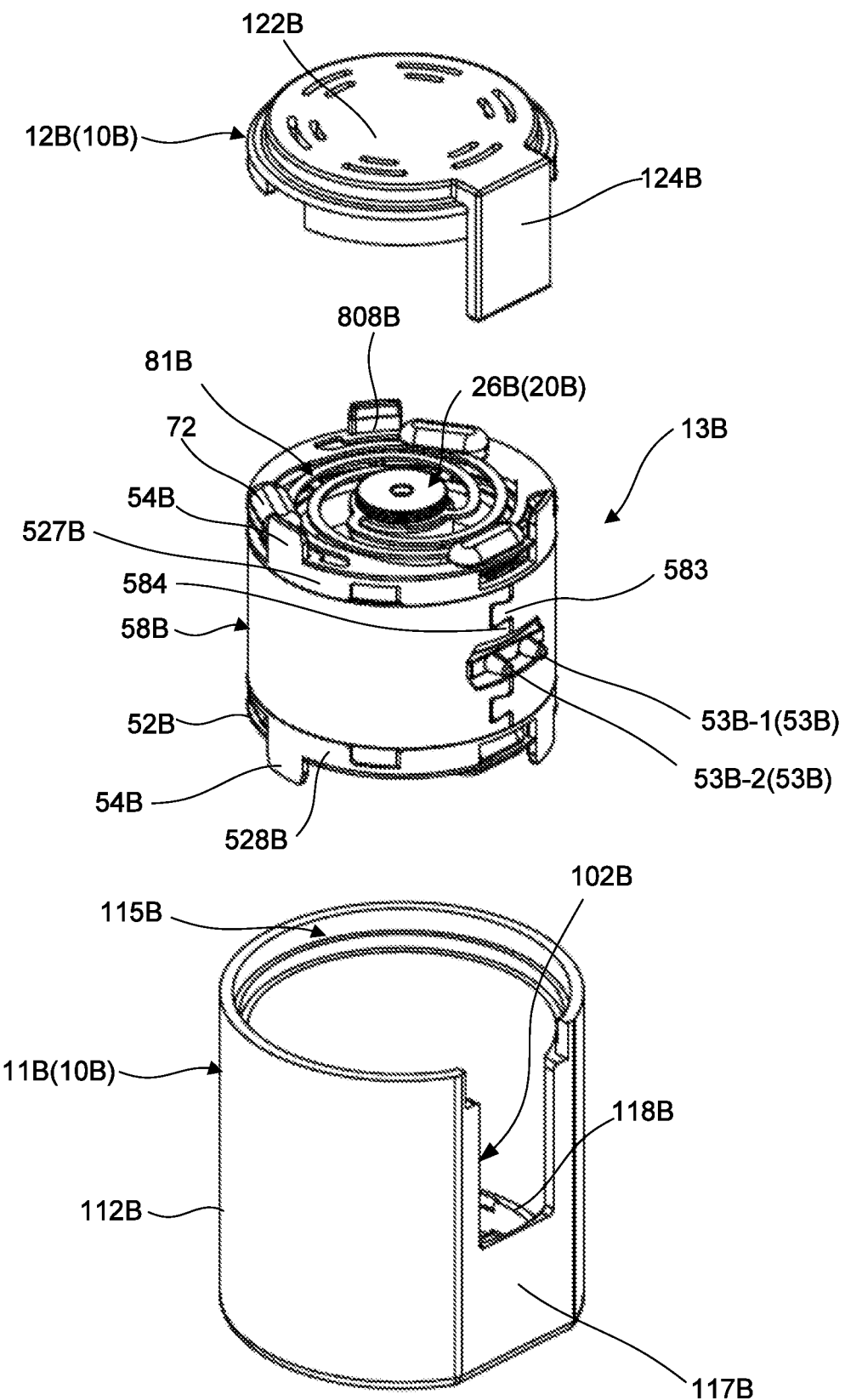
FIG. 35 is a perspective view of the vibration actuator from which a case is detached.
Figure 36:
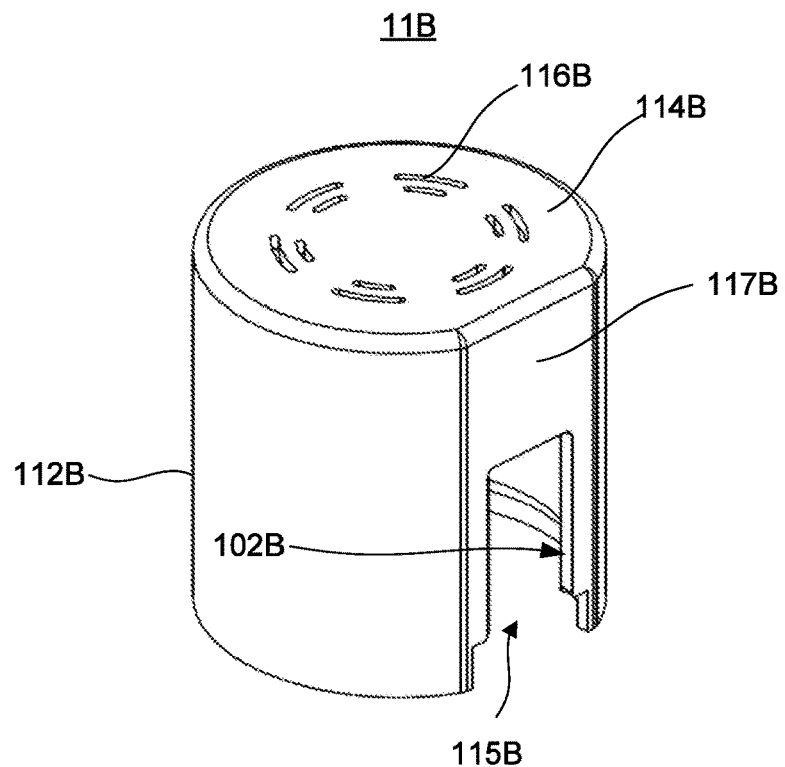
FIG. 36 is a bottom-surface-side perspective view of a case main body.
Figure 37:
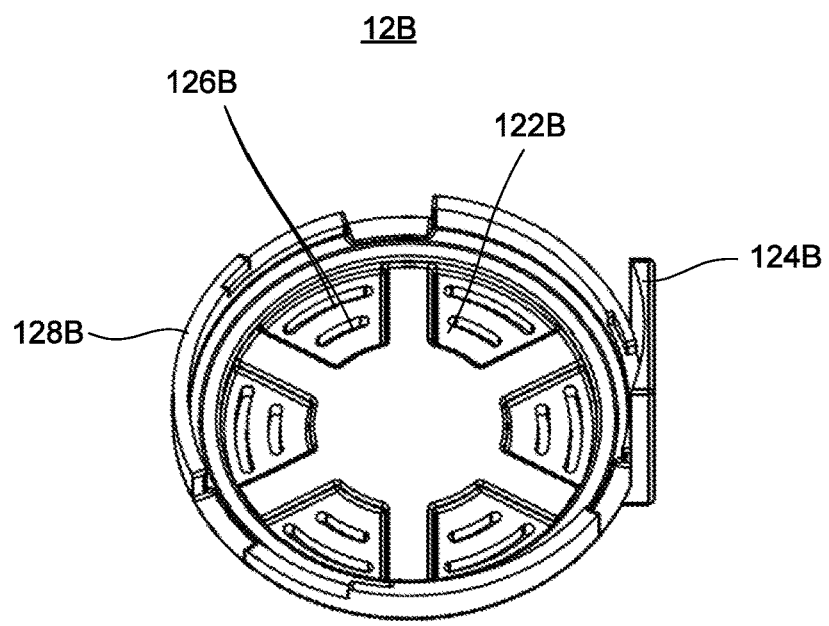
FIG. 37 is a perspective view of a lid portion as viewed from the back surface side.

FIG. 34 is an external perspective view illustrating the vibration actuator according to the third embodiment of the present invention, and FIG. 35 is a perspective view illustrating a state in which the case is removed in the same vibration actuator. Further, FIG. 36 is a bottom side perspective view of the case main body, FIG. 37 is a perspective view of the lid portion as seen from the back side.

Vibration actuator 1B has case 10B and driving unit 13B that have the same functions as those of vibration actuator 1 although having the outer shapes different from case 10 and driving unit 13. Therefore, in the following description, similar constituent elements are provided with the same names and the same reference numerals with appropriate addition of the letter "B" to the reference numerals, and description thereof is omitted as appropriate.

Vibration actuator 1B includes driving unit 13B and case 10B for accommodating driving unit 13B that is the same as driving unit 13 of vibration actuator 1. Note that, electromagnetic shield part 58B of driving unit 13B is a cylindrical magnetic material disposed to surround the outer circumferential surface of coil bobbin part 52B around which coils are wound. Electromagnetic shield part 58B is formed in a cylindrical shape by engagement between engaging portions 583 and 584 of both end portions of the plate-like magnetic material in the circumferential direction. The outer surface of electromagnetic shield part 58B is disposed to be flush with the outer surface of edge portions of the upper and lower end portions of driving unit 13B (upper and lower flange portions 527B and 528B).

Case 10B includes, in the outer circumferential surface, flat surface portion 117B extending parallel to the vibration direction. Case 10B is composed of case main body 11B and lid portion 12B, and has an outer shape of D when viewed in the vibration direction. Specifically, case main body 11B includes arc-shaped circumferential wall portion 112B, flat surface portion 117B disposed as a part of circumferential wall portion 112B and having a flat outer surface, and bottom portion 114B. Case main body 11B is formed by circumferential wall portion 112B and bottom portion 114B in a bottomed cylindrical shape which opens at circular opening portion 115B.

Cutout portion 102B continuous with opening portion 115B is formed in flat surface portion 117B. Cutout portion 102B is formed in a shape that corresponds to and is engageable with hanging portion 124B of lid portion 12B.

The outer shape of case main body 11B as seen in the axial direction is D-shaped. Case main body 11B includes therein a space defined in a cylindrical shape which is open at opening portion 115B. This space accommodates cylindrical driving unit 13B. Terminal tying parts (coil connection parts) 53B-1 and 53B-2 are exposed to the outside via cutout portion 102B.

Lid portion 12B and bottom portion 114B form top surface portion 122B and the lower surface portion (bottom portion 114B) of vibration actuator 1, and are disposed to face movable body 20B of driving unit 13B accommodated in case 10B in the vibration direction of movable body 20B with predetermined gaps being interposed therebetween. Lid portion 12B and bottom portion 114B have a function as a movable-range reducing part that serves as a hard stop (movable range limitation) of movable body 20B, and regulate the movable range in which movable body 20B is movable.

Specifically, lid portion 12B and bottom portion 114B regulate the movable range of movable body 20B formed by movable-range forming parts 54 of driving unit 13B. That is, lid portion 12B and bottom portion 114B regulate the lengths from lid portion 12B and bottom portion 114B to the upper and lower end surfaces (opening end surfaces) of upper and lower flange portions 527B and 528B that are opposite end portions of driving unit 13B separate from each other in the vibration direction.

Thus, even when a force causing movable body 20B to move beyond the movable range is applied to movable body 20B, elastic supporting part 81B makes contact with fixing body 50B (at least one of lid portion 12B and bottom portion 114B) without being plastically deformed, so that elastic supporting part 81B is not damaged, and reliability can be increased. Functions and effects of hanging portion 124B are the same as those of hanging portion 124A, and therefore descriptions thereof are omitted.

Vent holes 126B and 116B having the same function as vent holes 126 and 116 are formed to extend through lid portion 12B and bottom portion 114B, respectively.

In vibration actuator 1B, case main body 11B whose outer shape is a D-shape when viewed in the vibration (axial) direction, and whose inner shape is circular accommodates driving unit 13B having a circular outer shape.

In addition, the outer-diameter arc center of case main body 11B coincides with the outer-diameter arc center of driving unit 13B and the center of gravity of vibration of movable body 20.

The outer shape of vibration actuator 1B as seen in the vibration direction (axial direction of the vibration actuator) is a shape (e.g., D-shape) having flat surface portion 117B extending parallel to the vibration direction in the outer circumferential surface. Thus, when attaching vibration actuator 1B to the housing, it is possible to easily attach vibration actuator 1B to the housing by bringing flat surface portion 117B forming a part of the side surface of case main body 11B into contact with a mounting surface (a flat surface portion) of the housing on which mounting is performed. Also, vibration actuator 1B can cause vibration along the mounting surface. Furthermore, terminal tying parts 53B are disposed on flat surface portion 117B. Thus, during mounting on an external board, it is possible to easily mount vibration actuator 1B in the housing, and to perform electrical connection between terminal tying parts 53B and the external device or the like.

Thus, it is easier to attach vibration actuator 1B to the housing. When the outer dimensions of driving unit 13B are the same as those of driving unit 13 of Embodiment 1, the same effects as those of Embodiment 1 can be obtained while maintaining the same vibrational feel as that of Embodiment 1 by using the same lid portion 12B as lid portion 12 and changing only corresponding case main body 11B.

Embodiment 4

Figure 38:
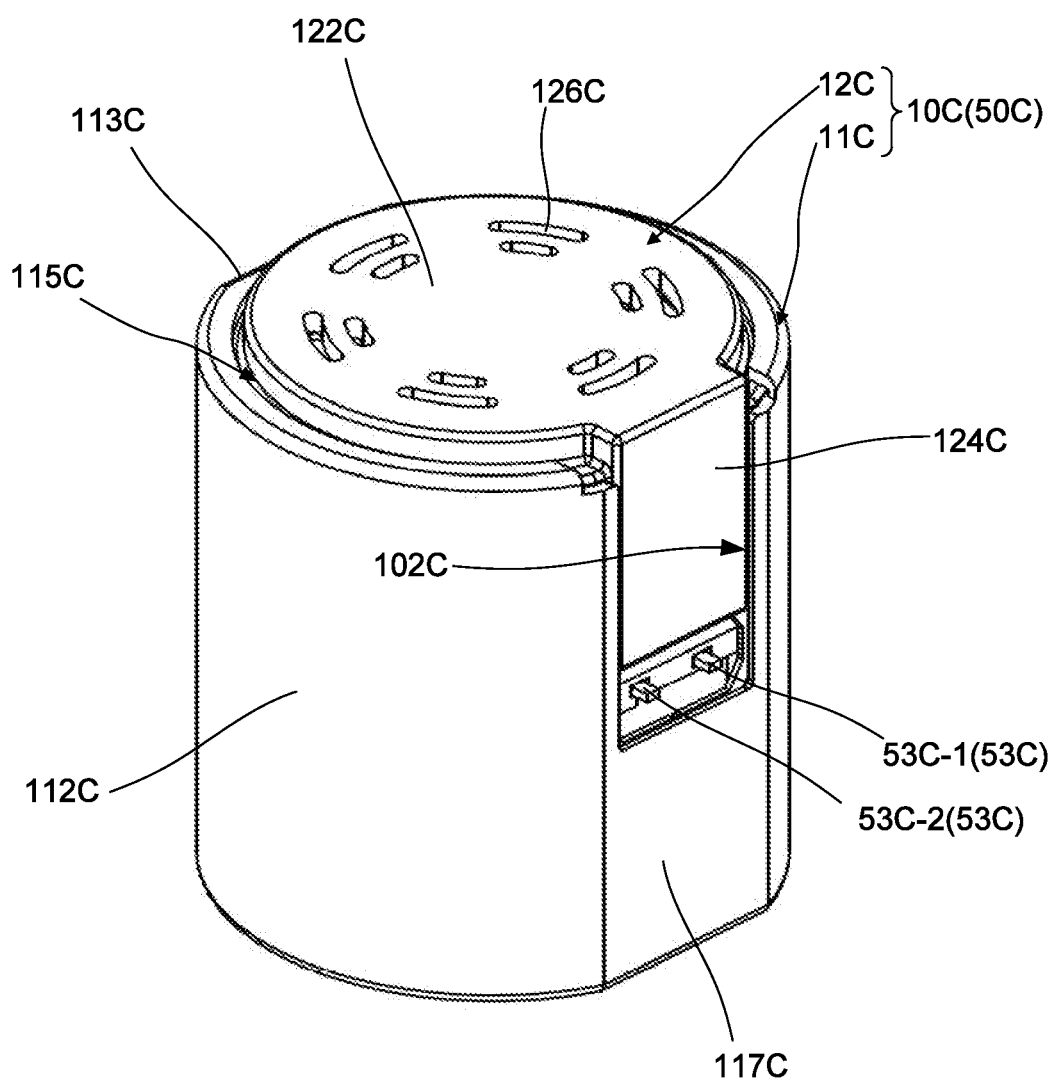
FIG. 38 is a perspective view of an external appearance of a vibration actuator according to Embodiment 4 of the present invention.
Figure 39:
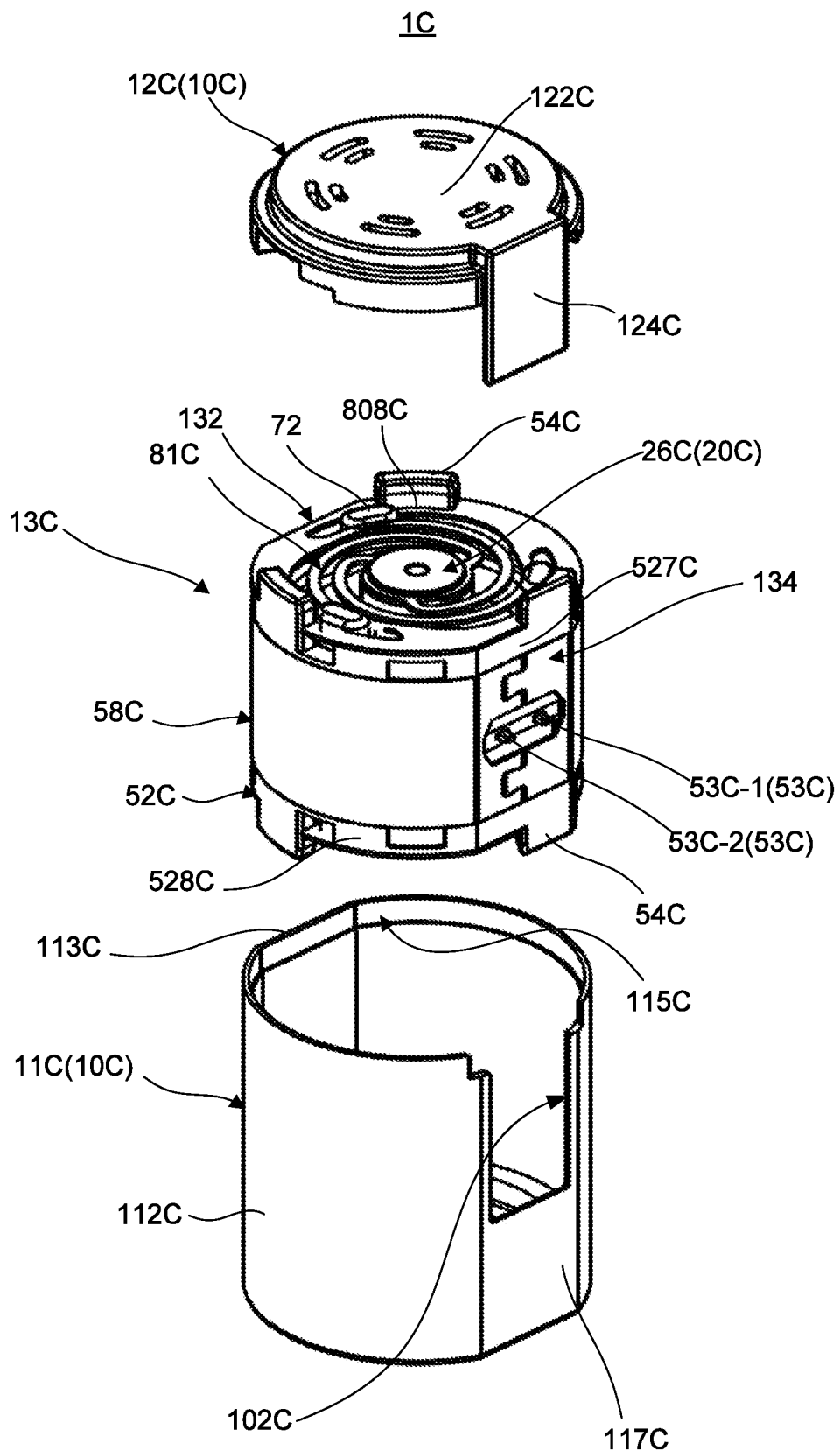
FIG. 39 is a perspective view of the vibration actuator from which a case is detached.
Figure 40:
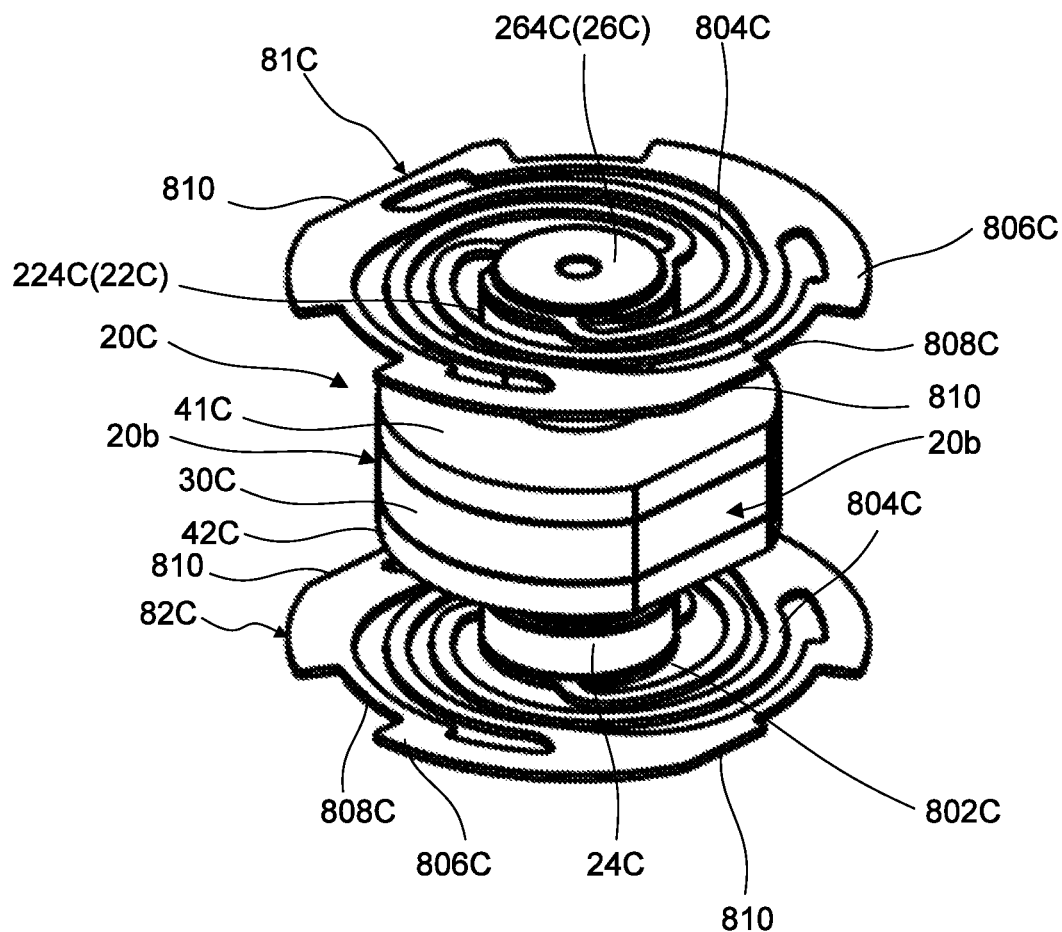
FIG. 40 is a perspective view of a movable body to which elastic supporting parts are fixed.
Figure 41:
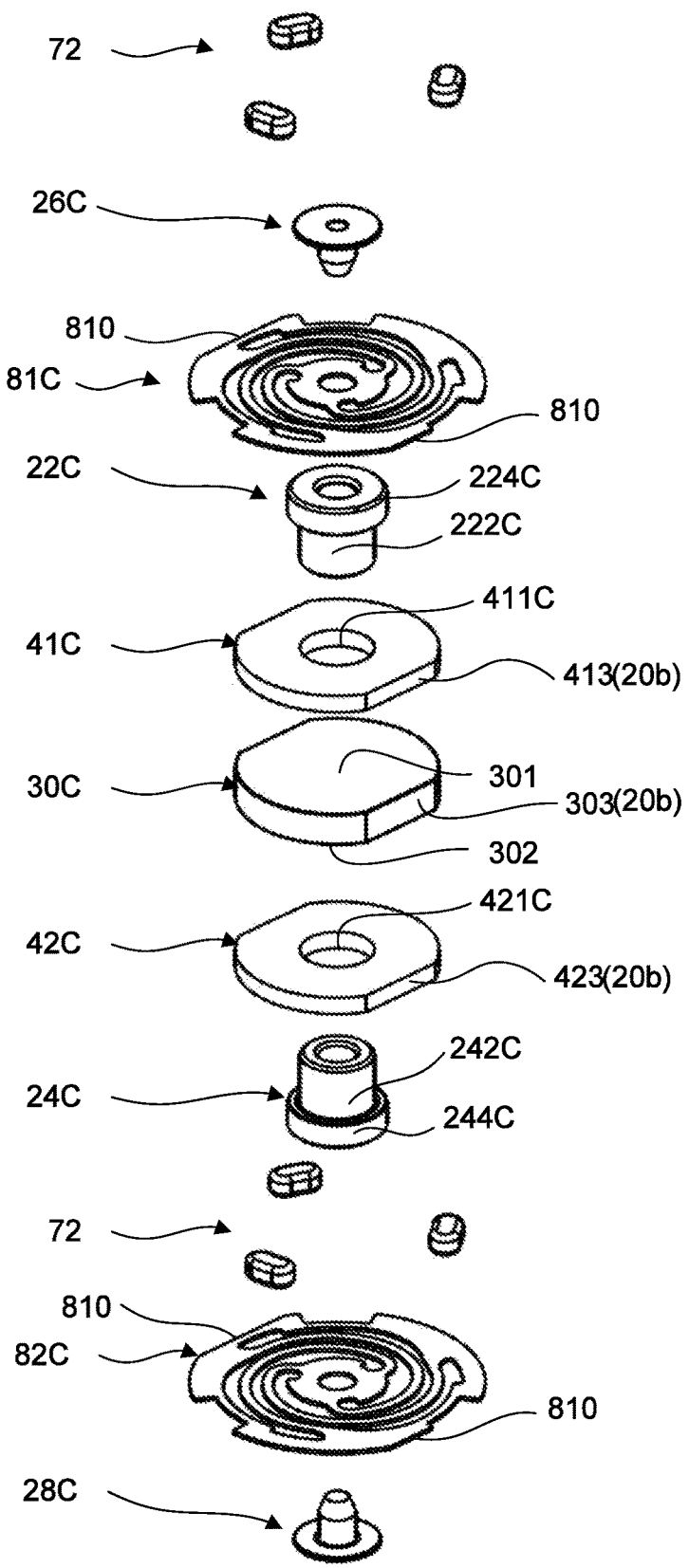
FIG. 41 is an exploded perspective view of the movable body and the elastic supporting parts.
Figure 42:
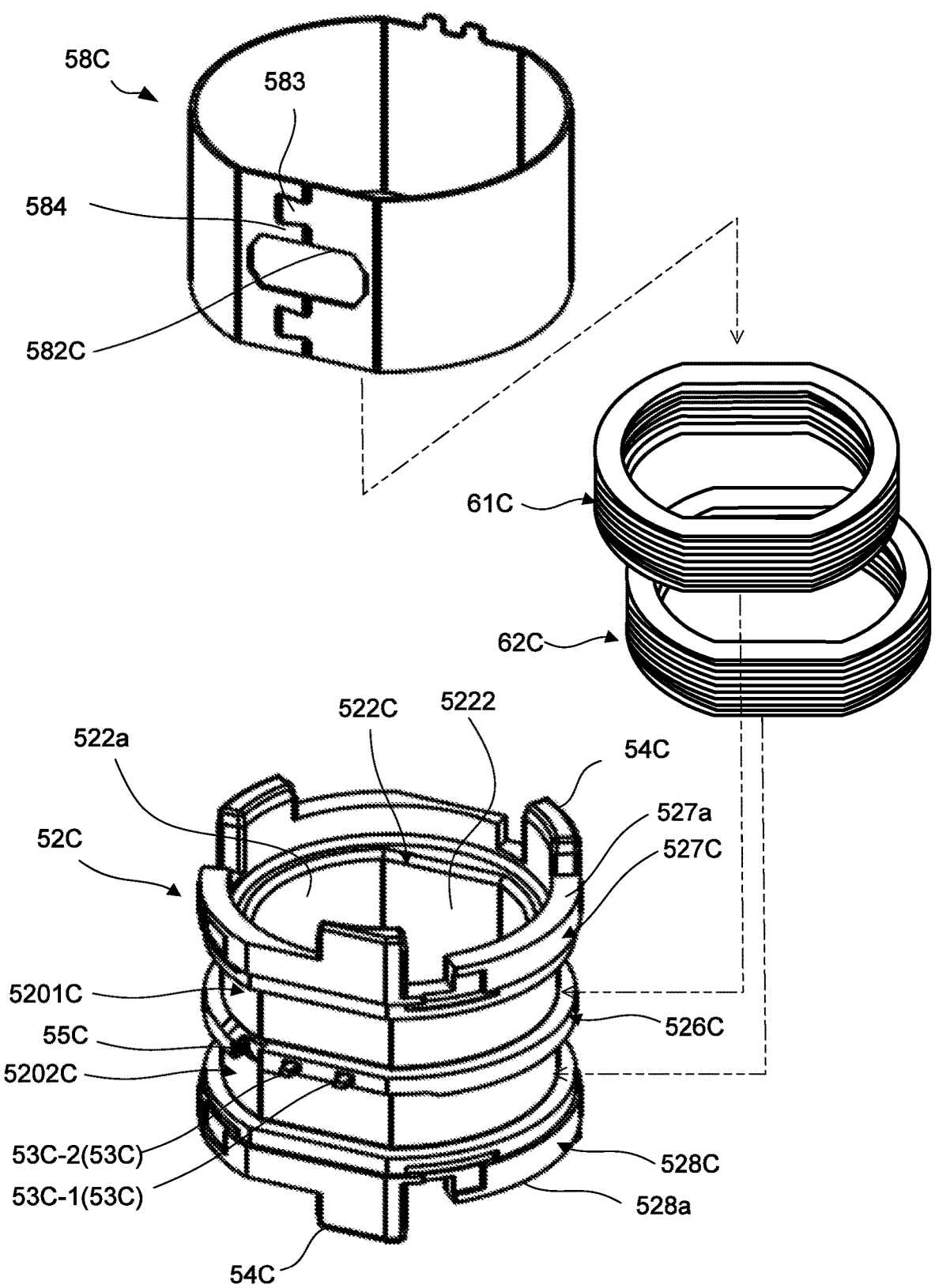
FIG. 42 illustrates a coil assembly with an electromagnetic shield part detached.
Figure 43:
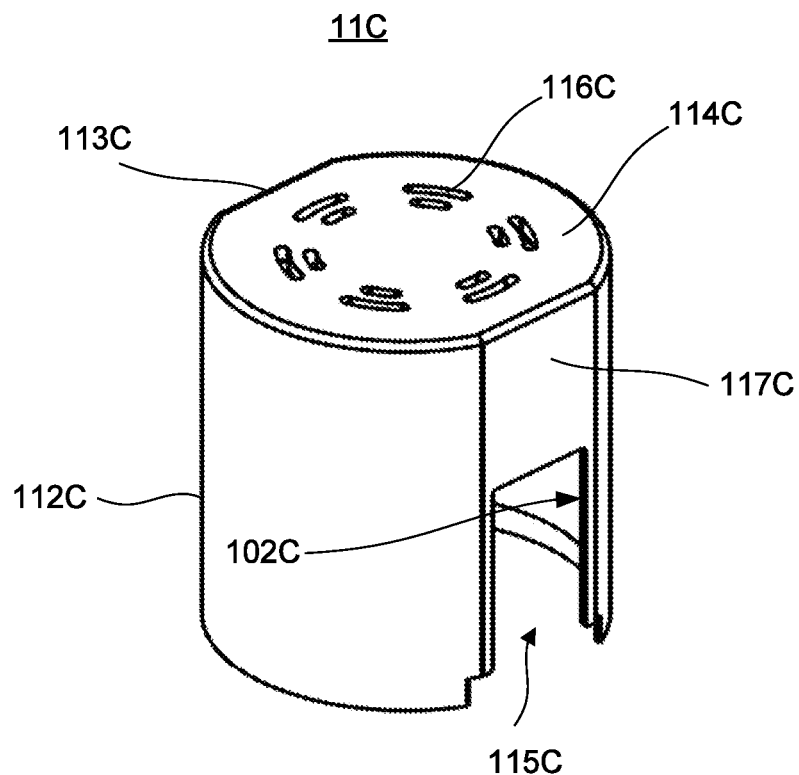
FIG. 43 is a bottom-surface-side perspective view of a case main body.
Figure 44:
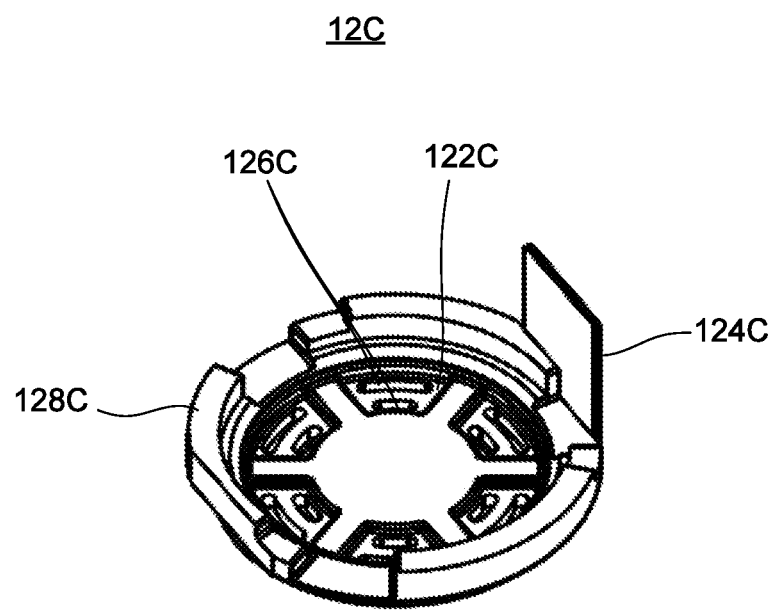
FIG. 44 is a perspective view of a lid portion as viewed from the back surface side.

FIG. 38 is an external perspective view of a vibration actuator according to Embodiment 4 of the present invention, and FIG. 39 is a perspective view of the vibration actuator from which the case is detached. FIG. 40 is a perspective view of a movable body to which elastic supporting parts are fixed, and FIG. 41 is an exploded perspective view of the movable body and the elastic supporting parts. FIG. 42 illustrates a coil assembly with an electromagnetic shield part detached, FIG. 43 is a bottom-surface-side perspective view of the case main body, and FIG. 44 is a perspective view of the lid portion as seen from the back surface side.

Vibration actuator 1C has the same functions as those of vibration actuator 1 although case 10C and driving unit 13C have the outer shape different from those of vibration actuator 1. Therefore, in the following description, similar constituent elements are provided with the same names and the same reference numerals with appropriate addition of the letter "C" to the reference numerals, and description thereof is omitted as appropriate.

As illustrated in FIG. 38, vibration actuator 1C includes driving unit 13C and case 10C having the same basic functions as driving unit 13C and case 10 of vibration actuator 1 while having shapes different therefrom. Case 10C includes, in the outer circumferential surface, flat surface portion 117C extending parallel to the vibration direction, and further, vibration actuator 1C includes, in the outer circumferential surface, another flat surface portion 113C parallel to flat surface portion 117C.

Driving unit 13C and case 10C differ from driving unit 13 and case 10 of Embodiment 1 only in their outer shapes, and driving unit 13C has an elliptical outer shape (oval shape) to be accommodated in an elliptical inner area of case 10C having an elliptical shape (oval outer shape).

Driving unit 13C includes cylindrical coil bobbin part (coil holding part) 52C for holding coils 61C and 62C, movable body 20C, electromagnetic shield part 58C, and elastic supporting parts 81C and 82C. Driving unit 13C includes, in the outer circumferential surface, a pair of unit flat surface portions 134 extending in the vibration direction. The pair of unit flat surface portions 132 and 134 are formed correspondingly to flat surface portions 113C and 117C of case 10C and are disposed at positions facing flat surface portions 113C and 117C.

Movable body 20C is supported inside cylindrical coil bobbin part 52C by elastic supporting parts 81C and 82C connected at the upper and lower end portions of the movable body, so as to be capable of reciprocating along coil bobbin part 52C (inner circumferential surface 522a of bobbin main-body portion 522C). Thus, in vibration actuator 1C, movable body 20C is supported to be capable of reciprocating in a direction in which lid portion 12C and bottom portion 114C face each other. Movable body 20C is joined to elastic supporting parts 81C and 82C by the sealing part without any gap.

Movable body 20C includes magnet 30C, movable-body cores 41C and 42C, spring retaining parts 22C and 24C, and fixation pins 26C and 28C. In the present embodiment, movable-body cores 41C and 42C and spring retaining parts 22C and 24C are continuously disposed respectively toward opposite sides from magnet 30C in the vibration (axis) direction. In movable body 20C, the outer circumferential surface of magnet 30C and movable-body cores 41C and 42C is disposed inside inner circumferential surface 522a of bobbin main-body portion 522 to face inner circumferential surface 522a with a predetermined gap being interposed between the outer circumferential surface of the magnet and the movable-body cores and the inner circumferential surface of the bobbin main-body portion.

Movable body 20C has a shape corresponding to the inner shape of case 10C. Movable body 20C includes movable-body-side flat portions 20b on the outer circumferential portion, and for example, has the shape of an elliptical plate (or elliptical cylinder) including a pair of parallel movable-body-side flat surface portions 20b.

Movable-body-side flat surface portions 20b are configured such that outer circumferential flat surface portions 303 formed in the outer circumferential surface of magnet 30C and core flat surface portions 413 and 423 formed in the outer circumferential surfaces of movable-body cores 41C and 42C are positioned to be placed on movable-body-side flat surface portions in the vibration (axis) direction (see FIG. 41).

Elastic supporting parts 81C and 82C include inner circumferential portions 802C, outer circumferential fixing portions 806C, deformation arm portions 804C having the same functions as those of inner circumferential portions 802, deformation arm portions 804, and outer circumferential fixing portions 806 of elastic supporting parts 81 and 82.

Each of outer circumferential fixing portions 806C includes linear portions 810, and differs from the configuration of outer circumferential fixing portion 806 in that it includes the linear portions. Two linear portions 810 are disposed respectively at the outer edges of outer circumferential fixing portions 806C such that the linear portions are parallel to each other across the center of the axis, and the linear portions can be disposed on the same planes as movable-body-side flat surface portions 20b of movable body 20C, respectively. Positioning groove 808C having a cutout shape is formed in one portion of the outer edges having linear portions 810.

The basic configuration of coil bobbin part (coil holding part) 52C is the same as coil bobbin part 52. As illustrated in FIG. 42, coil bobbin part 52C holds coils 61C and 62C wound on the outer circumferential surface the coil bobbin part, surrounds magnet 30C by inner circumferential surface 522a, and guides the movement of movable body 20C including magnet 30C.

Coil bobbin part 52C includes cylindrical bobbin main-body portion 522C, middle flange portion 526C and flange portions 527C and 528C protruding from the outer circumference of bobbin main-body portion 522C in the radial direction, terminal tying parts (coil connection parts) 53C, movable-range forming parts 54C, and linking groove portion 55C.

In coil bobbin part 52C, the outer circumference of bobbin main-body portion 522C is provided with coil attachment portions 5201C and 5202C between middle flange portion 526C and flange portions 527C and 528C. A pair of coils 61C and 62C are disposed to be wound around coil attachment portions 5201C and 5202C. Coils 61C and 62C are covered by electromagnetic shield part 58C. Terminal tying parts (coil connection parts) 53C-1 and 53C-2 are disposed to protrude from a flat portion of middle flange portion 526C.

The inner circumferential surface of coil bobbin part 52C, that is, inner circumferential surface 522a of bobbin main-body portion 522C includes inner circumferential flat surface portions 5222. Inner circumferential flat surface portions 5222 are disposed to correspondingly face movable-body-side flat surface portions 20b of movable body 20C. Note that, inner circumferential flat surface portions 5222 and movable-body-side flat surface portions 20b are disposed at positions corresponding to flat surface portions 113C and 117C of case 10C.

Movable-body-side flat surface portions 20b (outer circumferential flat surface portions 303) are narrower in a direction perpendicular to the vibration direction than inner circumferential flat surface portions 5222. Therefore, movable-body-side flat surface portions 20b including outer circumferential flat surface portions 303 and inner circumferential flat surface portions 5222, can be disposed close to each other, and thus, further miniaturization and thickness reduction of vibration actuator 1C can be achieved.

Case 10C is configured in an elliptical cylindrical shape by case main body 11C and lid portion 12C, and accommodates driving unit 13C. Specifically, case main body 11C includes circumferential wall portion 112C having flat surface portions 113C and 117C disposed symmetrically with respect to the center of the circle in the circumference, and bottom portion 114C. By circumferential wall portion 112C including flat surface portions 113C and 117C and by bottom portion 114C, case main body 11C is formed in a bottomed cylindrical shape which opens at elliptical opening portion 115C.

Flat surface portions 113C and 117C respectively include outer surfaces and inner surfaces parallel with each other. Cutout portion 102C continuous with opening portion 115C is formed in flat surface portion 117C. Cutout portion 102C is formed in a shape that corresponds to and is engageable with hanging portion 124C of lid portion 12C.

Case main body 11C as seen in the axial direction has an elliptical shape including flat surface portions 113C and 117C to each other in the outer circumferential surface, and includes an inner space of an elliptical shape (oval shape) which is open at opening portion 115C. This space accommodates driving unit 13C including elliptical unit flat surface portions 132 and 134 as seen in the vibration direction. Terminal tying parts (coil connection parts) 53C-1 and 53C-2 are exposed to the outside through cutout portion 102C.

Note that, lid portion 12C and bottom portion 114C form top surface portion 122C and the lower surface portion (bottom portion 114C) of vibration actuator 1. Like lid portion 12 and bottom portion 114, lid portion 12C and bottom portion 114C have a function as a movable-range reducing part that serves as a hard stop (movable range limitation) of movable body 20C, and regulate the movable range in which movable body 20C is movable.

Lid portion 12C and bottom portion 114C regulate, as the movable range, the length to the edge portions of the upper and lower end portions of driving unit 13C (the upper and lower end surfaces (opening end surfaces) of upper and lower flange portions 527C and 528C).

Thus, as in movable body 20, even when a force causing movable body 20C to move beyond the movable range is applied to the movable body, it is possible to increase the reliability without any damage being caused to elastic supporting parts 81C and 82C.

When lid portion 12C is attached to case main body 11C, hanging portion 124C is engaged with cutout portion 102C of case main body 11C to close cutout portion 102C. Hanging portion 124C is formed such that the outer surface is a flat surface, and the inner surface is in an arc shape whose central axis is oriented in the hanging direction. Accordingly, hanging portion 124C is engaged with cutout portion 102C. The outer surface of the hanging portion is flush with the outer surface of flat surface portion 117C. The arc surface of the inner surface of the hanging portion serves as an arc surface continuous with the inner surface of flat surface portion 117C. Driving unit 13C is thus positioned and accommodated.

Vent holes 126C and 116C having the same function as vent holes 126 and 116 are formed to extend through lid portion 12C and bottom portion 114C, respectively.

In vibration actuator 1C, elliptical driving unit 13C having an outer shape corresponding to the inner shape of case main body 11C is accommodated in elliptical bottomed cylindrical case main body 11C whose outer shape and inner shape are elliptical when viewed in the vibration (axial) direction. In addition, in vibration actuator 1C, the outer-diameter arc center of case main body 11C coincides with the outer-diameter arc center of driving unit 13C and the center of gravity of vibration of movable body 20C.

The outer shape of vibration actuator 1C is an elliptical shape (e.g., "oval shape") when viewed in the vibration direction (axial direction of the vibration actuator). Thus, when attaching vibration actuator 1C to the housing, it is possible to attach vibration actuator 1C to the housing by bringing flat surface portions 113C and 117C forming a part of the side surface of case main body 11C into contact with a flat surface portion of the housing on which mounting is performed. Thus, it is easier to attach vibration actuator 1C to the housing.

Further, the outer shape of driving unit 13C is a shape corresponding to the shape of case main body 11C. Thus, it is possible to obtain the same effect as in Embodiment 1. In addition, case main body 11C can have the same outermost diameter as the outer diameter of a circular case main body with the same outer diameter (case main body 11 of Embodiment 1). It is thus possible to reduce the size of the vibration actuator. Further, case 10C includes flat surface portions 113C and 117C parallel to the outer circumferential surface. It is thus possible to secure the stroke length of the vibration along these flat surface portions 113C and 117C.

Embodiment 5

Figure 45:
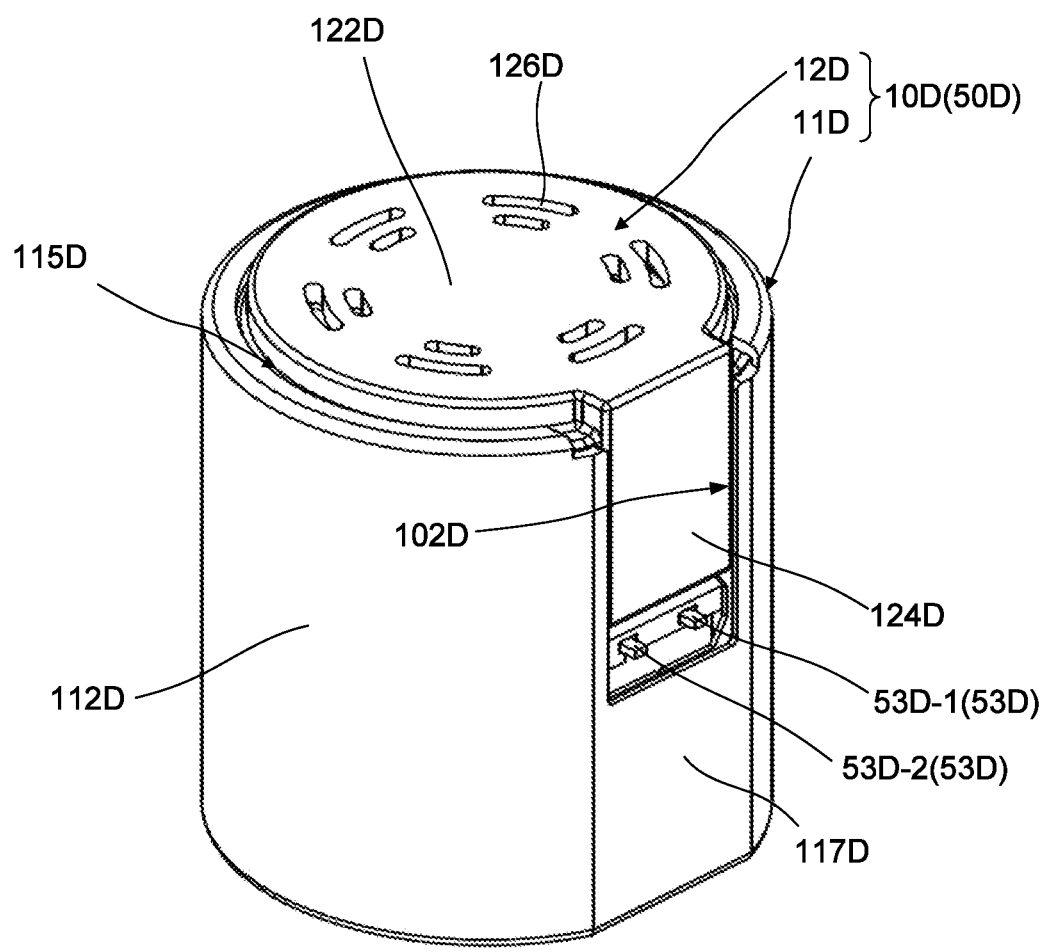
FIG. 45 is a perspective view of an external appearance of a vibration actuator according to Embodiment 5 of the present invention.
Figure 46:
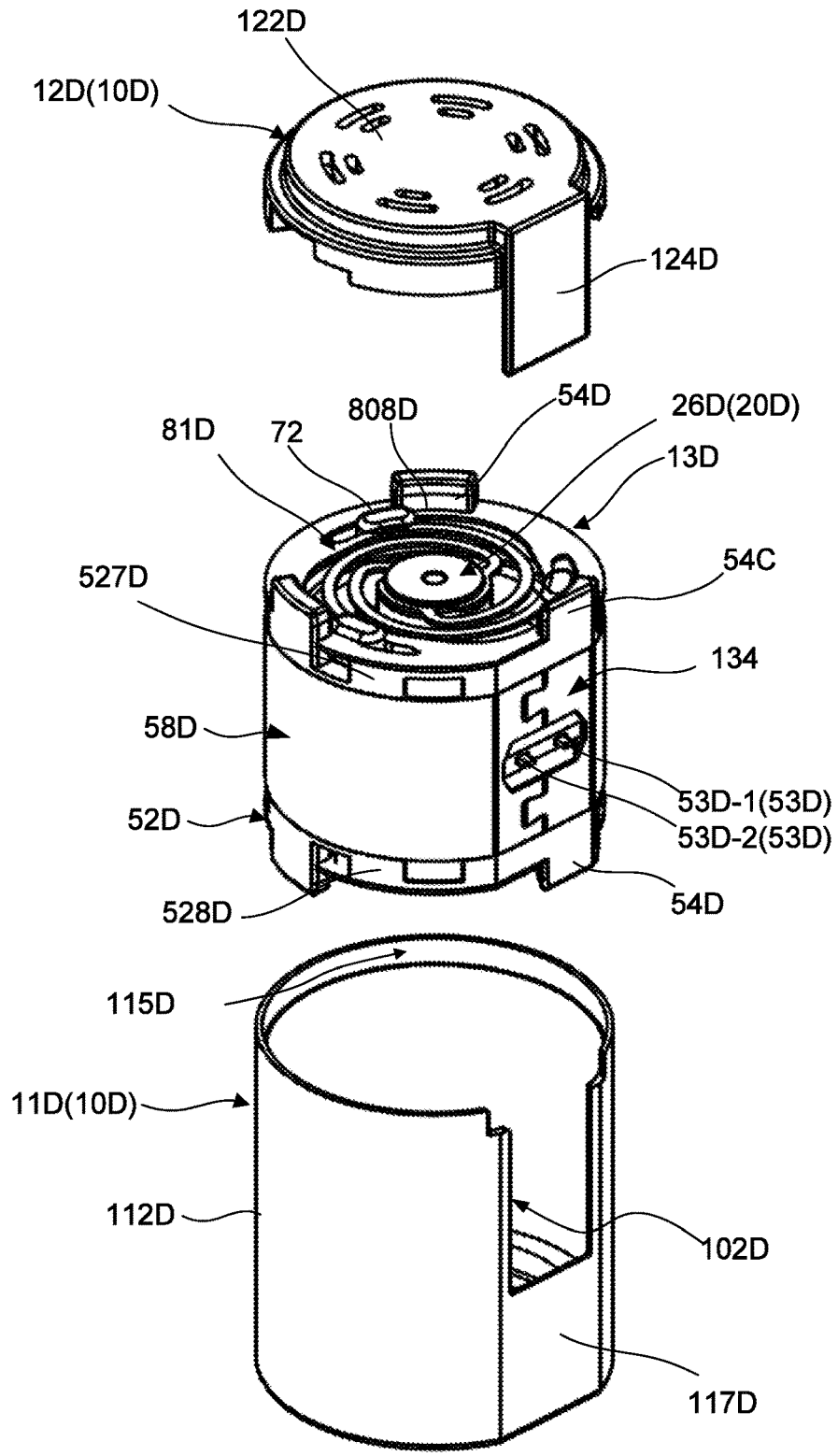
FIG. 46 is a perspective view of the vibration actuator from which a case is detached.
Figure 47:
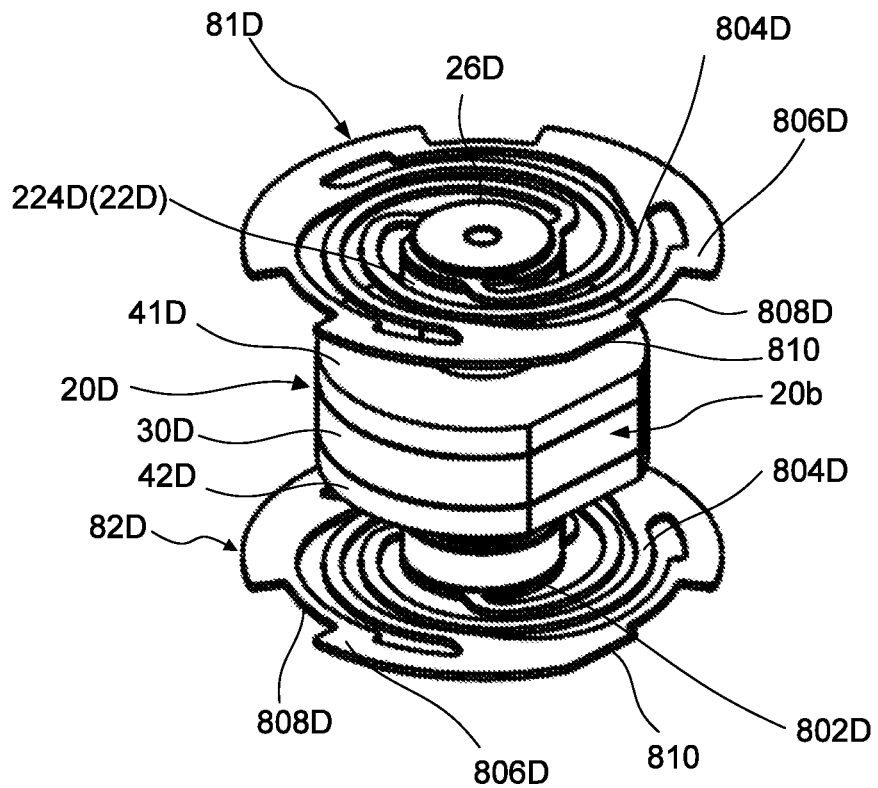
FIG. 47 is a perspective view of a movable body to which elastic supporting parts are fixed.
Figure 48:
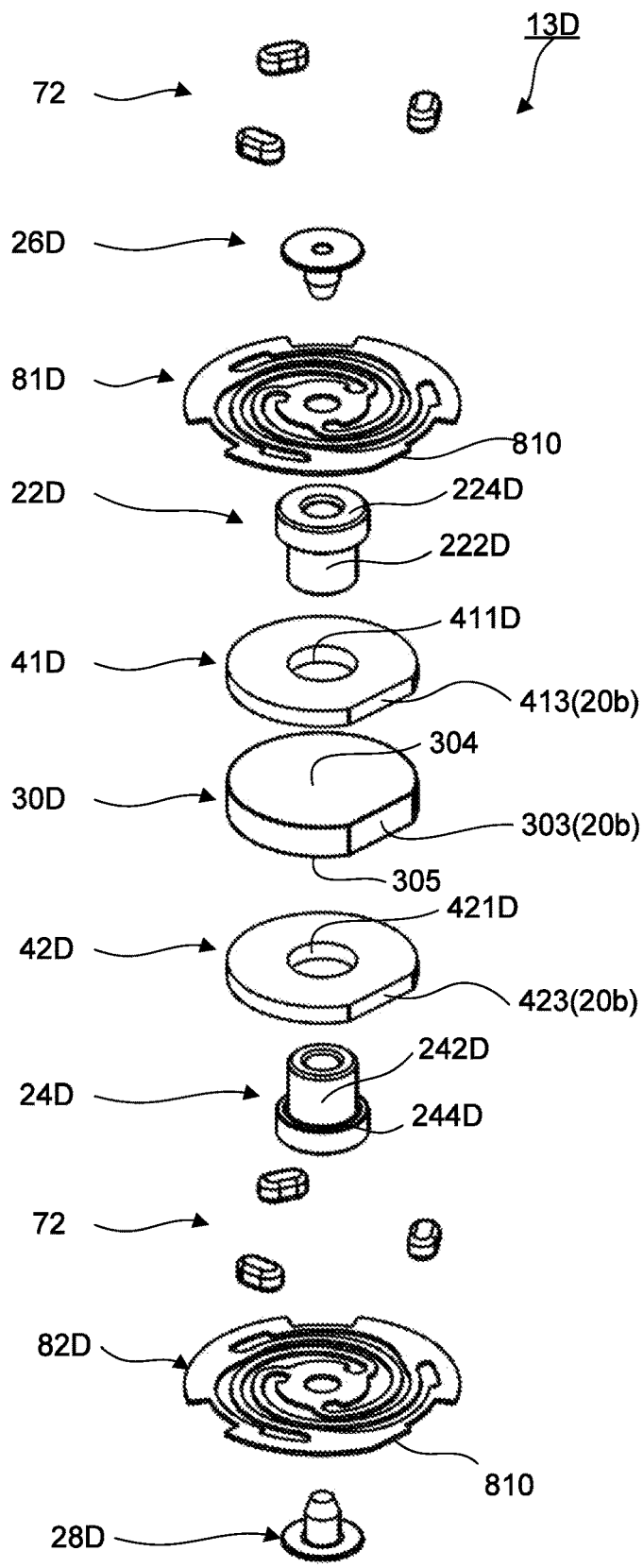
FIG. 48 is an exploded perspective view of the movable body and the elastic supporting parts.
Figure 49:
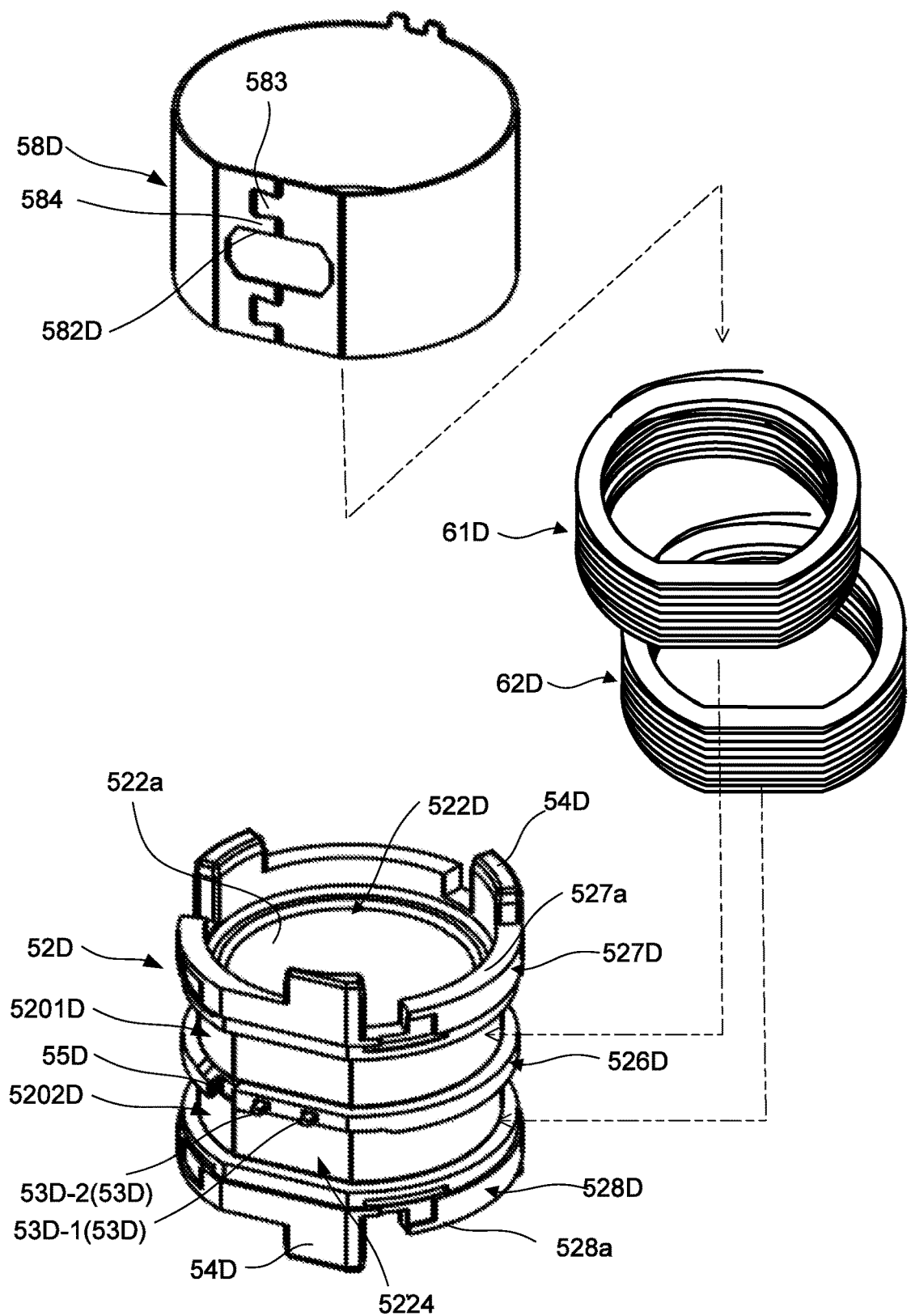
FIG. 49 illustrates a coil assembly with an electromagnetic shield part detached.
Figure 50:
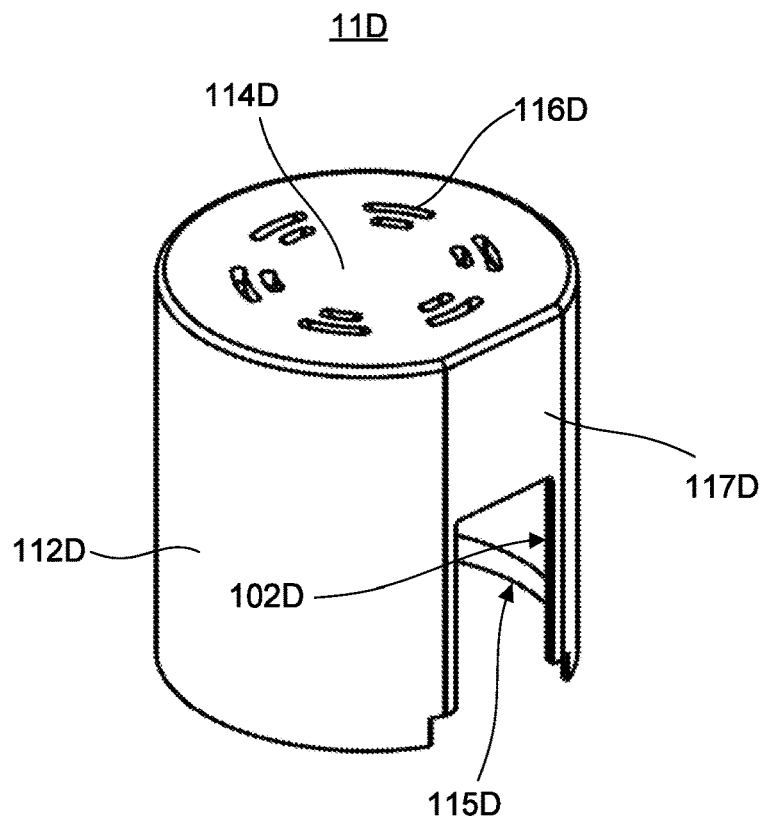
FIG. 50 is a bottom-surface-side perspective view of a case main body.
Figure 51:
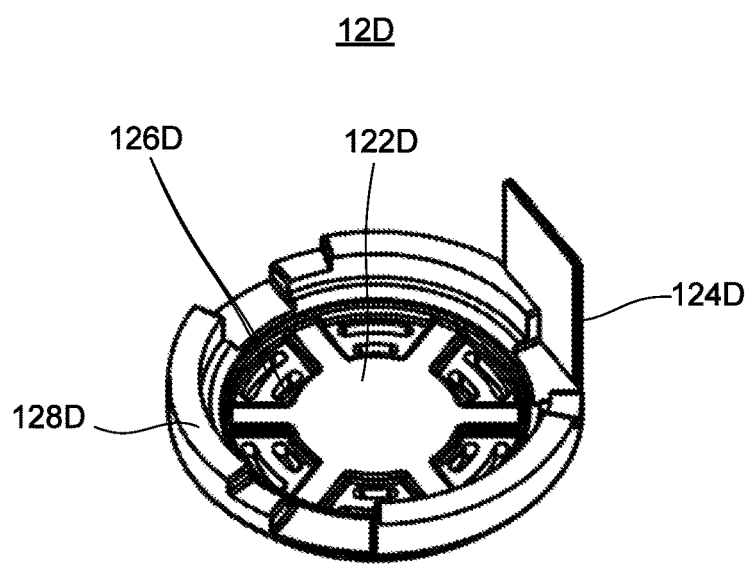
FIG. 51 is a perspective view of a lid portion as viewed from the back surface side.

FIG. 45 is an external perspective view of a vibration actuator according to Embodiment 5 of the present invention, and FIG. 46 is a perspective view of the vibration actuator from which the case is detached. FIG. 47 is a perspective view of a movable body to which elastic supporting parts are fixed, and FIG. 48 is an exploded perspective view of the movable body and the elastic supporting parts. FIG. 49 illustrates a coil assembly with an electromagnetic shield part detached, FIG. 50 is a bottom-surface-side perspective view of the case main body, and FIG. 51 is a perspective view of the lid portion as seen from the back surface side.

Vibration actuator 1D has the same functions as those of vibration actuator 1 although case 10D and driving unit 13D have the outer shape different from those of vibration actuator 1. Therefore, in the following description, similar constituent elements are provided with the same names and the same reference numerals with appropriate addition of the letter "D" to the reference numerals, and description thereof is omitted as appropriate.

As illustrated in FIG. 46, vibration actuator 1D includes driving unit 13D and case 10D having the same basic functions as driving unit 13 and case 10 of vibration actuator 1 while having shapes different therefrom.

Case 10D differs from case 10 in that the outer circumferential surface has flat surface portion 117D extending parallel to the vibration direction. Further, driving unit 13D can be accommodated in case 10D and has a shape corresponding to the shape of case 10D.

Driving unit 13D includes electromagnetic shield part 58D, coils 61D and 62D, coil bobbin part 52D, movable body 20D, electromagnetic shield part 58D, and elastic supporting parts 81D and 82D. As illustrated in FIG. 46, driving unit 13D includes, in the outer circumferential surface, unit flat surface portion 134 extending in the vibration direction. The outer shape of driving unit 13D with this configuration has a D-shape. Unit flat surface portion 134 is provided in the outer shape of coil bobbin part 52D and electromagnetic shield part 58D. Terminal tying parts 53C-1 and 53C-2 are disposed in unit flat surface portion 134.

Movable body 20D is supported inside cylindrical coil bobbin part 52D by elastic supporting parts 81D and 82D connected at the upper and lower end portions of the movable body, so as to be capable of reciprocating along coil bobbin part 52D (inner circumferential surface 522a of bobbin main-body portion 522D). Thus, in vibration actuator 1D, movable body 20D is supported to be capable of reciprocating in a direction in which lid portion 12D and bottom portion 114D face each other. Movable body 20D is joined to elastic supporting parts 81D and 82D by the sealing part without any gap.

Movable body 20D includes magnet 30D, movable-body cores 41D and 42D, spring retaining parts 22D and 24D, and fixation pins 26D and 28D. In the present embodiment, movable-body cores 41D and 42D and spring retaining parts 22D and 24D are continuously disposed respectively toward opposite sides from magnet 30D in the vibration (axis) direction. In movable body 20D, the outer circumferential surface of magnet 30D and movable-body cores 41D and 42D as a movable-body-side outer circumferential surface is disposed inside inner circumferential surface 522a of bobbin main-body portion 522D to face inner circumferential surface 522a with a predetermined gap being interposed between the outer circumferential surface of the magnet and the movable-body cores and the inner circumferential surface of the bobbin main-body portion.

Movable body 20D has a shape corresponding to the inner shape of case 10D. Movable body 20D includes one movable-body-side flat surface portion 20b on the outer circumferential portion (including outer circumferential flat surface portion 303 of the magnet), and for example, has the shape of a D-shaped plate (or D-shaped column) when viewed in the vibration direction. Such a shape includes movable-body-side flat surface portion 20b.

Movable-body-side flat surface portion 20b is formed by outer circumferential flat surface portion 303 and core flat surface portions 413 and 423 formed respectively on parts of the outer circumferential surfaces of magnet 30D and movable-body cores 41D and 42D (see FIG. 48). Outer circumferential flat surface portion 303 and core flat surface portions 413 and 423 are positioned to be placed on top of the other in the vibration (axis) direction.

Elastic supporting parts 81D and 82D include inner circumferential portions 802D, outer circumferential fixing portions 806D, deformation arm portions 804D having the same functions as those of inner circumferential portions 802, deformation arm portions 804, and outer circumferential fixing portions 806 of elastic supporting parts 81 and 82 in Embodiment 1.

Each of outer circumferential fixing portions 806D includes linear portions 810, and differs from the configuration of outer circumferential fixing portion 806 in that it includes the linear portions. Two linear portions 810 are disposed at a part of the outer edges of each of outer circumferential fixing portions 806D, and can be disposed on the same planes as movable-body-side flat surface portions 20b of movable body 20D. Positioning groove 808D having a cutout shape is formed in one portion of the outer edges having linear portions 810.

The basic configuration of coil bobbin part (coil holding part) 52D is the same as coil bobbin part 52. As illustrated in FIG. 49, coil bobbin part 52D holds coils 61D and 62D wound on the outer circumferential surface the coil bobbin part, surrounds magnet 30D (see FIG. 48) by inner circumferential surface 522a, and guides the movement of movable body 20D including magnet 30D.

Coil bobbin part 52D includes cylindrical bobbin main-body portion 522D, middle flange portion 526D and flange portions 527D and 528D protruding from the outer circumference of bobbin main-body portion 522D in the radial direction, terminal tying parts (coil connection parts) 53D-1 and 53-2, movable-range forming parts 54D, and linking groove portion 55D.

In coil bobbin part 52D, the outer circumference of bobbin main-body portion 522D is provided with coil attachment portions 5201D and 5202D between middle flange portion 526D and flange portions 527D and 528D. A pair of coils 61 and 62 are disposed to be wound around coil attachment portions 5201D and 5202D. Coils 61D and 62D are covered by electromagnetic shield part 58D. Terminal tying parts (coil connection parts) 53D-1 and 53D-2 are disposed to protrude from a flat portion of middle flange portion 526D.

Coil bobbin part 52D includes flat surface portion 5224 extending parallel to the vibration direction. The inner circumferential surface of flat surface portion 5224, that is, a part of inner circumferential surface 522a of bobbin main-body portion 522D is an inner circumferential flat surface portion. The inner circumferential flat surface portion of flat surface portion 5224 is disposed to correspondingly face movable-body-side flat surface portion 20b of movable body 20D. These surface portions are disposed close to each other.

Note that, flat surface portion 5224 and movable-body-side flat surface portions 20b are disposed at a position corresponding to flat surface portion 117D of case 10D.

Case 10D includes case main body 11D and lid portion 12D and is formed in a columnar shape having a D shape as seen in the vibration direction. Case 10D accommodates driving unit 13D. Specifically, case main body 11D includes circumferential wall portion 112D partly provided with flat surface portion 117D, and bottom portion 114D. Case main body 11D is formed by circumferential wall portion 112D and bottom portion 114D in a bottomed cylindrical shape which opens at D-shaped opening portion 115D.

Flat surface portion 117D has a flat outer surface. Cutout portion 102D that extends through the outer surface and the inner surface and is continuous to opening portion 115D is formed in flat surface portion 117D. Cutout portion 102D is formed in a shape that corresponds to and is engageable with hanging portion 124D of lid portion 12D.

The outer shape of case main body 11D as seen in the axial direction is a D shape, and the inner shape (the shape of inner circumferential surface as seen in the vibration direction) is also a D shape corresponding to the outer shape. Case main body 11D includes a space formed in a D shape that is open at opening portion 115D. Cylindrical driving unit 13D including movable-body-side flat surface portions 20b in the outer circumferential surface is accommodated in this space. Terminal tying parts (coil connection parts) 53D-1 and 53D-2 are exposed to the outside through cutout portion 102D.

Note that, lid portion 12D and bottom portion 114D form top surface portion 122D and bottom portion 114D of vibration actuator 1. Like lid portion 12 and bottom portion 114, lid portion 12D and bottom portion 114D have a function as a movable-range reducing part that serves as a hard stop (movable range limitation) of movable body 20D.

Lid portion 12D and bottom portion 114D regulate, as the movable range, the length to the edge portions of the upper and lower end portions of driving unit 13D (the upper and lower end surfaces (opening end surfaces) of upper and lower flange portions 527D and 528D). Thus, as in movable body 20, even when a force causing movable body 20D to move beyond the movable range is applied to the movable body, it is possible to increase the reliability without any damage being caused to elastic supporting parts 81D and 82D.

When lid portion 12D is attached to case main body 11D, hanging portion 124D is engaged with cutout portion 102D of case main body 11D to close cutout portion 102D. Hanging portion 124D is formed such that the outer surface is a flat surface, and the inner surface is in an arc shape whose central axis is oriented in the hanging direction. Accordingly, hanging portion 124D is engaged with cutout portion 102D. The outer surface of the hanging portion is flush with the outer surface of flat surface portion 117D. The arc surface of the inner surface of the hanging portion serves as an arc surface continuous with the inner surface of flat surface portion 117D. Driving unit 13D is thus positioned and accommodated.

Vent holes 126D and 116D having the same function as vent holes 126 and 116 are formed to extent through lid portion 12D and bottom portion 114D, respectively.

In vibration actuator 1D, D-shaped driving unit 13D having an outer shape corresponding to the inner shape of case main body 11D is accommodated in D-shaped bottomed cylindrical case main body 11D whose outer shape and inner shape are D-shaped when viewed in the vibration (axial) direction.

In addition, in vibration actuator 1D, the outer-diameter arc center of case main body 11D coincides with the outer-diameter arc center of driving unit 13D and the center of gravity of vibration of movable body 20D.

The outer shape of vibration actuator 1D as seen in the vibration direction (axial direction of the vibration actuator is a shape (D shape) including flat surface portion 117D in the outer circumferential surface. Thus, flat surface portion 117D of case main body 11D forming the outer circumferential surface can make contact with a flat surface portion of a housing where the case main body is mounted. The flat surfaces can be joined. It is thus possible to attach vibration actuator 1D to the housing.

Thus, it is easier to attach vibration actuator 1D to the housing. Further, the outer shape of driving unit 13D is a shape corresponding to the shape of case main body 11D. Thus, it is possible to obtain the same effect as in Embodiment 1. In addition, case main body 11D can have an outermost diameter as the outer diameter of a circular case main body with the same outer diameter (case main body 11 of Embodiment 1). It is thus possible to reduce the size of the vibration actuator.

Embodiment 6

Figure 52:
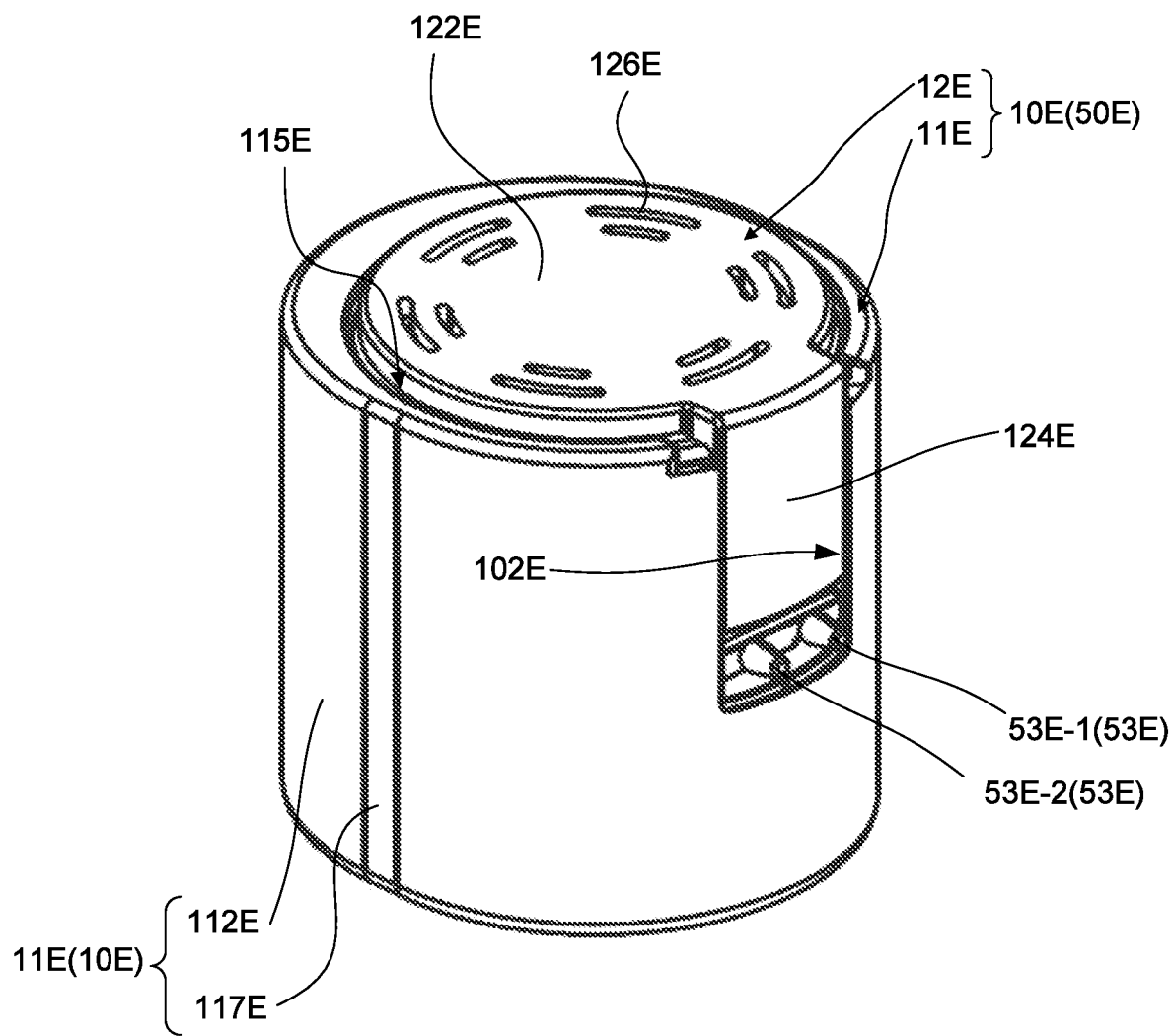
FIG. 52 is a perspective view of an external appearance of a vibration actuator according to Embodiment 6 of the present invention.
Figure 53:
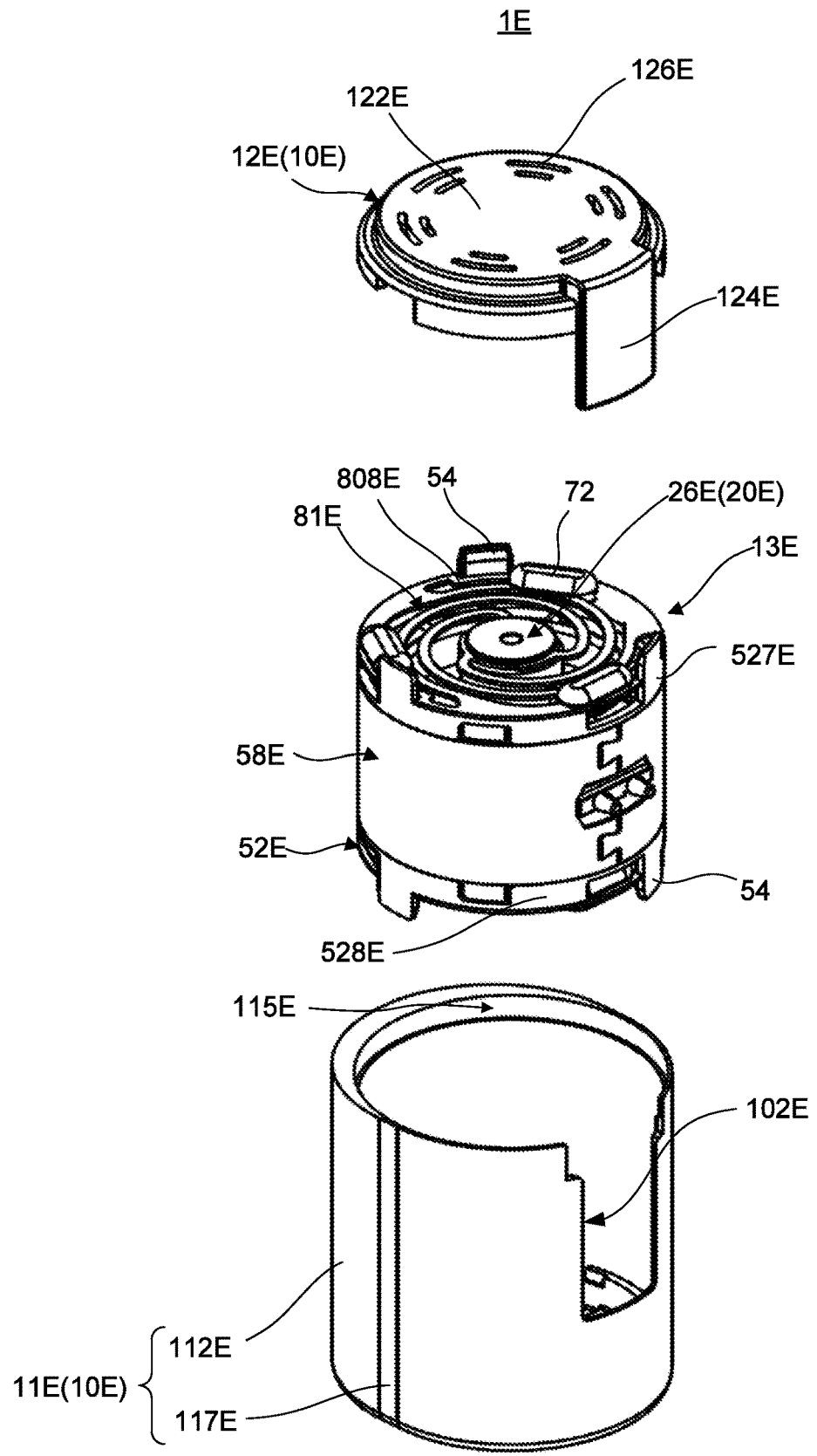
FIG. 53 is a perspective view of the vibration actuator from which a case is detached.
Figure 54:
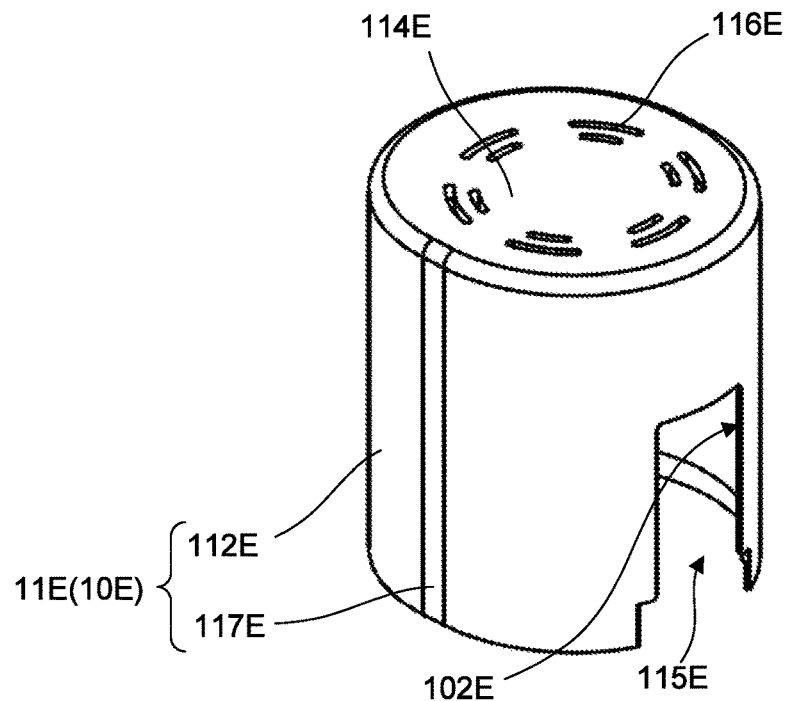
FIG. 54 is a bottom-surface-side perspective view of a case main body.
Figure 55:
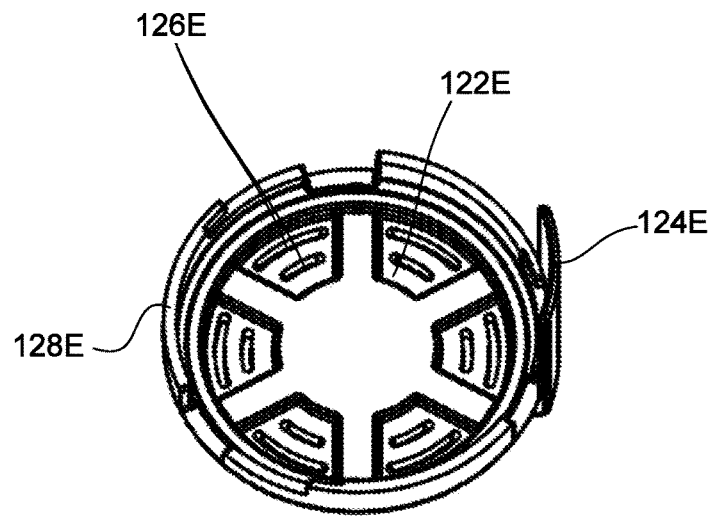
FIG. 55 is a perspective view of a lid portion as viewed from the back surface side.
Figure 56:
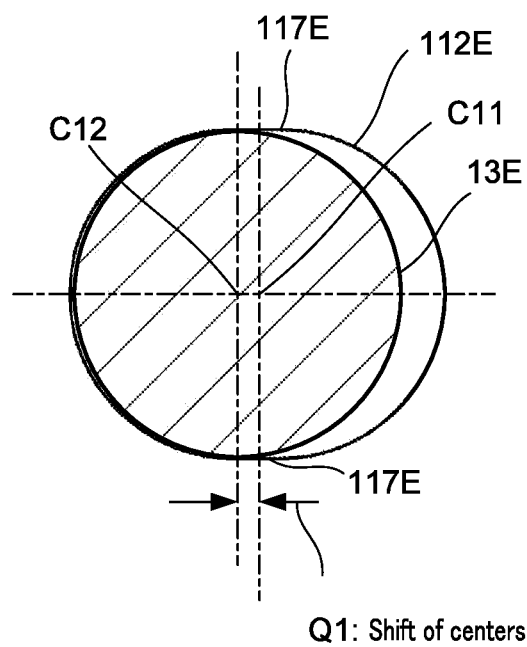
FIG. 56 schematically illustrates the positional relationship between a driving unit and the case in the vibration actuator according to Embodiment 6.

FIG. 52 is an external perspective view of a vibration actuator according to Embodiment 6 of the present invention, FIG. 53 is a perspective view of the vibration actuator from which the case is detached, and FIG. 54 is a bottom-surface-side perspective view of the case main body. Further, FIG. 55 is a perspective view of the lid portion from the back surface side, and FIG. 56 is a diagram schematically illustrating the positional relationship between the driving unit and the case in the vibration actuator according to Embodiment 6.

Vibration actuator 1E is similar in basic configuration to vibration actuator 1A of Embodiment 2, but differs from vibration actuator 1A in the width of flat surface portion 117E and the positional relation between driving unit 13E and case 10E. In particular, vibration actuator 1E differs from vibration actuator 1A in that the center of driving unit 13E and the center of movable body 20E as seen in the vibration direction (axial direction) are disposed at positions eccentric with respect to the center of case 10E. In other words, vibration actuator 1E differs from vibration actuator 1A in that the outer arc center of driving unit 13E and the center of gravity of vibration of movable body 20E are shifted in a direction perpendicular to the vibration direction with respect to the center of the arc portion of the outer shape of case 10E. In the following description, similar components are denoted by the same names and the reference symbols in which the letter "A" is changed to "E," and description thereof will be omitted as appropriate.

Vibration actuator 1E includes driving unit 13E and case 10E for accommodating driving unit 13E which have the same configuration as driving unit 13.

Case 10E is formed in an elliptical cylindrical shape (oval shape) including, in the outer circumferential surface, flat surface portion 117E extending in the vibration direction. Case 10E includes case main body 11E and lid portion 12E.

The outer circumferential surface of case main body 11E as seen in the vibration (axial) direction is a flat surface. The case main body includes circumferential wall portion 112E including a pair of flat surface portions 117E disposed to face each other. The case main body also includes bottom portion 114E. Case main body 11E is formed by circumferential wall portion 112E and bottom portion 114E in a bottomed cylindrical shape which opens at elliptical (oval) opening portion 115E.

Flat surface portions 117E are, for example, portions of circumferential wall portion 112E including outer surfaces and inner surfaces parallel with each other. In case main body 11E, cutout portion 102E that continues to opening portion 115E is formed at a portion of the case main body on a side on which the center of accommodated driving unit 13E (coil bobbin part 52E) is eccentric with respect to the center of the case main body as seen in the vibration direction. Cutout portion 102E is formed in a shape that corresponds to and is engageable with hanging portion 124E of lid portion 12E.

Case main body 11E includes an inner space which is open at elliptical opening portion 115E. This inner space accommodates cylindrical driving unit 13E. Terminal tying parts (coil connection parts) 53E-1 and 53E-2 are exposed to the outside via cutout portion 102E.

Within cutout portion 102E, terminal tying parts (coil connection parts) 53E-1 and 53E-2 are disposed. By terminal tying parts (coil connection parts) 53E-1 and 53E-2 disposed in this position, it is possible to easily electrically connect terminal tying parts (coil connection parts) 53E-1 and 53E-2 to the outside of an external terminal or the like after mounting in a housing where the mounting is performed via flat surface portions 117E.

Lid portion 12E and bottom portion 114E have the same configurations and functions as those of lid portion 12 and bottom portion 114 of Embodiment 1. Lid portion 12E and bottom portion 114E have a function as a movable-range reducing part that serves as a hard stop (movable range limitation) of movable body 20E, and regulate the movable range in which movable body 20E is movable. In addition, lid portion 12E and bottom portion 114E regulate, as the movable range, a space of the lengths from lid portion 12E and bottom portion 114E to the edge portions of the upper and lower end portions of driving unit 13E (upper and lower end surfaces (opening end surfaces) of upper and lower flange portions 527E and 528E). Thus, even when a force causing movable body 20E to move beyond the movable range is applied to movable body 20E, elastic supporting part 81E makes contact with fixing body 50E (at least one of lid portion 12E and bottom portion 114E) without being plastically deformed, so that elastic supporting part 81E is not damaged, and reliability can be increased.

When lid portion 12E is attached to case main body 11E, hanging portion 124E is engaged with cutout portion 102E of case main body 11, and closes cutout portion 102E, with terminal tying parts (coil connection parts) 53E-1 and 53E-2 being exposed to the outside.

Hanging portion 124E is formed such that the outer surface is an arc-shaped curved surface, and the inner surface is in an arc shape whose central axis is oriented in the hanging direction. Thus, hanging portion 124E is disposed such that its outer surface is substantially flush with the outer surface of case 10E (circumferential wall portion 112E) and an arc surface being its inner surface positions driving unit 13E and accommodates the driving unit. Vent holes 126E and 116E having the same function as vent holes 126 and 116 are formed to extend through lid portion 12E and bottom portion 114E, respectively.

In vibration actuator 1E, circular case main body 11E whose outer shape is an elliptical shape (oval shape) when viewed in the vibration (axial) direction accommodates driving unit 13E whose outer shape is circular, such that the driving unit is disposed at an eccentric position. That is, outer-shape center C11 of case main body 11E is shifted by the distance of Q1 from the outer-diameter arc center of driving unit 13E and center C12 of gravity of vibration of movable body 20. Here, the driving unit is accommodated such that movement in one of the directions perpendicular to the vibration direction and orthogonal to each other is restricted, and a shift by Q1 in the other direction is present.

The outer shape of vibration actuator 1E is an elliptical shape (oval shape) having flat surface portion 117E on circumferential wall portion 112E as seen in the vibration (axial) direction. Thus, when attaching vibration actuator 1E to the housing, it is possible to attach vibration actuator 1E to the housing by bringing a flat surface of flat surface portion 117E of case main body 11E into contact with a flat surface portion of the housing on which mounting is performed. Thus, it is easier to attach vibration actuator 1E to the housing.

When driving unit 13E has the same outer shape as that of driving unit 13 of Embodiment 1, lid portion 12E the same as lid portion 12 can be used. In this case, in vibration actuator 1E, by changing only corresponding case main body 11E, it is possible to obtain the same effect as in Embodiment 1 while maintaining the same vibration feeling.

In addition, outer-shape center C11 of case main body 11E is shifted by the distance of Q1 from the outer-diameter arc center of driving unit 13E and center C12 of gravity of vibration of movable body 20E. That is, coil bobbin part (coil holding part) 52E is eccentrically disposed with respect to the center of case 10E.

Thus, it is possible to obtain the same effect as in Embodiment 1. It is also possible to accommodate driving unit 13E in case main body 11E without forming the flat surface portion in driving unit 13E into a shape corresponding to flat surface portion 117E of case main body 11E. Therefore, according to vibration actuator 1E, it is possible to stably cause a vibration, and it is possible to impart a stable vibration feeling.

Embodiment 7

Figure 57:
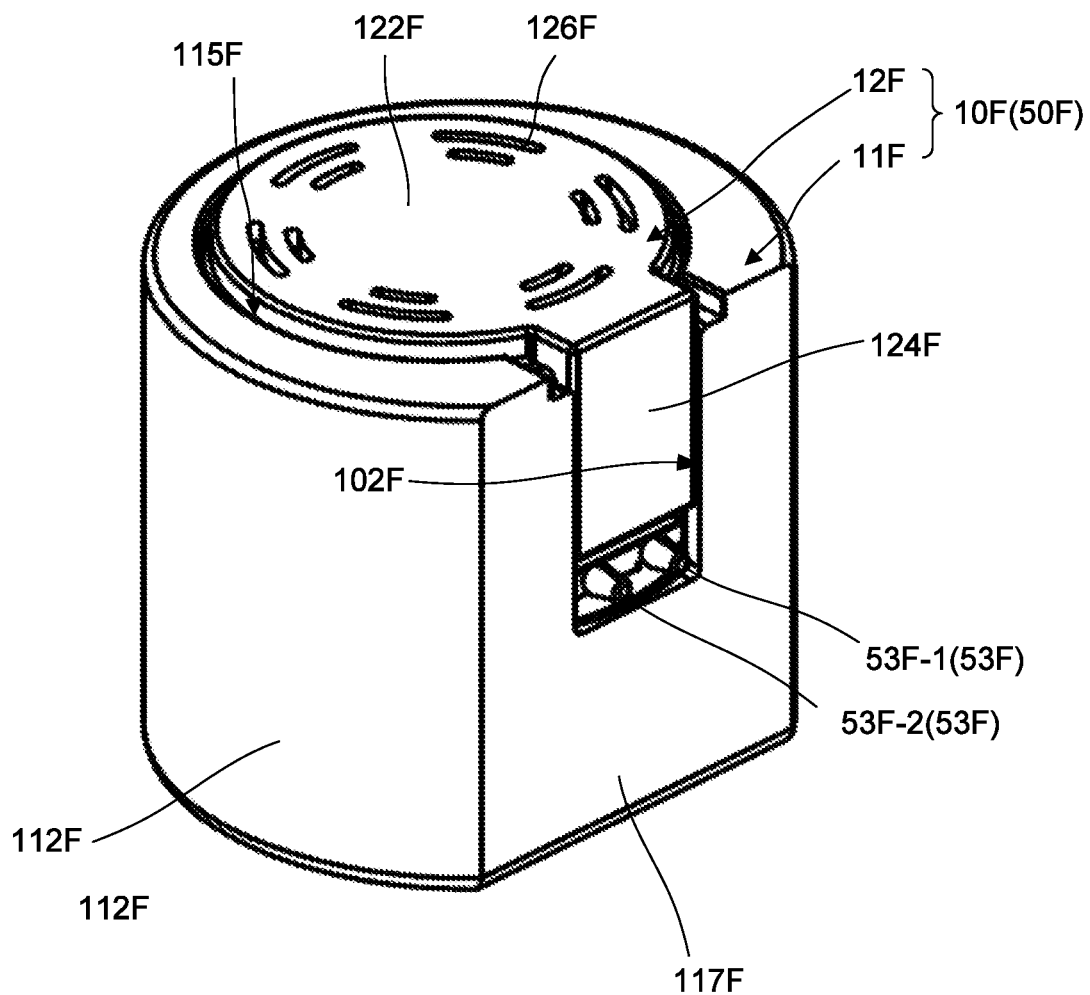
FIG. 57 is a perspective view of an external appearance of a vibration actuator according to one Embodiment 7 of the present invention.
Figure 58:
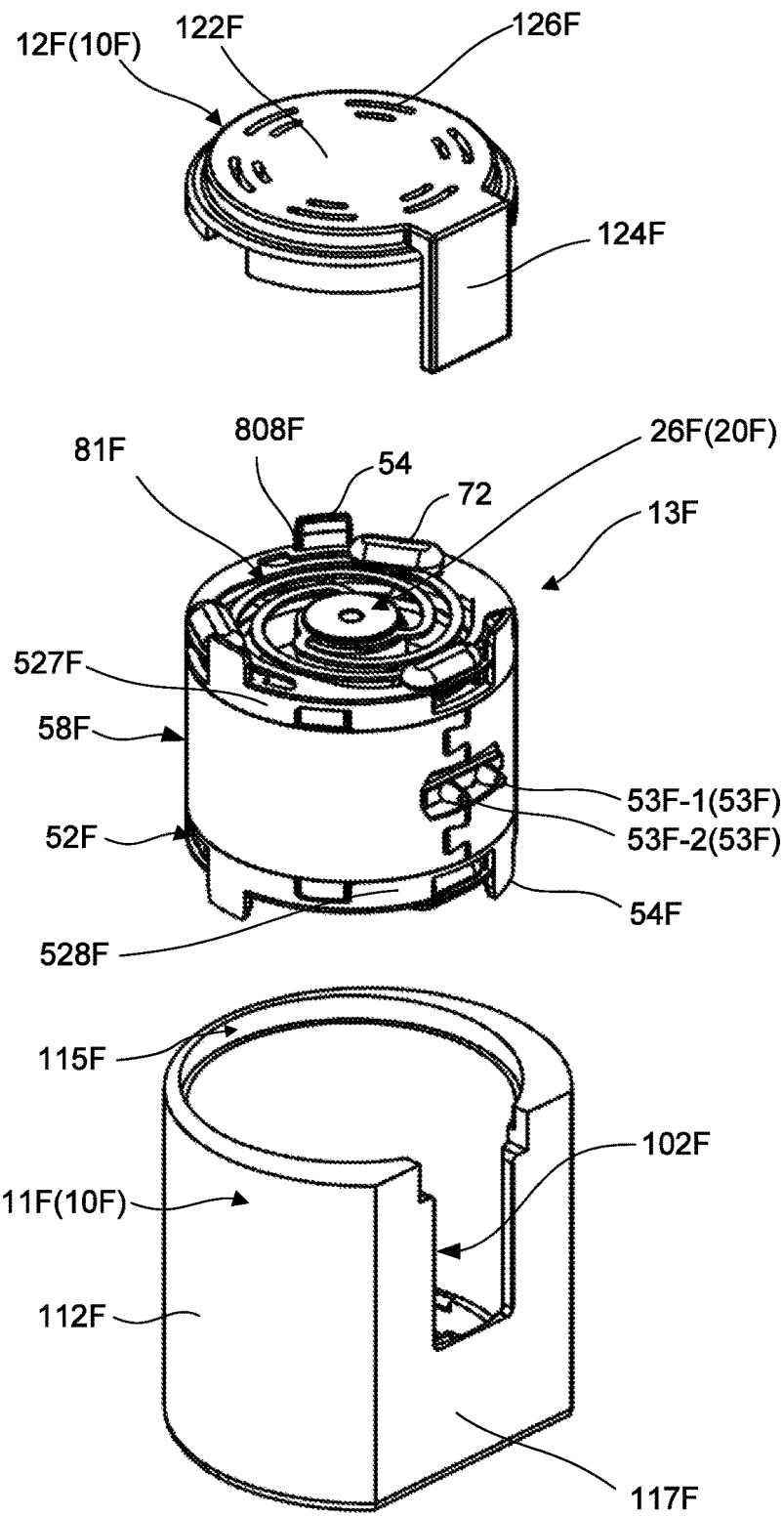
FIG. 58 is a perspective view of the vibration actuator from which a case is detached.
Figure 59:
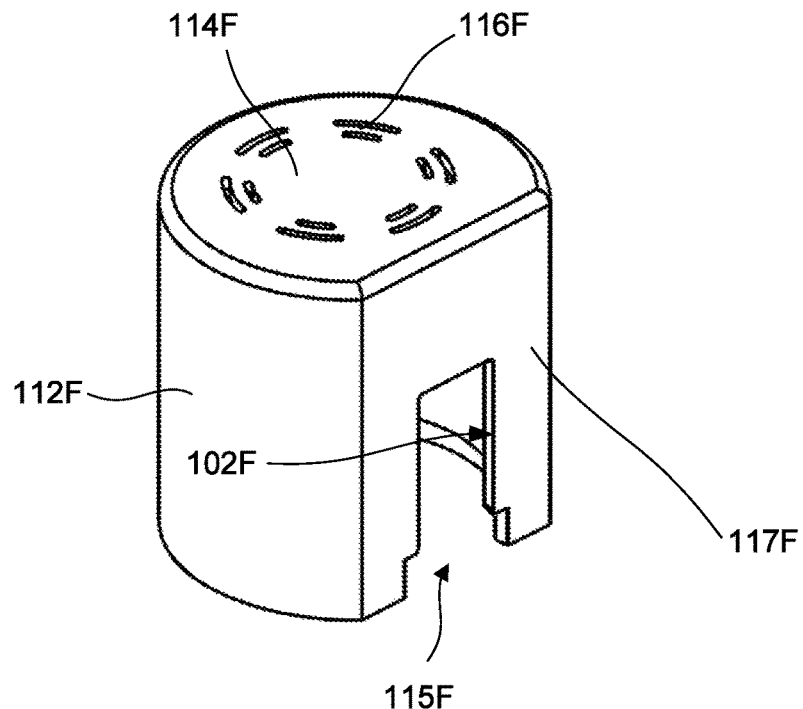
FIG. 59 is a bottom-surface-side perspective view of a case main body.
Figure 60:
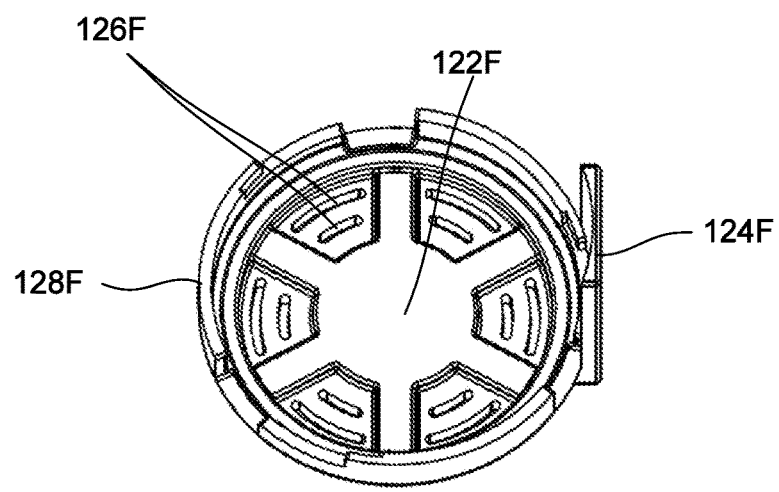
FIG. 60 is a perspective view of a lid portion as viewed from the back surface side.
Figure 61:
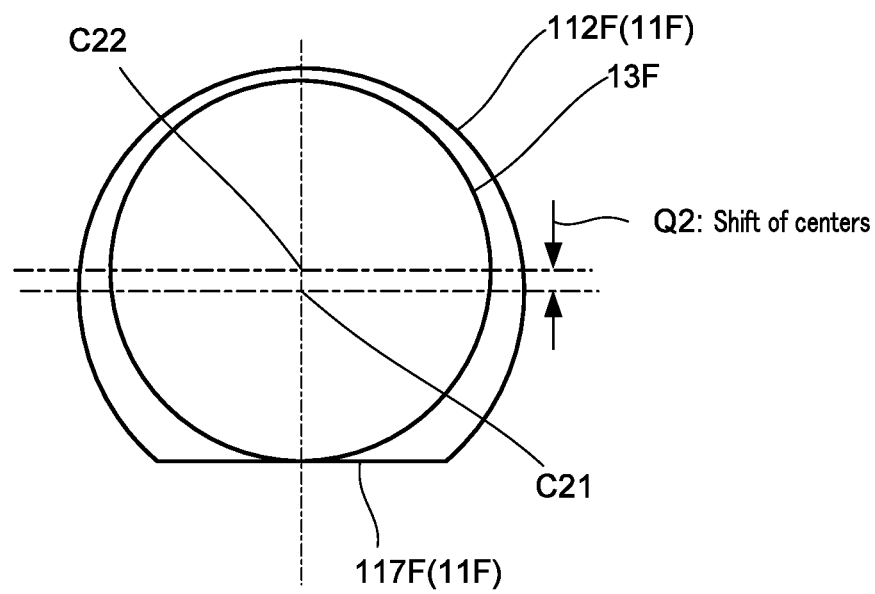
FIG. 61 schematically illustrates the positional relationship between a driving unit and the case in the vibration actuator according to Embodiment 7.

FIG. 57 is an external perspective view of a vibration actuator according to one Embodiment 7 of the present invention, and FIG. 58 is a perspective view of the vibration actuator from which the case is detached. FIG. 59 is a bottom-surface-side perspective view of a case main body, FIG. 60 is a perspective view of the lid portion from the back surface side, and FIG. 61 is a diagram schematically illustrating the positional relationship between the driving unit and the case in the vibration actuator according to Embodiment 7.

Vibration actuator 1F is similar in basic configuration to vibration actuator 1B of Embodiment 3, but differs from vibration actuator 1A in the width of flat surface portion 117F and the positional relation between driving unit 13F and case 10F. In particular, vibration actuator 1F differs from vibration actuator 1B in that the center of driving unit 13F and the center of movable body 20F as seen in the vibration direction (axial direction) are disposed at positions eccentric with respect to the center of case 10F. In other words, vibration actuator 1F differs from vibration actuator 1B in that the center of the circumference (arc portion) of the outer shape of driving unit 13F and the center of gravity of vibration of movable body 20F are shifted in a direction perpendicular to the vibration direction with respect to the center of the arc portion of the outer shape of case 10F. In the following description, similar components are denoted by the same names and the reference symbols in which the letter "B" is changed to "F," and description thereof will be omitted as appropriate.

Vibration actuator 1F includes driving unit 13F and case 10F including flat surface portion 117F at a part of the outer circumference and accommodating driving unit 13F. Driving unit 13F as seen in the vibration direction has a circular outer shape like driving unit 13 of vibration actuator 1, and has the same functions.

Case 10F is composed of case main body 11F and lid portion 12F, and the case as seen in the vibration direction has a D-shaped outer shape including, in the outer circumferential surface, flat surface portion 117F extending in the vibration direction.

Specifically, case main body 11F includes arc-shaped circumferential wall portion 112F and bottom portion 114F, and a portion of circumferential wall portion 112F includes flat surface portion 117F. Flat surface portion 117F has a flat outer surface. Case main body 11F is formed by circumferential wall portion 112F including flat surface portion 117F and by bottom portion 114F in a bottomed cylindrical shape which opens at circular opening portion 115F.

Cutout portion 102F continuous with opening portion 115F is formed in flat surface portion 117F. Cutout portion 102F is formed in a shape that corresponds to and is engageable with hanging portion 124F of lid portion 12F. Terminal tying parts (coil connection parts) 53F-1 and 53F-2 are disposed in cutout portion 102F while being exposed to the outside.

Case main body 11F as seen in the axial direction has an elliptical outer shape, and a circular inner shape. Case main body 11F includes therein a space defined in a cylindrical shape which is open at opening portion 115F. This space accommodates cylindrical driving unit 13F.

Lid portion 12F and bottom portion 114F have the same configurations and functions as those of lid portion 12D and bottom portion 114D of Embodiment 3. Lid portion 12F and bottom portion 114F form top surface portion 122F and the lower surface portion (bottom portion 114F) of vibration actuator 1, and are disposed to face movable body 20F of driving unit 13F accommodated in case 10F in the vibration direction of movable body 20F with predetermined gaps being interposed therebetween. Lid portion 12F and bottom portion 114F have a function as a movable-range reducing part that serves as a hard stop (movable range limitation) of movable body 20F, and regulate the movable range in which movable body 20F is movable.

When engaged with movable-range forming parts 54F of driving unit 13F, lid portion 12F and bottom portion 114F regulate, as the movable range, a space of the lengths from lid portion 12F and bottom portion 114F to the edge portions of the upper and lower end portions of driving unit 13F (upper and lower end surfaces of upper and lower flange portions 527F and 528F). Thus, even when a force causing movable body 20F to move beyond the movable range of movable body 20F is applied to movable body 20F, elastic supporting part 81F makes contact with fixing body 50F (with at least one of lid portion 12F and bottom portion 114F) without being plastically deformed. Thus, elastic supporting part 81F is not damaged. It is possible to increase the reliability of vibration actuator 1F. Functions and effects of hanging portion 124F are the same as those of hanging portion 124B, and therefore descriptions thereof are omitted. Vent holes 126F and 116F having the same function as vent holes 126 and 116 are formed to extend through lid portion 12F and bottom portion 114, respectively.

In vibration actuator 1F as seen in the vibration (axial) direction, the outer shape is a D shape and the inner shape is circular.

The outer diameter shape of vibration actuator 1F as seen in the vibration (axial) direction is a shape (for example, a D shape) including flat surface portion 117F in the outer circumferential surface. Driving unit 13F having a circular outer shape is accommodated in case main body 11F. When vibration actuator 1F is attached to the housing, flat surface portion 117F forming a part of the side surface of case main body 11F can be brought into contact with the flat surface portion of the housing where mounting is performed. Thus, it is easier to attach vibration actuator 1F to the housing. When driving unit 13F is the same as driving unit 13 of Embodiment 1, the same effects as those of Embodiment 1 can be obtained while maintaining the same vibrational feel as in Embodiment 1 by using the same lid portion 12F as lid portion 12 and changing only corresponding case main body 11F.

In addition, in vibration actuator 1F, as illustrated in FIG. 61, outer-diameter arc center C21 of case main body 11F (corresponding to circumferential wall portion 112F) and outer-diameter arc center C22 of driving unit 13F (which is also the center of gravity of vibration of movable body 20) are shifted from each other by distance Q2 in a direction orthogonal to the vibration direction. That is, coil bobbin part 52 (corresponding to driving unit 13F) having a circular outer shape is disposed to be eccentrically disposed with respect to the outer-diameter arc center of the case (case main body 11F) as seen in the vibration (axial) direction. Case main body 11F has an accommodation-portion shape for accommodating coil bobbin part 52 (corresponding to driving unit 13F) whose outer shape is circular such that the coil bobbin part is disposed eccentrically with respect to the outer-diameter arc center of case main body 11F as seen in the vibration (axial) direction. Therefore, even when driving unit 13F does not have a shape corresponding to the outer shape of case main body 11F, driving unit 13F can be accommodated in case main body 11F. Therefore, according to vibration actuator 1F, it is possible to stably cause a vibration, and it is possible to impart a stable vibration feeling.

Note that, vibration actuators 1A to 1F according to Embodiments 2 to 7 include movable bodies 20A to 20F, fixing bodies 50A to 50F, and elastic supporting parts 81A to 81F and 82A to 82F. In vibration actuators 1A to 1F, it is needless to say that the same effects can be obtained by the same basic components and functions as those of Embodiment 1.

Further, configurations of vibration actuators 1A to 1D in which the outer-diameter arc centers of case main bodies 11A to 11D coincide with the outer-diameter arc centers of driving units 13A to 13D and the centers of gravity of vibration of movable bodies 20A to 20D have been described, but a configuration in which the outer-diameter arc centers of case main bodies 11A to 11D do not coincide with the outer-diameter arc centers of movable bodies 20 and the centers of gravity of driving units 13A to 13D may also be used. For example, vibration actuators 1A to 1D may be configured like vibration actuators 1E and 1F in which the centers of coil bobbin parts (coil holding parts) 52A to 52D are disposed at positions eccentric with respect to the centers of cases 10A to 10D.

Like vibration actuator 1, all of vibration actuators 1A to 1F of above-described Embodiments 2 to 7 are mounted as a vibration source on an electronic device such as a portable game terminal device (for example, game controller GC illustrated in FIG. 28) to implement a vibrating function of the electronic device. Examples of this electronic device include a portable device such as a smart phone, and this electronic device may be used, for example, as mobile terminal M illustrated in FIG. 29.

Cases 10 and 10A to 10F are composed of bottomed cylindrical case main bodies 11 and 11A to 11F and lid portions 12 and 12A to 12F. The shapes are not limited to the above. Any shape may be used as long as the driving unit can be accommodated. Case main bodies 11 and 11A to 11F may be referred to as a first case and lid portions 12 and 12A to 12F may be referred to as a second case, both of which may be formed in a bottomed cylindrical shape. The case main bodies may be formed using three or more separate pieces such as a top plate portion, a bottom portion, and a circumferential wall portion.

Note that, when the outer shape of the driving unit (coil bobbin part (coil holding part) 52) is circular, and the driving unit as seen in the vibration direction is eccentrically disposed with respect to the outer-shape center of the case in which a flat surface portion is formed in the outer circumferential surface, it is preferable that the terminal tying parts (coil connection parts) be disposed on the outer shape side of the case on the side where the center of the coil holding part is located with respect to the outer-shape center of the case. Alternatively, it is preferable that the terminal tying parts (coil connection parts) be disposed on the flat surface portion side formed in the outer circumferential surface of the case. In any of the configurations, when the vibration actuator is mounted in the housing where the vibration actuator is to be mounted, stable easy mounting is possible by means of the flat surface portion forming a part of the side surface of the case main body. Furthermore, when the terminal tying parts (coil connection parts) are disposed on the flat surface portion side forming a part of the side surface of the case main body, connection with external wiring via the terminal tying parts is easy to perform.

While the invention made by the present inventors has been specifically described based on the preferred embodiment, it is not intended to limit the present invention to the above-mentioned preferred embodiment, but the present invention may be further modified within the scope and spirit of the invention defined by the appended claims.

The vibration actuator according to the present invention is also suitable for application to portable devices other than game controller GC and mobile terminal M (for example, a portable information terminal such as a tablet PC, a portable game terminal, or a wearable terminal worn and used by a user). Vibration actuators 1 and 1A to 1F of the present embodiment can be used not only in the above-described portable device but also in an electric barber and beauty instrument such as a beauty massager requiring vibration.

The disclosure of Japanese Patent Application No. 2020-032251, filed on Feb. 27, 2020, including the specification, drawings and abstract is incorporated herein by reference in its entirety.

INDUSTRIAL APPLICABILITY

The vibration actuator according to the present invention is capable of suppressing occurrence of noise and generating a vibration at a steady high output even when the vibration is attenuated, and is useful for being mounted on an electronic device such as a game machine terminal or a portable terminal.

REFERENCE SIGNS LIST 1, 1A, 1B, 1C, 1D, 1E, 1F Vibration actuator
10, 10A, 10B, 10C, 10D, 10E, 10F Case
11, 11A, 11B, 11C, 11D, 11E, 11F Case main body
12, 12A, 12B, 12C, 12D, 12E, 12F Lid portion
13, 13A, 13B, 13C, 13D, 13E, 13F driving unit
20, 20A, 20B, 20C, 20D, 20E, 20F movable body
20a outer circumferential surface
20b Movable-body-side flat surface portion
30, 30C, 30D Magnet
30a Front surface
30b Back surface
41, 42 Movable-body core
50, 50A, 50B, 50C, 50D, 50E, 50F Fixing body
52, 52A, 52B, 52C, 52D, 52E, 52F Coil bobbin part (coil holding part)
52b, 52c Coil attachment portion
53, 53-1, 53-2, 53C-1, 53C-2, 53D-1, 53D-2, 53E-1, 53E-2, 53F-1, 53F-2 Terminal tying part
54, 54A, 54B, 54C, 54D, 54E, 54F Movable-range forming part (projection)
55 Linking groove portion (groove portion)
58 Electromagnetic shield part
61, 62 Coil
72 Damping part
81, 81A, 81B, 81C, 81D, 81E, 81F, 82, 82C, 82D, 82E Elastic supporting part
90, 90A, 90B, 90C, 90D Sealing part
90E, 90F Elastomer
92 Outer circumferential surface
103A Opening end portion
112, 112A, 112C, 112D, 112E, 112F Circumferential wall portion
113A, 113C, 117, 117A, 117B, 117C, 117D, 117E, 117F, 5224 Flat surface portion
114 Bottom portion
115 Opening portion
116, 126 Vent hole
118 Step portion
122 Top surface portion
124, 124A, 124B, 124C, 124D, 124E, 124F Hanging portion
128 Pressing portion
132, 134 Unit flat surface portion
201 Communication part
202 Processing part
203 Drive control part
204, 205, 206 Vibration actuator
222, 242 Joint portion
224, 244 Spring fixation portion
303 Circumferential flat surface portion
413, 423 Core flat surface portion
522 Bobbin main-body portion
522a Inner circumferential surface
526 Middle flange portion
526a Outer circumferential portion
527, 527A, 527B, 527C, 527D, 527E, 527F, 528, 528A, 528B, 528C, 528D, 528E, 528F Flange portion
527a Upper end surface (opening end surface)
528a Lower end surface (opening end surface)
529 Positioning engagement portion
589 Engaged portion
802 Inner circumferential portion
804 Deformation arm portion
806 Outer circumferential fixing portion (outer circumferential portion)
808 Positioning groove
809 Recessed portion
810 Linear portion
5222 Inner circumferential flat surface portion

The invention claimed is:

1. A vibration actuator, comprising:
a movable body that centrally includes a magnet having a columnar shape and in which spring retaining parts are disposed respectively on front and back surfaces of the magnet in an axial direction of the magnet;
a fixing body for accommodating the movable body, the fixing body having a cylindrical shape and including a pair of annular coils disposed radially outside of the movable body;
a pair of elastic supporting parts for supporting the movable body such that the movable body is capable of reciprocating vibration in a vibration direction along the axial direction, each of the elastic supporting parts being joined to the fixing body at an outer circumferential portion and being joined to a corresponding one of the spring retaining parts at an inner circumferential portion; and
a sealing part that is disposed at a joint portion between the inner circumferential portion and the movable body and that seals the joint portion, wherein
the spring retaining parts include recess forming portions continuous with a joining surface with the inner circumferential portions and having a flat bottom,
the inner circumferential portion has a recessed portion which is cut out on an outer circumference of the inner circumferential portion in the circumferential direction and located on the joining surface, and
the sealing part is capable of connecting and sealing the recessed portion and the recess forming portion (25) in communication with each other, and seals the joint portion.

2. The vibration actuator according to claim 1, wherein:
the inner circumferential portion (802) is joined to an outer circumference of at least one end portion of opposite end portions of the movable body (20) separate from each other in the vibration direction, and
the sealing part (90) is disposed to externally cover a joint portion between the inner circumferential portion (802) and the at least one end portion without any gap.

3. The vibration actuator according to claim 1, wherein the sealing part is formed of an adhesive having at least one of a thermosetting property, UV curability, and an anaerobic property, and seals a gap at the joint portion.

4. The vibration actuator according to claim 1, wherein:
the inner circumferential portion is continuous to a boundary of the joint portion when being joined to the movable body, the inner circumferential portion including a recessed portion having a cutout shape that is exposed to an outside, and
the sealing part closes and seals the recessed portion and the boundary of the joint portion.

5. The vibration actuator according to any one of claim 1, wherein:
the fixing body includes a cylindrical coil holding part for holding the coil, and a case for accommodating the cylindrical coil holding part, and
the case includes, in an outer circumferential surface, a flat surface portion extending parallel to the vibration direction.

6. The vibration actuator according to claim 5, wherein a coil connection part is disposed at the flat surface portion.

7. The vibration actuator according to claim 5, wherein the case includes, in the outer circumferential surface, another flat surface portion extending parallel to the flat surface portion.

8. The vibration actuator according to any one of claim 5, wherein:
at a position corresponding to the flat surface portion, an inner circumferential surface of the cylindrical coil holding part and an outer circumferential surface of the magnet respectively include an inner circumferential flat surface portion and an outer circumferential flat surface portion facing each other, and
the outer circumferential flat surface portion is narrower than the inner circumferential flat surface portion in a direction perpendicular to the vibration direction.

9. The vibration actuator according to any one of claim 6, wherein:
an outer shape of the cylindrical coil holding part as seen in the vibration direction is circular, and
the cylindrical coil holding part as seen in the vibration direction is disposed eccentrically with respect to an outer-shape center of the case or an outer-diameter arc center of the case.

10. The vibration actuator according to claim 9, wherein a coil connection part is disposed on an outer-shape side of the case, the outer-shape side being on a side where a center of the cylindrical coil holding part is located with respect to the outer-shape center of the case of the cylindrical coil holding part.

11. The vibration actuator according to claim 9, wherein a coil connection part is disposed on the flat surface portion side formed in the outer circumferential surface of the case of the cylindrical coil holding part.

12. An electronic device in which a vibration actuator according to any one of claim 1 is mounted.

* * * * *